US012659879B2

(12) United States Patent
Yang et al.

(10) Patent No.: US 12,659,879 B2
(45) Date of Patent: Jun. 16, 2026

(54) TRANSMISSION POWER

(71) Applicant: LG ELECTRONICS INC., Seoul (KR)

(72) Inventors: Yoonoh Yang, Seoul (KR); Sangwook Lee, Seoul (KR); Joongkwan Huh, Seoul (KR); Jinyup Hwang, Seoul (KR); Jinwoong Park, Seoul (KR); Yunsik Na, Seoul (KR)

(73) Assignee: LG Electronics Inc., Seoul (KR)

( * ) Notice: Subject to any disclaimer, the term of this patent is extended or adjusted under 35 U.S.C. 154(b) by 356 days.

(21) Appl. No.: 18/229,751

(22) Filed: Aug. 3, 2023

(65) Prior Publication Data

US 2024/0049150 A1 Feb. 8, 2024

Related U.S. Application Data

(60) Provisional application No. 63/411,146, filed on Sep. 29, 2022, provisional application No. 63/394,636, filed on Aug. 3, 2022, provisional application No. 63/394,637, filed on Aug. 3, 2022.

(51) Int. Cl.
*H04W 52/36* (2009.01)

(52) U.S. Cl.
CPC .................................. *H04W 52/367* (2013.01)

(58) Field of Classification Search
CPC . H04W 52/367; H04W 52/325; H04W 52/42; H04W 52/265; H04W 52/146; H04B 7/0404; H04B 7/0456; H04B 7/0639
See application file for complete search history.

(56) References Cited

U.S. PATENT DOCUMENTS

| | | | |
|---|---|---|---|
| 11,647,471 B2 * | 5/2023 | Wang | H04W 74/0833 |
| | | | 370/329 |
| 2023/0053264 A1 * | 2/2023 | Jang | H04L 27/2636 |
| 2023/0354217 A1 * | 11/2023 | Bae | H04W 52/367 |

* cited by examiner

*Primary Examiner* — John J Lee
(74) *Attorney, Agent, or Firm* — Fish & Richardson P.C.

(57) ABSTRACT

The present disclosure provides a UE. The UE includes at least one transceiver; at least one processor; and at least one memory that stores instructions and is operatively electrically connectable with the at least one processor. Operations performed based on the command being executed by the at least one processor may include: determining transmission power; and a step of transmitting an uplink signal based on the transmission power.

20 Claims, 31 Drawing Sheets

FIG. 2

FIG. 6
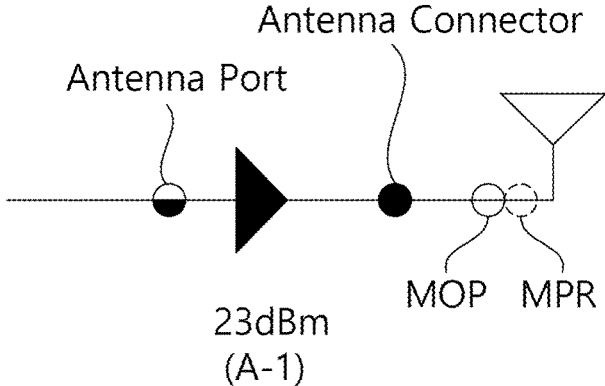
23dBm
(A-1)
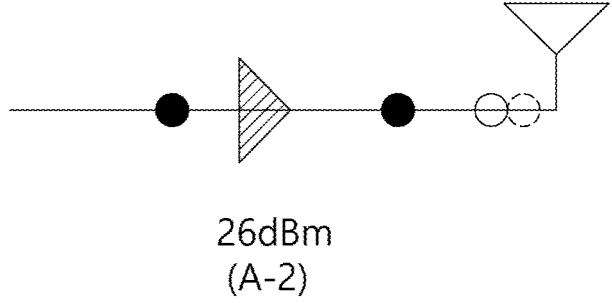
26dBm
(A-2)
FIG. 7A
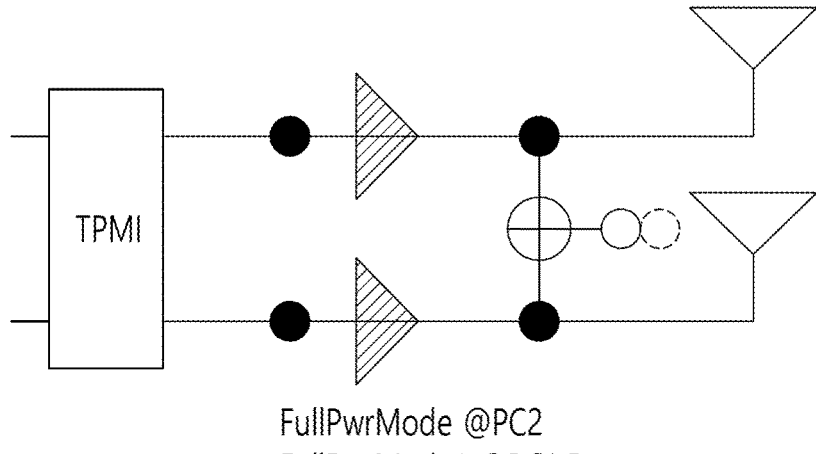
FullPwrMode @PC2
FullPwrMode1 @PC1.5
(B-1)

FullPwrMode1 @PC2

(B-2)

FullPwrMode2 @PC2

(B-3)

FIG. 8
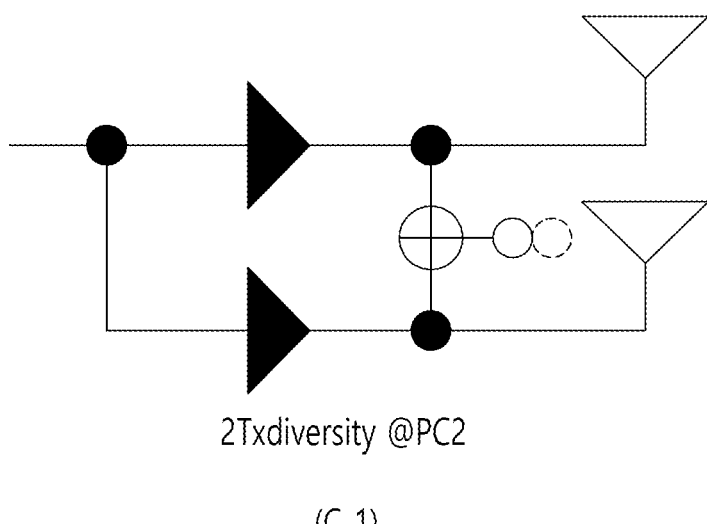
2Txdiversity @PC2
(C-1)
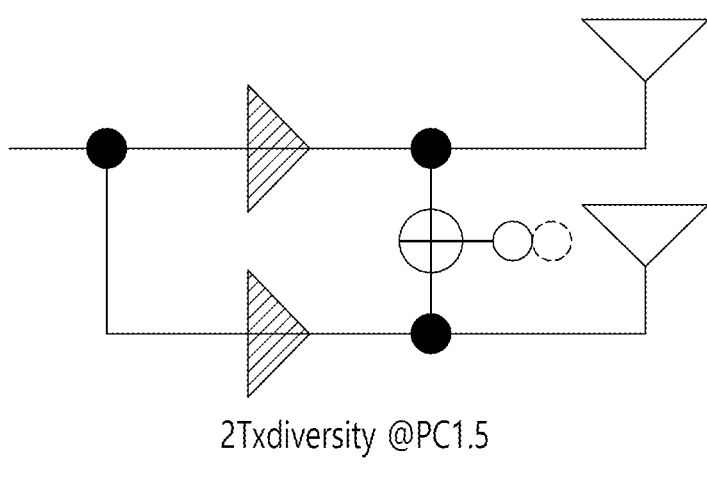
2Txdiversity @PC1.5
(C-2)

FIG. 9

| TPMI index | W (ordered from left to right in increasing order of TPMI index) | | | | | | | |
|---|---|---|---|---|---|---|---|---|
| 0 - 5 | $\frac{1}{\sqrt{2}}\begin{bmatrix} 1 \\ 0 \end{bmatrix}$ | $\frac{1}{\sqrt{2}}\begin{bmatrix} 0 \\ 1 \end{bmatrix}$ | $\frac{1}{\sqrt{2}}\begin{bmatrix} 1 \\ 1 \end{bmatrix}$ | $\frac{1}{\sqrt{2}}\begin{bmatrix} 1 \\ -1 \end{bmatrix}$ | $\frac{1}{\sqrt{2}}\begin{bmatrix} 1 \\ j \end{bmatrix}$ | $\frac{1}{\sqrt{2}}\begin{bmatrix} 1 \\ j \end{bmatrix}$ | — | — |

FIG. 10

| TPMI index | W (ordered from left to right in increasing order of TPMI index) | | |
|---|---|---|---|
| 0 - 2 | $\frac{1}{\sqrt{2}}\begin{bmatrix} 1 & 0 \\ 0 & 1 \end{bmatrix}$ | $\frac{1}{2}\begin{bmatrix} 1 & 1 \\ 1 & -1 \end{bmatrix}$ | $\frac{1}{2}\begin{bmatrix} 1 & 1 \\ j & -j \end{bmatrix}$ |

FIG. 12

| TPMI index | W (ordered from left to right in increasing order of TPMI index) | | | | | | | |
|---|---|---|---|---|---|---|---|---|
| 0 - 7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8 - 15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\1\end{bmatrix}$ | $\frac{1}{2}\begin{bmatrix}1\\1\\j\\j\end{bmatrix}$ | $\frac{1}{2}\begin{bmatrix}1\\1\\-1\\-1\end{bmatrix}$ | $\frac{1}{2}\begin{bmatrix}1\\1\\-j\\-j\end{bmatrix}$ |
| 16 - 23 | $\frac{1}{2}\begin{bmatrix}1\\j\\1\\j\end{bmatrix}$ | $\frac{1}{2}\begin{bmatrix}1\\j\\j\\-1\end{bmatrix}$ | $\frac{1}{2}\begin{bmatrix}1\\j\\-1\\-j\end{bmatrix}$ | $\frac{1}{2}\begin{bmatrix}1\\j\\-j\\1\end{bmatrix}$ | $\frac{1}{2}\begin{bmatrix}1\\-1\\1\\-1\end{bmatrix}$ | $\frac{1}{2}\begin{bmatrix}1\\-1\\j\\-j\end{bmatrix}$ | $\frac{1}{2}\begin{bmatrix}1\\-1\\-1\\1\end{bmatrix}$ | $\frac{1}{2}\begin{bmatrix}1\\-1\\-j\\j\end{bmatrix}$ |
| 24 - 27 | $\frac{1}{2}\begin{bmatrix}1\\-j\\1\\-j\end{bmatrix}$ | $\frac{1}{2}\begin{bmatrix}1\\-j\\j\\1\end{bmatrix}$ | $\frac{1}{2}\begin{bmatrix}1\\-j\\-1\\j\end{bmatrix}$ | $\frac{1}{2}\begin{bmatrix}1\\-j\\-j\\-1\end{bmatrix}$ | — | — | — | — |

FIG. 13

W
(ordered from left to right in increasing order of TPMI index)

| TPMI index | W | | | |
|---|---|---|---|---|
| 0 – 3 | $\frac{1}{2}\begin{bmatrix}1&0\\0&1\\1&0\\0&0\end{bmatrix}$ | $\frac{1}{2}\begin{bmatrix}1&0\\0&1\\0&0\\0&0\end{bmatrix}$ | $\frac{1}{2}\begin{bmatrix}1&0\\0&1\\1&0\\0&-1\end{bmatrix}$ | $\frac{1}{2}\begin{bmatrix}0&1\\0&0\\1&0\\0&0\end{bmatrix}$ |
| 4 – 7 | $\frac{1}{2}\begin{bmatrix}0&0\\0&0\\1&0\\0&1\end{bmatrix}$ | $\frac{1}{2}\begin{bmatrix}0&1\\0&0\\0&0\\0&1\end{bmatrix}$ | $\frac{1}{2}\begin{bmatrix}0&0\\0&0\\1&0\\0&1\end{bmatrix}$ | $\frac{1}{2}\begin{bmatrix}0&0\\0&0\\0&1\\0&1\end{bmatrix}$ |
| 8 – 11 | $\frac{1}{2}\begin{bmatrix}1&0\\0&1\\-j&0\\0&1\end{bmatrix}$ | $\frac{1}{2}\begin{bmatrix}0&1\\0&0\\-j&0\\0&-1\end{bmatrix}$ | $\frac{1}{2}\begin{bmatrix}1&0\\0&1\\-j&0\\0&-1\end{bmatrix}$ | $\frac{1}{2}\begin{bmatrix}1&0\\0&1\\-1&0\\0&j\end{bmatrix}$ |
| 12 – 15 | $\frac{1}{2}\begin{bmatrix}0&1\\0&0\\j&0\\0&1\end{bmatrix}$ | $\frac{1}{2}\begin{bmatrix}1&0\\0&1\\j&0\\0&-1\end{bmatrix}$ | $\frac{1}{2}\begin{bmatrix}1&0\\0&1\\1&0\\0&-j\end{bmatrix}$ | $\frac{1}{2}\begin{bmatrix}1&0\\0&1\\1&0\\0&j\end{bmatrix}$ |
| 16 – 19 | $\frac{1}{2\sqrt{2}}\begin{bmatrix}1&1\\-j&-j\\j&1\\1&-1\end{bmatrix}$ | $\frac{1}{2\sqrt{2}}\begin{bmatrix}1&1\\1&1\\j&j\\1&-1\end{bmatrix}$ | $\frac{1}{2\sqrt{2}}\begin{bmatrix}1&1\\1&-1\\1&1\\-1&1\end{bmatrix}$ | $\frac{1}{2\sqrt{2}}\begin{bmatrix}1&1\\1&-1\\j&j\\1&-1\end{bmatrix}$ |
| 20 – 21 | $\frac{1}{2\sqrt{2}}\begin{bmatrix}1&-1\\j&-j\\1&1\\-j&j\end{bmatrix}$ | $\frac{1}{2\sqrt{2}}\begin{bmatrix}1&-1\\1&1\\1&-1\\-1&-1\end{bmatrix}$ | — | — |

FIG. 14

| TPMI index | W (ordered from left to right in increasing order of TPMI index) | | |
|---|---|---|---|
| 0 - 3 | $\frac{1}{2}\begin{bmatrix} 1 & 0 & 0 \\ 0 & 1 & 0 \\ 0 & 0 & 1 \\ 0 & 0 & 1 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4 - 6 | $\frac{1}{2\sqrt{3}}\begin{bmatrix} 1 & 1 & 1 \\ 1 & 1 & 1 \\ j & j & -j \\ j & -j & -j \end{bmatrix}$ | $\frac{1}{2\sqrt{3}}\begin{bmatrix} 1 & 1 & -1 \\ -1 & 1 & 1 \\ 1 & -1 & 1 \\ 1 & -1 & 1 \end{bmatrix}$ | $\frac{1}{2\sqrt{3}}\begin{bmatrix} 1 & 1 & 1 \\ -1 & -1 & 1 \\ j & j & j \\ -j & j & j \end{bmatrix}$ | — |

FIG. 15

| TPMI index | W (ordered from left to right in increasing order of TPMI index) | | | |
|---|---|---|---|---|
| 0 - 3 | $\dfrac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\dfrac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ | $\dfrac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ | $\dfrac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 4 | $\dfrac{1}{4}\begin{bmatrix} 1 & 1 & 1 & 1 \\ 1 & -1 & 1 & -1 \\ j & j & -j & -j \\ j & -j & -j & j \end{bmatrix}$ | — | — | — |

1

TRANSMISSION POWER

CROSS-REFERENCE TO RELATED APPLICATIONS

This application claims the benefit of U.S. Provisional Application No. 63/394,636 filed on Aug. 3, 2022, U.S. Provisional Application No. 63/394,637 filed on Aug. 3, 2022, and U.S. Provisional Application No. 63/411,146 filed on Sep. 29, 2022, the disclosures of which are all hereby incorporated by reference herein in their entirety.

TECHNICAL FIELD

The present specification relates to a radio communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 110 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

According to conventional technology, there was a problem that 29 dBm high-power terminals were not supported in a single carrier of FR2 (Frequency Range 2).

SUMMARY

In one aspect, a UE is provided. The UE includes at least one transceiver; at least one processor; and at least one memory that stores instructions and is operatively electrically connectable with the at least one processor. Operations performed based on the command being executed by the at least one processor may include: determining transmission power; and transmitting an uplink signal based on the transmission power.

In another aspect, a method performed by the UE is provided.

In one aspect, a UE is provided. The UE includes at least one transceiver; at least one processor; and at least one memory that stores instructions and is operatively electrically connectable with the at least one processor. Operations performed based on the command being executed by the at least one processor may include: determining transmission power for PRACH; and transmitting a PRACH signal including a random access preamble based on the transmission power.

In another aspect, a method by which the apparatus performs is provided.

BRIEF DESCRIPTION OF THE DRAWINGS

FIG. 2 shows an example of a wireless device to which implementation of the present disclosure is applied.

FIG. 6 illustrates an example of a 1Tx terminal according to an embodiment of the present specification.

FIGS. 7A to 7C illustrate an example of a 2Tx terminal supporting a UL-MIMO according to an embodiment of the present specification.

FIG. 8 illustrates an example of a 2 Tx terminal supporting Tx diversity according to an embodiment of the present specification.

FIG. 9 shows an example of a precoding matrix for single-layer transmission using two antenna ports according to an embodiment of the present specification.

FIG. 10 shows an example of a precoding matrix for two-layer transmission using two antenna ports according to an embodiment of the present specification.

FIG. 12 shows an example of a precoding matrix for 1-layer transmission using four antenna ports according to an embodiment of the present specification.

FIG. 13 shows an example of a precoding matrix for two-layer transmission using four antenna ports according to an embodiment of the present specification.

FIG. 14 shows an example of a precoding matrix for 3-layer transmission using four antenna ports according to an embodiment of the present specification.

FIG. 15 shows an example of a precoding matrix for 4-layer transmission using four antenna ports according to an embodiment of the present specification.

DETAILED DESCRIPTION

Figure 1:
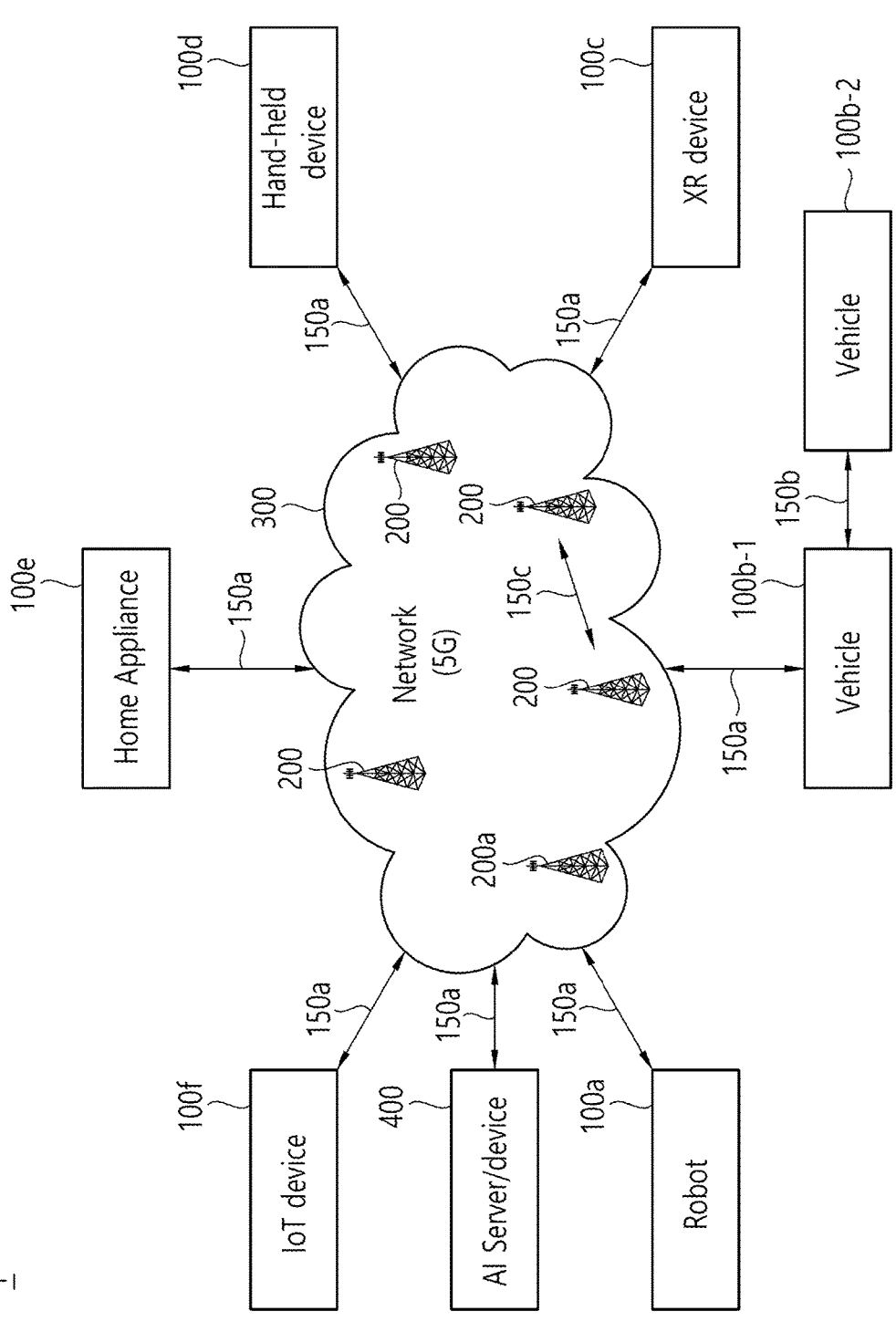
FIG. 1 shows an example of a communication system to which implementation of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regard to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Although a user equipment (UE) is illustrated by way of example in the accompanying drawings, the illustrated UE may be referred to as a terminal, mobile equipment (ME), and the like. In addition, the UE may be a portable device such as a notebook computer, a mobile phone, a PDA, a smartphone, and a multimedia device or may be a non-portable device such as a PC or a vehicle-mounted device.

Hereinafter, a UE is used as an example of a wireless communication device (or a wireless device or wireless equipment) capable of wireless communication. An operation performed by a UE may be performed by a wireless communication device. A wireless communication device may also be referred to as a wireless device, wireless equipment, or the like. Hereinafter, AMF may mean an AMF node, SMF may mean an SMF node, and UPF may mean a UPF node.

A base station used below generally refers to a fixed station communicating with a wireless device and may also be referred as an evolved-NodeB (eNodeB), an evolved-NodeB (eNB), a base transceiver system (BTS), an access point, and a next generation NodeB (gNB).

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5GNR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them.

Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW). FR2 may include FR 2-1 and FR 2-2, as shown in the examples in Table 1 and Table 2.

TABLE 1

| Frequency Range designation | | Corresponding frequency range | Subcarrier Spacing |
|---|---|---|---|
| FR1 | | 450 MHz-6000 MHz | 15, 30, 60 kHz |
| FR2 | FR2-1 | 24250 MHz-52600 MHz | 60, 120, 240 kHz |
| | FR2-2 | 57000 MHz-71000 MHz | 120, 480, 960 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | | Corresponding frequency range | Subcarrier Spacing |
|---|---|---|---|
| FR1 | | 410 MHz-7125 MHz | 15, 30, 60 kHz |
| FR2 | FR2-1 | 24250 MHz-52600 MHz | 60, 120, 240 kHz |
| | FR2-2 | 57000 MHz-71000 MHz | 120, 480, 960 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally, and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally, and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
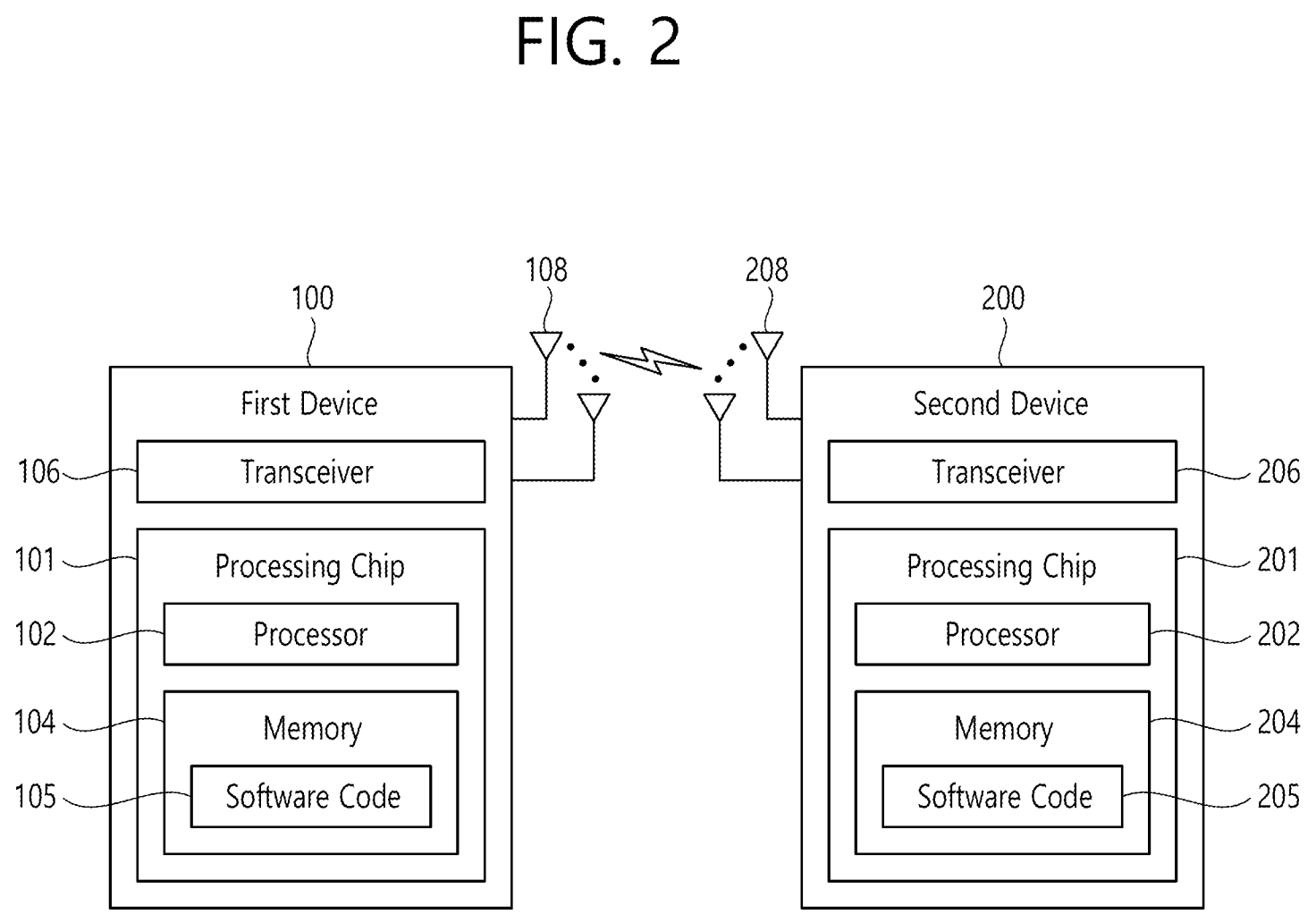

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure.

For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as anode B (NB), an eNode B (eNB), or a gNB.

Figure 3:
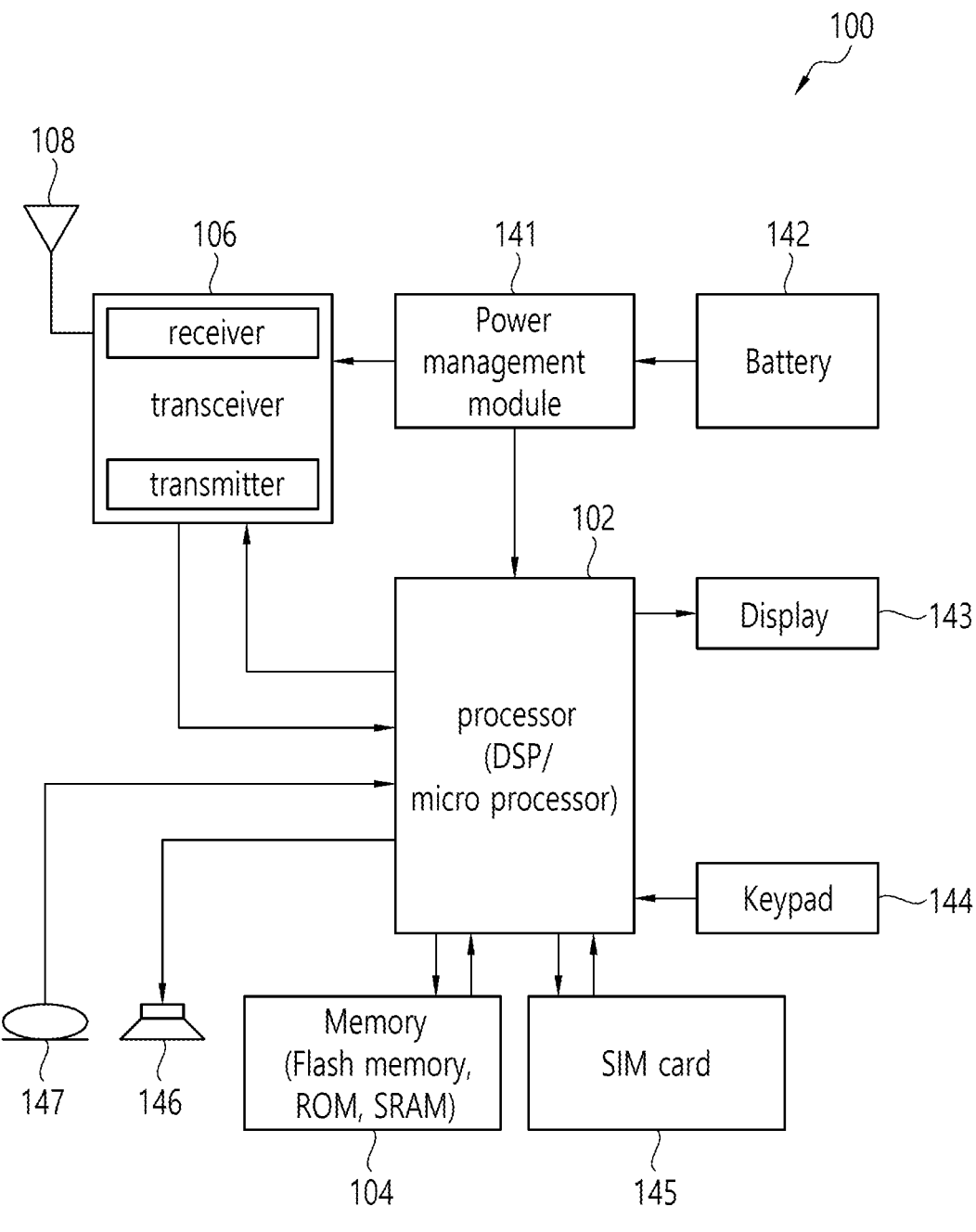
FIG. 3 shows an example of a wireless device to which implementation of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

<Operating Bands of NR>.

The operating bands in NR are as follows

The operating bands in Table 3 below are the refarmed operating bands from the operating bands of LTE/LTE-A. This is referred to as the FR1 band.

TABLE 3

| NR operating bands | Uplink (UL) operating band $F_{UL\_low}$-$F_{UL\_high}$ | Downlink(DL) operating band $F_{DL\_low}$-$F_{DL\_high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n50 | 1432 MHz-1517 MHz | 1432 MHz-1517 MHz | TDD1 |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |

TABLE 3-continued

| NR operating bands | Uplink (UL) operating band $F_{UL\_low}$-$F_{UL\_high}$ | Downlink(DL) operating band $F_{DL\_low}$-$F_{DL\_high}$ | Duplex Mode |
|---|---|---|---|
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |

The table below shows the NR operating band defined at high frequencies. This is called the FR2 band.

TABLE 4

| N R Operating band | Uplink (UL) operating band $F_{UL\_low}$-$F_{UL\_high}$ | Downlink(DL) operating band $F_{DL\_low}$-$F_{DL\_high}$ | Duplex Mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 37000 MHz-40000 MHz | 37000 MHz-40000 MHz | TDD |
| n260 | 37000 MHz-40000 MHz | 37000 MHz-40000 MHz | FDD |
| n261 | 27500 MHz-28350 MHz | 27500 MHz-28350 MHz | FDD |

<6G System General>

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 4 below. That is, Table 4 shows the requirements of the 6G system.

TABLE 5

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

The 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Figure 4:
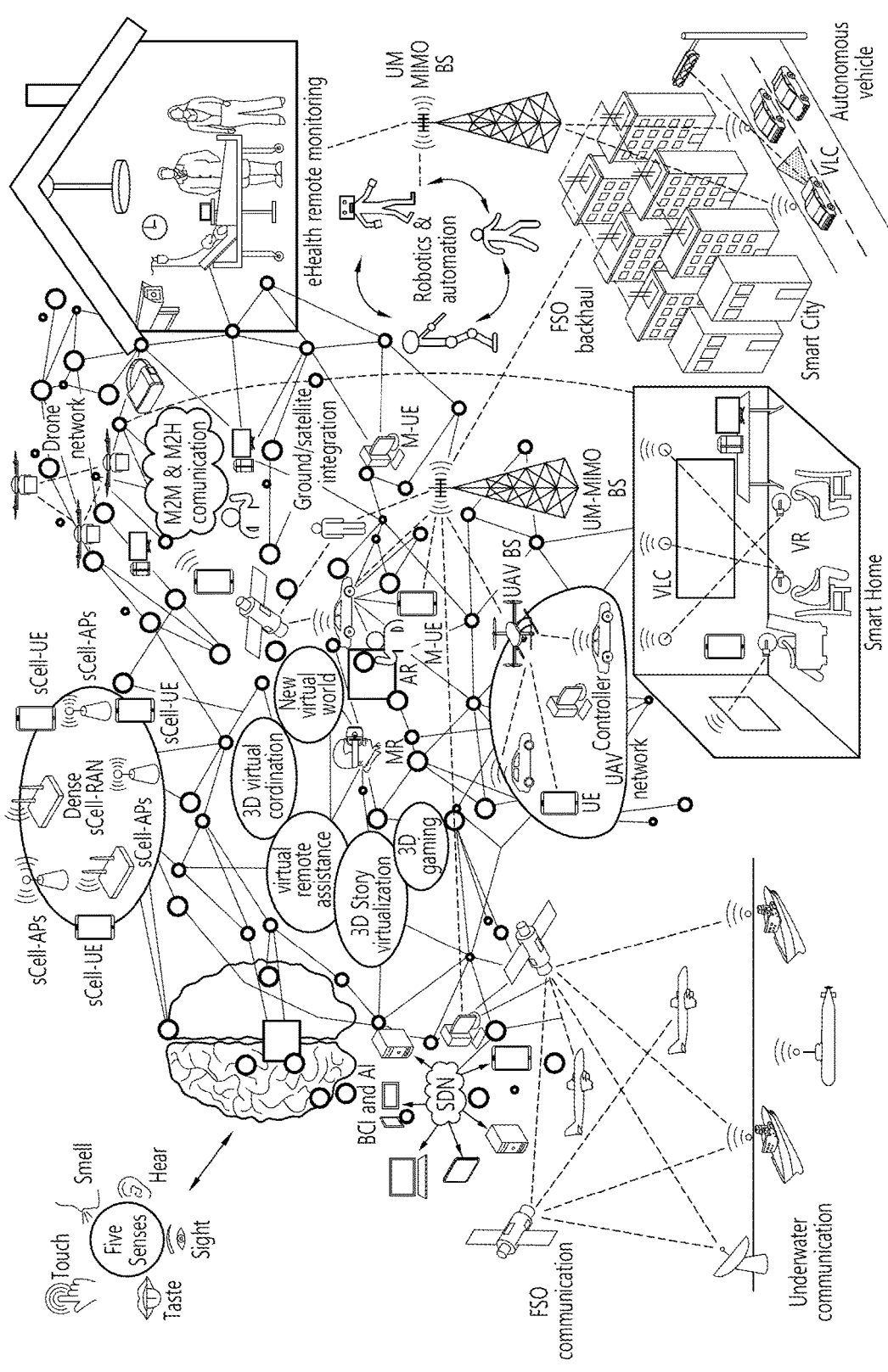
FIG. 4 shows an example of a radio frame structure of NR to which implementation of the present disclosure is applied.

FIG. 4 is a diagram showing an example of a communication structure that can be provided in a 6G system.

The 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimension connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduces costs.

High-capacity backhaul: Backhaul connection is characterized by a high-capacity traffic. A high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

<Core Implementation Technology of 6G System>
Artificial Intelligence

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

Machine learning refers to a series of operations to train a machine in order to create a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method, a recurrent Boltzmman machine (RNN) method and a spiking neural network (SNN). Such a learning model is applicable.

THz (Terahertz) Communication

A data rate may increase by increasing bandwidth. This may be performed by using sub-TH communication with wide bandwidth and applying advanced massive MIMO technology. THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

Figure 5:
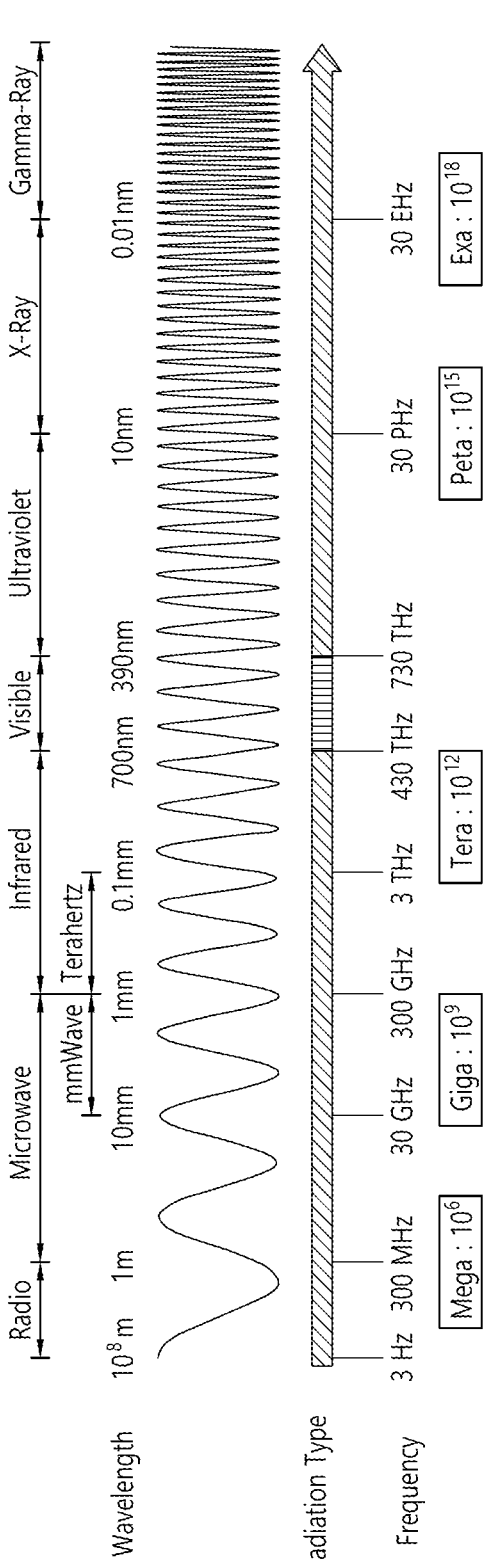
FIG. 5 shows an example of a slot structure of an NR frame to which implementation of the present disclosure is applied.

FIG. 5 shows an example of an electromagnetic spectrum. The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Large-Scale MIMO

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram Beamforming (HBF) is a new beamforming method that differs significantly from MIMO systems because this uses a software-defined antenna. HBF will be a very effective approach for efficient and flexible transmission and reception of signals in multi-antenna communication devices in 6G.

Optical Wireless Technology

Optical wireless communication (OWC) is a form of optical communication that uses visible light, infrared light (IR), or ultraviolet light (UV) to carry signals. OWC operating in the visible light band (e.g., 390 to 750 nm) is commonly referred to as visible light communication (VLC). VLC implementations can utilize light-emitting diodes (LEDs). VLC can be used in a variety of applications, including wireless local area networks, wireless personal area networks, and vehicular networks.

VLC has several advantages over RF-based technologies. First, the spectrum occupied by VLC is free/unlicensed and can provide extensive bandwidth (THz-level bandwidth). Second, VLC rarely causes significant interference to other electromagnetic devices; therefore, VLC can be applied in sensitive electromagnetic interference applications such as aircraft and hospitals. Third, VLC has strengths in communication security and privacy. The transmission medium of VLC-based networks, namely visible light, cannot pass through walls and other opaque obstacles. Therefore, the transmission range of VLC can be limited to indoors, which can protect users' privacy and sensitive information. Fourth, VLC can use any light source as a base station, eliminating the need for expensive base stations.

Free-space optical communication (FSO) is an optical communication technology that uses light propagating in free space, such as air, outer space, and vacuum, to wirelessly transmit data for telecommunications or computer networking. FSO can be used as a point-to-point OWC system on the ground. FSO can operate in the near-infrared frequency (750-1600 nm). Laser transmitters may be used in FSO implementations, and FSO can provide high data rates (e.g., 10 Gbit/s), providing a potential solution to backhaul bottlenecks.

These OWC technologies are planned for 6G communications in addition to RF-based communications for all possible device-to-access networks. These networks will access network-to-backhaul/fronthaul network connections. OWC technology has already been in use since 4G communication systems, but will be more widely used to meet the needs of 6G communication systems. OWC technologies such as light fidelity, visible light communication, optical camera communication, and FSO communication based on optical bands are already well-known technologies. Communication based on optical wireless technology can provide extremely high data rates, low latency, and secure communication.

Light Detection And Ranging (LiDAR) is also based on the optical band and can be utilized in 6G communications for ultra-high resolution 3D mapping. LiDAR is a remote sensing method that uses near-infrared, visible, and ultraviolet light to illuminate an object, and the reflected light is detected by a light sensor to measure distance. LiDAR can be used for fully automated driving of cars.

FSO Backhaul Network

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Non-Terrestrial Networks (NTN)

The 6G system will integrate terrestrial and aerial networks to support vertically expanding user communications. 3D BS will be delivered via low-orbit satellites and UAVs. Adding a new dimension in terms of altitude and associated degrees of freedom makes 3D connectivity quite different from traditional 2D networks. NR considers Non-Terrestrial Networks (NTNs) as one way to accomplish this. An NTN is a network or network segment that uses RF resources aboard a satellite (or UAS platform). There are two common scenarios for NTNs that provide access to user equipment: transparent payloads and regenerative payloads. The following are the basic elements of an NTN.

One or more sat-gateways that connect the NTN to the public data network.

GEO satellites are fed by one or several satellite gateways deployed across the satellite target range (e.g., regional or continental coverage). We assume that the UEs in a cell are served by only one sat-gateway.

Non-GEO satellites that are continuously serviced by one or multiple satellite gateways at a time. The system ensures service and feeder link continuity between successively serviced satellite gateways with a time duration sufficient to allow for mobility anchoring and handover.

The feeder link or radio link between the satellite gateway and the satellite (or UAS platform).

The service link or radio link between the user equipment and the satellite (or UAS platform).

A satellite (or UAS platform) that can implement transparent or regenerative (with onboard processing) payloads. Satellite (or UAS platform) generated beams typically produce multiple beams for a given service area, depending on the field of view. The footprint of the beam is typically elliptical. The field of view of the satellite (or UAS platform) depends on the onboard antenna diagram and the minimum angle of attack.

Transparent payload: Radio frequency filtering, frequency conversion, and amplification, so the waveform signal repeated by the payload is unchanged.

Regenerative payload: radio frequency filtering, frequency conversion and amplification, demodulation/decryption, switching and/or routing, and coding/modulation. This is effectively the same as having all or part of the base station functions (e.g., gNB) on board a satellite (or UAS platform).

For satellite deployments, optionally an inter-satellite link (ISL). This requires a regenerative payload on the satellite. ISLs can operate at RF frequencies or in the optical band.

User equipment is served by satellites (or UAS platforms) within the targeted coverage area.

Typically, GEO satellites and UAS are used to provide continental, regional, or local services.

Typically, constellations in LEO and MEO are used to provide coverage in both the Northern and Southern Hemispheres. In some cases, constellations can also provide global coverage, including polar regions. The latter requires proper orbital inclination, sufficient beams generated, and links between satellites.

Quantum Communication

Quantum communication is a next-generation communication technology that can overcome the limitations of conventional communication such as security and high-speed computation by applying quantum mechanical properties to the field of information and communication. Quantum communication provides a means of generating, transmitting, processing, and storing information that cannot be expressed in the form of 0s and 1s according to the binary bit information used in existing communication technologies. In conventional communication technologies, wavelengths or amplitudes are used to transmit information between the transmitting and receiving ends, but in quantum communication, photons, the smallest unit of light, are used to transmit information between the transmitting and receiving ends. In particular, in the case of quantum communication, quantum uncertainty and quantum irreversibility can be used for the polarization or phase difference of photons (light), so quantum communication has the characteristic of being able to communicate with perfect security. In addition, quantum communication can also enable ultra-high-speed communication using quantum entanglement under certain conditions.

Cell-Free Communication

Tight integration of multiple frequencies and heterogeneous communication technologies is critical in 6G systems. As a result, users can seamlessly move from one network to another without having to create any manual configurations on their devices. The best network is automatically selected from the available communication technologies. This will break the limitations of the cell concept in wireless communication. Currently, user movement from one cell to other causes too many handovers in dense networks, resulting in handover failures, handover delays, data loss, and ping-pong effects. 6G cell-free communication will overcome all this and provide better QoS.

Cell-free communication is defined as "a system in which a large number of geographically distributed antennas (APs) cooperatively serve a small number of terminals using the same time/frequency resources with the help of a fronthaul network and a CPU". A single terminal is served by a set of multiple APs, which is called an AP cluster. There are several ways to form AP clusters, among which the method of configuring AP clusters with APs that can significantly contribute to improving the reception performance of the terminal is called the terminal-centered clustering method, and when using this method, the configuration is dynamically updated as the terminal moves. By adopting this device-centric AP clustering technique, the device is always at the center of the AP cluster and is therefore free from inter-cluster interference that can occur when the device is located at the boundary of the AP cluster. This cell-free communication will be achieved through multi-connectivity and multi-tier hybrid technologies and different heterogeneous radios in the device.

Integration of Wireless Information and Energy Transfer (WIET)

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Integration of Wireless Communication and Sensing

An autonomous wireless network is a function for continuously detecting a dynamically changing environment state and exchanging information between different nodes. In 6G, sensing will be tightly integrated with communication to support autonomous systems.

Integrated Access and Backhaul Network

In 6G, the density of access networks will be enormous. Each access network is connected by optical fiber and backhaul connection such as FSO network. To cope with a very large number of access networks, there will be a tight integration between the access and backhaul networks.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Reconfigurable Intelligent Surface

There is a large body of research that considers the radio environment as a variable to be optimized along with the transmitter and receiver. The radio environment created by this approach is referred to as a Smart Radio Environment (SRE) or Intelligent Radio Environment (IRE) to highlight its fundamental differences from past design and optimization criteria. Various terms have been proposed for the reconfigurable intelligent antenna (or intelligent reconfigurable antenna technology) technology that enables SRE, including Reconfigurable Metasurfaces, Smart Large Intelligent Surfaces (SLIS), Large Intelligent Surfaces (LIS), Reconfigurable Intelligent Surface (RIS), and Intelligent Reflecting Surface (IRS).

In the case of THz band signals, there are many shadowed areas caused by obstacles due to the strong straightness of the signal, and RIS technology is important to expand the communication area by installing RIS near these shadowed areas, strengthening communication stability and enabling additional value-added services. RIS is an artificial surface made of electromagnetic materials that can alter the propagation of incoming and outgoing radio waves. While RIS can be seen as an extension of massive MIMO, it has a different array structure and operating mechanism than massive MIMO. RIS also has the advantage of lower power consumption because it operates as a reconfigurable reflector with passive elements, meaning it only passively reflects the signal without using an active RF chain. In addition, each of the passive reflectors in the RIS must independently adjust the phase shift of the incident signal, which can be advantageous for wireless communication channels. By properly adjusting the phase shift through the RIS controller, the reflected signal can be gathered at the target receiver to boost the received signal power.

In addition to reflecting radio signals, there are also RISs that can adjust transmission and refraction properties, and these RISs are mainly used for O2I (Outdoor to Indoor). Recently, STAR-RIS (Simultaneous Transmission and Reflection RIS), which provides transmission while reflecting, has also been actively researched.

Metaverse

Metaverse is a portmanteau of the words "meta" meaning virtual, transcendent, and "universe" meaning space. Generally speaking, the metaverse is a three-dimensional virtual space where the same social and economic activities as in the real world are commonplace.

Extended Reality (XR), a key technology enabling the Metaverse, is the fusion of the virtual and the real, which can extend the experience of reality and provide a unique sense of immersion. The high bandwidth and low latency of 6G networks will enable users to experience more immersive virtual reality (VR) and augmented reality (AR) experiences.

Autonomous Driving, Self-Driving

For perfect autonomous driving, vehicles must communicate with each other to inform each other of dangerous situations, or with infrastructure such as parking lots and traffic lights to check information such as the location of parking information and signal change times. Vehicle-to-Everything (V2X), a key element in building an autonomous driving infrastructure, is a technology that enables vehicles to communicate and share information with various elements on the road, such as vehicle-to-vehicle (V2V) and vehicle-to-infrastructure (V2I), for autonomous driving.

In order to maximize the performance of autonomous driving and ensure high safety, fast transmission speeds and low latency technologies are essential. In addition, in the future, autonomous driving will go beyond delivering warnings and guidance messages to the driver to actively intervene in vehicle operation and directly control the vehicle in dangerous situations, and the amount of information that needs to be transmitted and received will be enormous, so 6G is expected to maximize autonomous driving with faster transmission speeds and lower latency than 5G.

Unmanned Aerial Vehicle (UAV)

An unmanned aerial vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Block-Chain

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The blockchain is managed through a peer-to-peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IoT systems, and large-scale connection stability of 6G communication systems.

The Present Disclosure of the Present Specification

1. First Disclosure of the Present Specification

Conventionally, in a single carrier in the FR1 band, a 4Tx-based 29 dBm high-power terminal was not supported. It is necessary to support a 29 dBm high power terminal based on 4Tx.

To this end, UE Tx Radio Frequency (RF) standard performance standards related to 4Tx-based 29 dBm high-power terminals should be defined. For example, for a 4Tx-based 29 dBm high-power terminal, a Tx RF performance standard, Maximum Power Reduction (MPR), can be defined.

In the disclosure of the present specification, a transmission performance requirement standard of a terminal for an FR1 terminal supporting 4Tx will be described. For example, MPRs are proposed. In addition, in the present disclosure of the present specification, related standards including Uplink Multiple-Input Multiple-Output (UL-MIMO) will be described.

1-1. Existing FR1 Terminal Transmission Requirements

First, the existing FR1 terminal transmission requirements will be described. FR1 terminal transmission requirements may include, for example, FR1 Power Class, UL-MIMO (2 layers), and MPR for UL-MIMO (2 layers).

FR1 power class is described.

The transmission requirements of the conventional FR1 terminal are determined by considering up to 2 Tx (i.e., two transmission antennas).

According to the output power at the antenna connector, the power class (PC) of the terminal is defined as follows. Here, in the case of two transmission antennas, the power class is defined as the sum of the total power of each antenna output terminal.

Power Class 3(PC3)=23 dBm

Power Class 2(PC2)=26 dBm

Power Class 1.5(PC1.5)=29 dBm

PC3, PC2, and PC1.5 are supported based on the Power Amplifier (PA) below.

PC3(23 dBm):

1Tx(1PA): 23 dBm

2Tx(2PA): 23 dBm+23 dB. In this case, (3-3)+(23-3) dBm, 3 dB power back off is performed for each 23 dBm PA.

PC2(26 dBm):

1Tx(1PA): 26 dBm

2Tx(2PA): 23 dBm+23 dBm→FullPwrMode1.

2Tx(2PA): 23 dBm+26 dBm→FullPwrMode2. In this case, 3 dB power back off is performed for 23+(26-3) dBm, 26 dBm PA.

2Tx(2PA): 26 dBm+26 dBm→FullPwrMode. In this case, (36-3)+(26-3) dBm, 3 dB power back off is performed for each 26 dBm PA.

PC1.5(29 dBm)

2Tx(2PA): 26 dBm+26 dBm

Here, FullPwrMode, FullPwrMode1, and FullPwrMode2 will be described as follows.

The uplink full power transmission mode may be set for the terminal supporting the UL-MIMO. Uplink full power transmission mode includes 'FullPwrMode1', 'FullPwrMode2', 'FullPwrMode'.

The FullPwrMode1 terminal may be a terminal in which the sum of the transmission power of the entire antenna connector of the UL-MIMO satisfies the corresponding 'ue_PowerClass'. The FullPwrMode2 terminal may be a terminal in which the transmission power of one of the entire antenna connections of UL-MIMO satisfies the corresponding 'ue_PowerClass'. The FullPwrMode terminal may be a terminal in which the transmission power of each antenna connector of the UL-MIMO satisfies the corresponding 'ue_PowerClass'. For example, the terminal may transmit capability information including information about its Uplink full power transmission mode to the base station.

Figure 7B:
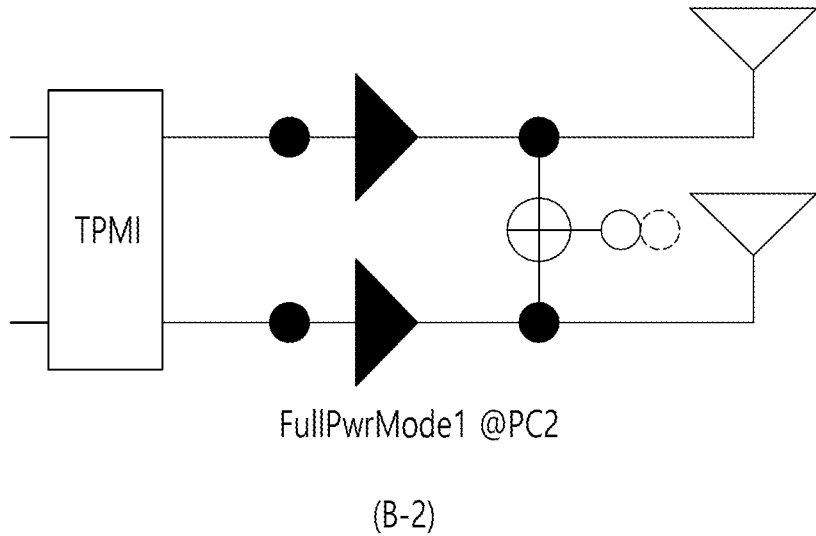
Figure 7C:
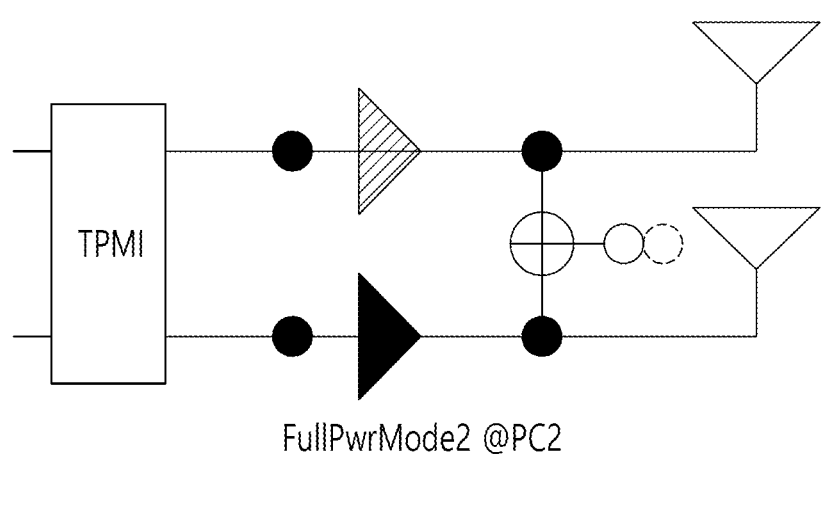

Examples of full power transmission may refer to (B-1), (B-2), and (B-3) of FIGS. 7A to 7C.

UL-MIMO (2 Layer) is described.

The PC3 terminal standard, the PC2 terminal standard, and the PC1 terminal standard supporting the two-layer UL-MIMO may be as follows. For example, based on the Transmit Precoding Matrix Indicator $$(TPMI) = 0\left(W = \frac{1}{\sqrt{2}}\begin{bmatrix} 1 & 0 \\ 0 & 1 \end{bmatrix}\right),$$

of FIG. 10, one SRS resource, and two SRS antenna ports, PC3 terminal standards, PC2 terminal standards, and PC1 terminal standards can be defined.

Methods of implementing 2PA of 2Tx terminals include 23 dBm+23 dBm, 23 dBm+26 dBm, 26 dBm+26 dBm, etc. For example, if the 2PA implementation method of the 2Tx terminal is 23 dBm+26 dBm, it may mean that one of the two PAs of the terminal has a maximum output of 23 dBm and the other maximum output of 26 dBm. The terminal can support power corresponding to the signaling 'ul-Power Class' transmitted to the base station using uplink full power transmission mode (FullPwrMode1, FullPwrMode2, and FullPwrMode). The terminal may inform the network of capability including information on the uplink full power transmission mode.

In the case of a PC3 terminal supporting a two-layer UL-MIMO, it may be designated as a PC3 based on the 'ue_PowerClass' signal information. If these terminals transmit to two antenna ports, the total transmission power sum at the two antenna connectors must satisfy 23 dBm for the following two cases:

when the 2 layer UL-MIMO is set to the terminal when the 1 layer UL-MIMO is set to the terminal In the case of 1 layer UL-MIMO, in the following TPMI, the transmission power at one antenna connector shall satisfy 23 dBm:

TPMI=0 or 1 (corresponding to $$W = \frac{1}{\sqrt{2}}\begin{bmatrix} 1 \\ 0 \end{bmatrix}, \frac{1}{\sqrt{2}}\begin{bmatrix} 0 \\ 1 \end{bmatrix})$$

in FIG. 9)

The terminal may transmit by switching from two antenna ports to one antenna port. In this case, it is defined that the transmission power at one antenna connector of the terminal must satisfy 23 dBm:

For No UL-MIMO Settings

For reference, it is assumed that the uplink full power transmission mode is not applied to the PC3 terminal. This is because the PC3 terminal basically uses 23 dBm PA. When the uplink full power transmission mode is set in the PC3 terminal, it may be assumed that 'FullPwrMode' is set.

In the case of a PC2 terminal supporting a two-layer UL-MIMO, it may be designated as a PC2 based on the 'ue_PowerClass' signal information. If these terminals transmit to two antenna ports, the total transmission power sum at the two antenna connectors shall satisfy 26 dBm for the following two cases:

When the 2 layer UL-MIMO is set to the terminal

When 1 layer UL-MIMO is set to the terminal

For 1 layer UL-MIMO, if uplink full power transmission mode is supported,

FullPwrMode1: based on $$TPMI = 2\left(W = \frac{1}{\sqrt{2}}\begin{bmatrix}1\\1\end{bmatrix}\right)$$

(FIG. 9), the total transmission power sum of 26 dBm at the two antenna connectors is satisfied. It is applied to 23 dBm+23 dBm PA terminals.

FullPwrMode2: TPMI=0 or 1 (corresponding $$W = \frac{1}{\sqrt{2}}\begin{bmatrix}1\\0\end{bmatrix}, \frac{1}{\sqrt{2}}\begin{bmatrix}0\\1\end{bmatrix}$$

in FIG. 9), satisfies the transmission power of 26 dBm at one antenna connector. It is applied to 23 dBm+26 dBM PA terminals.

FullPwrMode2: TPMI=0 or 1 (corresponding $$W = \frac{1}{\sqrt{2}}\begin{bmatrix}1\\0\end{bmatrix}, \frac{1}{\sqrt{2}}\begin{bmatrix}0\\1\end{bmatrix})$$

in FIG. 9), satisfies the transmission power of 26 dBm at one antenna connector. It is applied to 23 dBm+26 dBM PA terminals.

When such a terminal switches to one antenna port and transmits (no UL-MIMO), the following may be applied depending on whether 'txDiversity-r16' is supported:

If 'txDiversity-r16' is not specified, the transmit power of 26 dBm at one antenna connector is satisfied.

When 'txDiversity-r16' is specified, the sum of transmit power at two antenna connectors is 26 dBm.

In the case of a PC1.5 terminal supporting 2 layer UL-MIMO, it is designated as PC1.5 based on the 'ue_PowerClass' signal information. When such a terminal transmits through two antenna ports, for the following two cases, the total transmit power sum of the two antenna connectors must satisfy 29 dBm:

When 2 layer UL-MIMO is set;

When 1 layer UL-MIMO is set. In this case, TPMI=2, 3, 4 or 5 (in FIG. 9, corresponding $$W = \frac{1}{\sqrt{2}}\begin{bmatrix}1\\1\end{bmatrix}, \frac{1}{\sqrt{2}}\begin{bmatrix}1\\-1\end{bmatrix}, \frac{1}{\sqrt{2}}\begin{bmatrix}1\\j\end{bmatrix}, \frac{1}{\sqrt{2}}\begin{bmatrix}1\\-j\end{bmatrix})$$

are applied. TPMI=0 and 1 do not apply.

For PC1.5 terminals that support two-layer UL-MIMO, the uplink full power transmission mode may not be applied (29 dBm PA is not considered, and only 26 dBm+26 dBm is considered). When the terminal switches to one antenna port and transmits it (no UL-MIMO), it is assumed that 'txDiversity-r16' is supported. In this case, 'txDiversity-r16' may be designated. For example, the sum of the transmission power at the two antenna connectors must be 29 dBm.

FIGS. 6 to 8 below show examples of 1Tx, 2Tx supporting UL-MIMO, and 2Tx supporting Tx diversity.

The following drawings are intended to illustrate specific embodiments of the present disclosure. The designations of specific devices or the designations of specific signals/messages/fields shown in the drawings are for illustrative purposes only, and the technical features of the present specification are not limited to the specific designations used in the drawings below.

FIG. 6 illustrates an example of a 1Tx terminal according to an embodiment of the present specification. FIGS. 7A to 7C illustrate an example of a 2Tx terminal supporting a UL-MIMO according to an embodiment of the present specification. FIG. 8 illustrates an example of a 2 Tx terminal supporting Tx diversity according to an embodiment of the present specification.

Examples of FIGS. 6 to 8 illustrate examples of 1Tx terminals based on one antenna port, 2Tx terminals supporting UL-MIMO based on two antenna ports, and 2Tx terminals supporting Tx diversity based on one antenna port.

In the examples of FIGS. 6 to 8, a location of an antenna port and a location of an antenna end are illustrated. In addition, the location where the Maximum of Power (MOP) is measured and the location where the Maximum Power Reduction (MPR) is measured are displayed. For example, the sum of transmission power and MPR are measured at the antenna end position. Examples of FIGS. 6 to 8 illustrate 1Tx and 2Tx (UL-MIMO & Tx Diversity) examples. For reference, in the present disclosure, an antenna terminal may refer to an antenna connector.

For reference, in FIGS. 6 to 8, FIGS. 11A to 11C, and FIGS. 18 to 21A to 21G, the right-facing triangle represents PA. The dotted lines shown in the drawings, the various kinds of circles, and the "+" symbol shown in the circle are all displayed for conceptual explanation. These figures are shown in the drawings to help understanding from a hardware perspective, and may not actually be implemented in hardware. For example, the number of layers may mean the number of lines before TPMI is applied. The number of antenna ports may be applied after TPMI is applied. The number of antenna terminals may be applied after PA. The "+" symbol displayed in the circle may mean that the sum of the outputs of the four PAs is measured. Located on the right side of the "+" shown in the circle, the nearest circle means that the MOP, which is the sum of the transmission power, is measured. The following circle may mean measuring MPR.

Examples of FIGS. 6 to 8 may be described as follows.

An example of FIG. 6 illustrates an example of a 1 Tx terminal:

(A-1): 23 dBm(PC3)

(A-2): 26 dBm(PC2)

Examples of FIGS. 7A to 7C describe an example of a 2Tx (UL-MIMO) terminal:

For (B-1), 1) 26 dBm(PC2): FullPwrMode, 2) 29 dBm (PC1.5): FullPwrMode1

(B-2): 26 dBm(PC2): FullPwrMode1

(B-3): 26 dBm(PC2): FullPwrMode2

The example of FIG. 8 describes an example of a 2 Tx (Tx Diversity) terminal:

For (C-1), 1) 26 dBm (PC2) 2) 29 dBm (PC1.5)

Regarding the above UL-MIMO, TPMI is defined based on the tables shown in the examples of FIG. 9 and FIG. 10 according to layer 1 and layer 2.

The following drawings are intended to illustrate specific embodiments of the present disclosure. The designations of specific devices or the designations of specific signals/messages/fields shown in the drawings are for illustrative purposes only, and the technical features of the present specification are not limited to the specific designations used in the drawings below.

FIG. 9 shows an example of a precoding matrix for single-layer transmission using two antenna ports according to an embodiment of the present specification. FIG. 10 shows an example of a precoding matrix for two-layer transmission using two antenna ports according to an embodiment of the present specification.

The example of FIG. 9 shows an example of a precoding matrix W used for single-layer transmission when the UE uses two antenna ports. The example of FIG. 10 shows an example of a precoding matrix W used for two-layer transmission when the UE uses two antenna ports.

In the examples of FIGS. 9 and 10, the leftmost TMPI index is an index corresponding to 0 which is the smallest value. It is arranged in ascending order from left to right.

An MPR for a terminal supporting a two-layer UL-MIMO will be described.

MPR (Maximum Power Reduction) requirements are defined for PC3 terminals, PC2 terminals, and PC1 terminals that support 2 layer UL-MIMO.

An MPR of a PC3 terminal supporting a two-layer UL-MIMO will be described.

In the case of a PC3 terminal supporting a two-layer UL-MIMO, it may be designated as a PC3 in the 'ue_PowerClass' signal information.

The PC3 terminal may transmit to two antenna ports. In this case, as in the following two examples, MPR for the total transmission power sum in the two antenna connectors is applied. For example, for 2 layer UL-MIMO and 1 layer UL-MIMO, the existing 1Tx PC3 MPR is applied as it is:

In case of PC3 2 layer UL-MIMO, MPR=PC3_1Tx MPR

In case of PC3 1 layer UL-MIMO, MPR=PC3_1Tx MPR

In the case of 1 layer UL-MIMO, in the following TPMI, the MPR for the transmission power at one antenna connector is applied equally to the existing 1Tx PC3 MPR:

TPMI=0 or 1 (corresponding to $$W = \frac{1}{\sqrt{2}}\begin{bmatrix}1\\0\end{bmatrix}, \frac{1}{\sqrt{2}}\begin{bmatrix}0\\1\end{bmatrix}$$

in FIG. 9)

The UE may transmit a signal by switching to one antenna port. In this case, the existing 1Tx PC3 MPR is applied as the MPR for the transmission power in the one-antenna connector.

For reference, 1Tx PC3 MPR is defined as shown in Table 6 below.

TABLE 6

| | | MPR (dB) | | |
|---|---|---|---|---|
| Modulation | | Edge RB allocations | Outer RB allocations | Inner RB allocations |
| DFT-s- OFDM | Pi/2 BPSK | ≤3.5 (NOTE 1 applied) | ≤1.2 (NOTE 1 applied) | ≤0.2 (NOTE 1 applied) |
| | | ≤0.5 (NOTE 2 applied) | ≤0.5 (NOTE 2 applied) | 0 (NOTE 2 applied) |
| | Pi/2 BPSK w Pi/2 BPSK | ≤0.5 (NOTE 2 applied) | 0 (NOTE 2 applied) | 0 (NOTE 2 applied) |

TABLE 6-continued

| | | MPR (dB) | | |
|---|---|---|---|---|
| Modulation | | Edge RB allocations | Outer RB allocations | Inner RB allocations |
| | DMRS | | | |
| | QPSK | ≤1 | | 0 |
| | 16 QAM | ≤2 | | ≤1 |
| | 64 QAM | ≤2.5 | | |
| | 256 QAM | ≤4.5 | | |
| CP- OFDM | QPSK | ≤3 | | ≤1.5 |
| | 16 QAM | ≤3 | | ≤2 |
| | 64 QAM | ≤3.5 | | |
| | 256 QAM | ≤6.5 | | |

An example of Table 6 shows an example of MPR applied to a UE of 1Tx PC3. For example, for Table 6, see Table 6.2.2-1 Maximum power reduction (MPR) for power class 3 in TS38.101-1 V17.6.0. For reference, in the present disclosure of the present specification, DFT-s-OFDM may mean Discrete Fourier Transform spread OFDM (Orthogonal Frequency Division Multiplexing). CP-OFDM may mean cyclic prefix OFDM. Pi/2 BPSK may mean Pi/2 Binary Phase-Shift Keying. QPSK may mean Quadrature Phase Shift Keying. QAM may mean Quadrature Amplitude Modulation.

In the example of Table 6, NOTE 1 and NOTE 2 mean the following.

NOTE 1: If UE indicates that the UE supports the UE function powerBoosting-pi2BPSK, IE powerBoost-Pi2BPSK is configured to 1, and less than 40% of slots of radio frames are used for UL transmission in bands n40, n41, n77, n78 and n79, applies to UEs operating in TDD mode with Pi/2 BPSK modulation. The reference power for 0 dB MPR is 26 dBm.

NOTE 2: If IE powerBoostPi2BPSK is set to 0, and more than 40% of the slots in the radio frame are used for UL transmission in the bands n40, n41, n77, n78 and n79, it can be applied to UE operating in TDD mode in bands other than n40, n41, n77, n78, and n79.

An MPR of a PC2 terminal supporting a two-layer UL-MIMO will be described.

In the case of a PC2 terminal supporting a two-layer UL-MIMO, it is designated as a PC2 in the 'ue_PowerClass' signal information.

The PC2 terminal may transmit to two antenna ports. In this case, as in the following two examples, MPR for the total transmission power sum in the two antenna connectors is applied. For example, for 2 layer UL-MIMO and 1 layer UL-MIMO, MPR is defined as follows:

In case of PC2 2 layer UL-MIMO, MPR=PC2_2Tx_MPR

In case of PC2 1 layer UL-MIMO, MPR=PC2_2Tx_MPR

A PC2 terminal supporting 2 layer UL-MIMO may support FullPwrMode1 among uplink full power transmission modes. In this case, depending on whether 'Tx diversity' is supported, it is defined that the PC2 terminal must satisfy the following MPR:

If 'Tx diversity' is specified, MPR=PC2_2Tx_MPR

If 'Tx diversity' is not specified, MPR=PC2_1Tx_MPR

If 'Tx diversity' is not specified, the terminal must include at least one 26 dBm PA to support 26 dBm 'ue_PowerClass'. For example, the terminal has two PA (e.g., 26 dBm PA+23 dBm PA), and can support 'FullPwrMode1' by applying 3 dB power back off for 26 dBm PA. For another example, the terminal has two PA (e.g., 26 dBm PA+26 dBm PA), and can support 'FullPwrMode1' by applying 3 dB power back off to each of the two 26 dBm PA.

If a PC2 terminal supports two-layer UL-MIMO supports 'FullPwrMode' or 'FullPwrMode2' during uplink full power transmission mode, PC2_1Tx_MPR must be satisfied.

If a PC2 terminal supports two-layer UL-MIMO switches to one antenna port and transmits signal, 'FullPwrMode' or 'FullPwrMode2' may be designated. In this case, the existing 1Tx PC2 MPR should be applied as it is to the MPR for transmission power at least one antenna connector.

MPR=PC2_1Tx_MPR

An MPR for a 1Tx PC2 terminal is defined as an example in Table 7, and an MPR for a 2Tx PC2 terminal is defined as an example in Table 8.

TABLE 7

| | Modulation | MPR (dB) | | |
| --- | --- | --- | --- | --- |
| | | Edge RB allocations | Outer RB allocations | Inner RB allocations |
| DFT-s- | Pi/2 BPSK | ≤3.5 | ≤0.5 | 0 |
| OFDM | QPSK | ≤3.5 | ≤1 | 0 |
| | 16 QAM | ≤3.5 | ≤2 | ≤1 |
| | 64 QAM | ≤3.5 | ≤2.5 | |
| | 256 QAM | | ≤4.5 | |
| CP- | QPSK | ≤3.5 | ≤3 | ≤1.5 |
| OFDM | 16 QAM | ≤3.5 | ≤3 | ≤2 |
| | 64 QAM | | ≤3.5 | |
| | 256 QAM | | ≤6.5 | |

An example of Table 7 shows an example of MPR applied to a UE of 1Tx PC2. For example, for Table 7, see Table 6.2.2-2 Maximum power reduction (MPR) for power class 2 in TS38.101-1 V17.6.0.

TABLE 8

| | Modulation | MPR (dB) | | |
| --- | --- | --- | --- | --- |
| | | Edge RB allocations | Outer RB allocations | Inner RB allocations |
| DFT-s- | Pi/2 BPSK | ≤3.5 | ≤1 | 0 |
| OFDM | QPSK | ≤3.5 | ≤2 | 0.5 |
| | 16 QAM | ≤3.5 | ≤2.5 | ≤1.5 |
| | 64 QAM | ≤3.5 | ≤3 | |
| | 256 QAM | | ≤5.5 | |
| CP- | QPSK | ≤4.0 | ≤3.5 | ≤2 |
| OFDM | 16 QAM | ≤4.0 | ≤3.5 | ≤2.5 |
| | 64 QAM | | ≤4.5 | |
| | 256 QAM | | ≤8.0 | |

An example of Table 8 shows an example of MPR applied to a UE of 2Tx PC2. For example, for Table 8, see Table 6.2D.2-1 Maximum power reduction (MPR) for power class 2 with dual Tx in TS38.101-1 V17.6.0.

An MPR of a PC1.5 terminal supporting a two-layer UL-MIMO will be described.

In the case of a PC1.5 terminal that supports two-layer UL-MIMO, it is designated as PC1.5 in the ue_PowerClass' signal information.

The terminal may transmit to two antenna ports. In this case, as in the following two examples, MPR for the total transmission power sum in the two antenna connectors is applied. For example, for 2 layer UL-MIMO and 1 layer UL-MIMO, 2Tx (26 dBm+26 dBm) is assumed, and MPR is defined as follows:

In case of PC1.5 terminal supporting 2 layer UL-MIMO, MPR=PC1.5_2Tx_MPR

In case of PC1.5 terminal supporting 1 layer UL-MIMO, MPR=PC1.5_2Tx_MPR

In the case where the terminal switches to one antenna port and transmits it, it has not been considered until now.

Here, the 2Tx PC1.5 MPR is defined as an example of Table 9 and Table 10 according to an anneal isolation value.

The example in Table 9 is an example of MPR considering an anneal isolation of 10 dB. Table 10 is an example of MPR considering an anneal isolation of 20 dB or above. In general, 10 dB of antenna isolation is assumed for handheld UE and vehicle UE, and antenna isolation of 20 dB or more is assumed for Fixed Wireless Access (FWA)/Customer Premises Equipment (CPE).

TABLE 9

| | Modulation | MPR (dB) | | |
| --- | --- | --- | --- | --- |
| | | Edge RB allocations | Outer RB allocations | Inner RB allocations |
| DFT-s- | Pi/2 BPSK | ≤6 | ≤[2] | ≤0.5 |
| OFDM | QPSK | ≤6.5 | ≤[2.5] | ≤0.5 |
| | 16 QAM | ≤6.5 | ≤[3.5] | ≤1.5 |
| | 64 QAM | ≤6.5 | ≤[4] | ≤3.5 |
| | 256 QAM | ≤6.5 | ≤6.5 | ≤[6.5] |
| CP- | QPSK | ≤6.5 | ≤[4.5] | ≤2 |
| OFDM | 16 QAM | ≤6.5 | ≤[4.5] | ≤2.5 |
| | 64 QAM | ≤6.5 | ≤[5] | ≤4.5 |
| | 256 QAM | ≤8.5 | ≤8.5 | ≤[8.5] |

An example of Table 9 is an example of MPR for a 2Tx PC1.5 UE based on antenna isolation of 10 dB. For example, for Table 9, see Table 6.2D.2-2 Maximum power reduction (MPR) for power class 1.5 with dual Tx in TS38.101-1 V17.6.0.

TABLE 10

| | Modulation | MPR (dB) | | |
| --- | --- | --- | --- | --- |
| | | Edge RB allocations | Outer RB allocations | Inner RB allocations |
| DFT-s- | Pi/2 BPSK | ≤6 | ≤1.5 | ≤0 |
| OFDM | QPSK | ≤6.5 | ≤2 | ≤0 |
| | 16 QAM | ≤6.5 | ≤3 | ≤1 |
| | 64 QAM | ≤6.5 | ≤3.5 | ≤3 |
| | 256 QAM | ≤6.5 | ≤5.5 | ≤5.5 |
| CP- | QPSK | ≤6.5 | ≤4 | ≤1.5 |
| OFDM | 16 QAM | ≤6.5 | ≤4 | ≤2 |
| | 64 QAM | ≤6.5 | ≤4.5 | ≤4 |
| | 256 QAM | ≤7.5 | ≤7.5 | ≤7.5 |

NOTE 1:
This table relates to large FWA foam pack with more than 20 dB or more antenna isolation.

The example in Table 10 is an example of MPR for 2Tx PC1.5 UE based on antenna isolation of 20 dB or more. For example, for Table 10, see Table 6.2D.2-3 Maximum power reduction (MPR) for power class 1.5 with dual Tx in TS38.101-1 V17.6.0.

1-2. Transmission Requirements of FR1 4Tx Terminal

Transmission requirements (e.g., RF requirements related to transmission) of the FR1 4Tx terminal will be described. For example, the transmission requirements of the FR1 4Tx terminal may include MPR.

In order to further improve uplink coverage than the existing 2Tx terminal's uplink coverage, a terminal with four transmission antennas will be introduced.

Figure 11A:
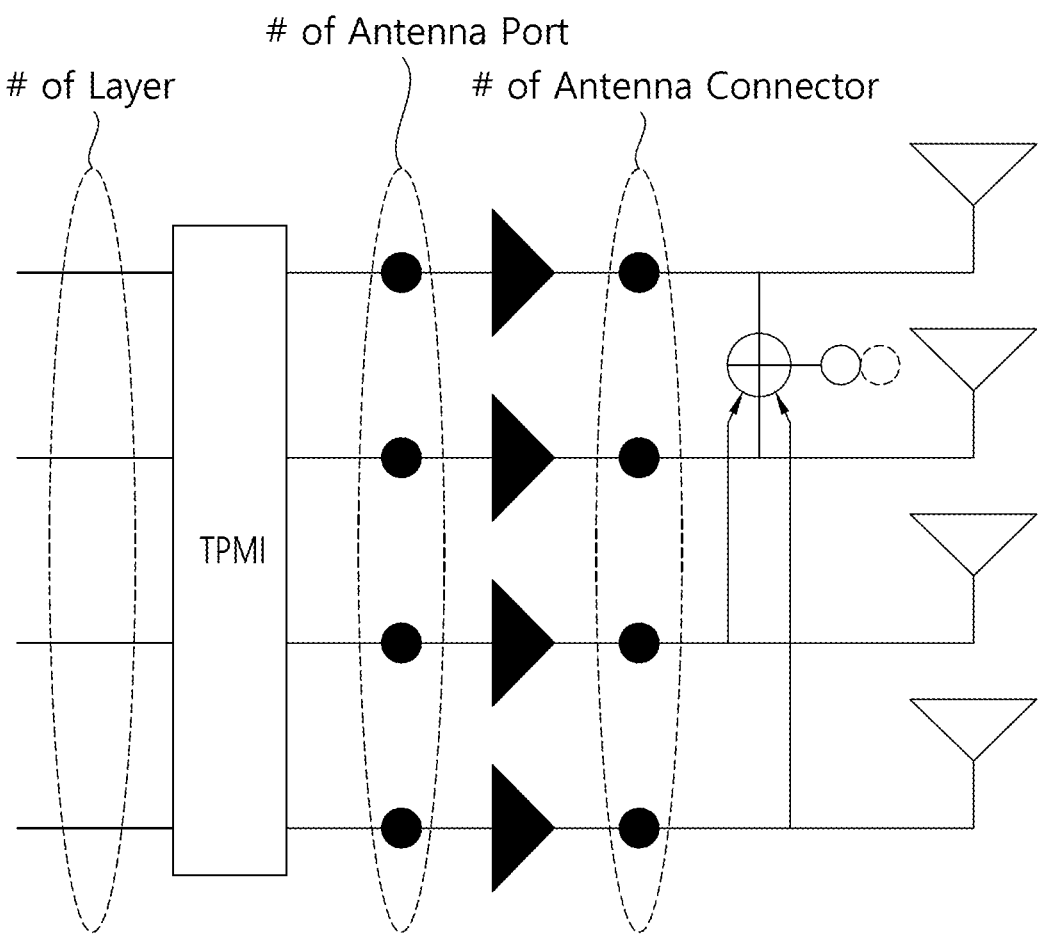
FIGS. 11A to 11C illustrate an example of a structure for transmitting a 4Tx terminal according to an embodiment of the present specification.
Figure 11B:
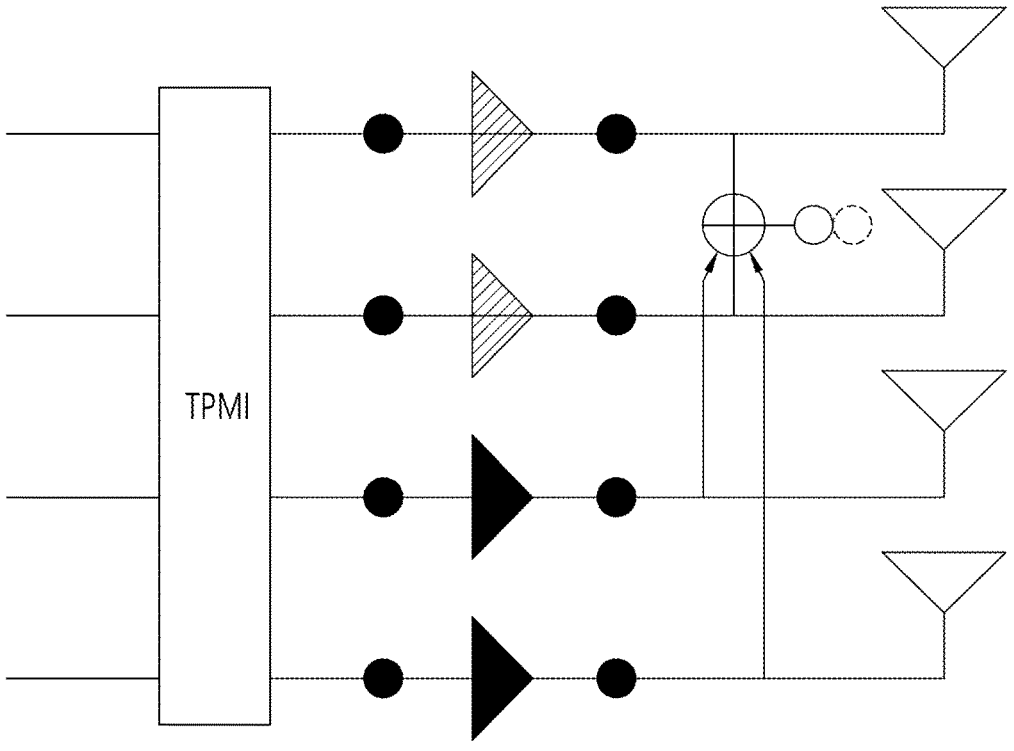
Figure 11C:
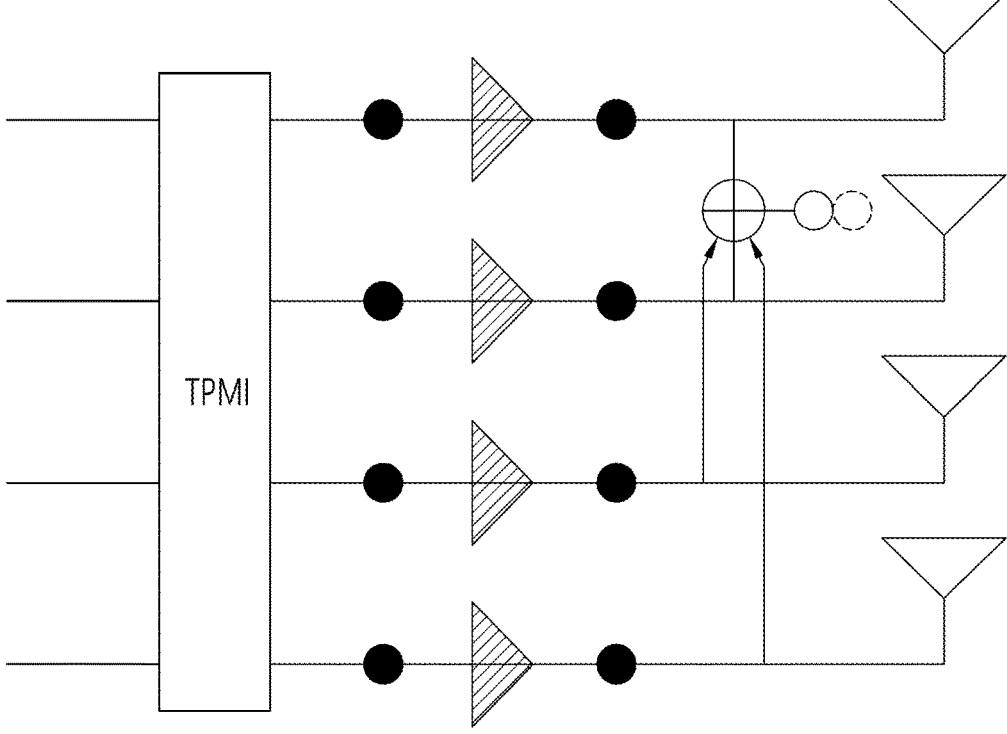

In relation to 4Tx, the terminal's the transmission PA structure may be as shown in cases 1 to 3 below. For example, based on 23 dBm PA and 26 dBm PA considered for current implementation, the following combination can be used as a terminal transmission PA structure for 4Tx:

Case 1: 23 dBm+23 dBm+23 dBm+23 dBm
Case 2: 26 dBm+26 dBm+23 dBm+23 dBm
Case 3: 26 dBm+26 dBm+26 dBm+26 dBm Examples of FIGS. 11A to 11C show PA structures of the terminal for Case1, Case2, and Case3.

The following drawings are intended to illustrate specific embodiments of the present disclosure. The designations of specific devices or the designations of specific signals/messages/fields shown in the drawings are for illustrative purposes only, and the technical features of the present specification are not limited to the specific designations used in the drawings below.

FIGS. 11A to 11C illustrate an example of a structure for transmitting a 4Tx terminal according to an embodiment of the present specification.

FIGS. 11A to 11C are examples of structures for transmission of a 4Tx terminal.

As described above, Case 1 is an example of a case where all four PAs are 23 dBm PAs. Case 2 is an example in which two PAs are 26 dBm PAs and two PAs are 23 dBm PAs. In Case 2, the top two PAs are 26 dBm PAs. The structure in which the 26 dBm PA and the 23 dBm PA are arranged is only an example, and the positions where the respective PAs are arranged may be different from the examples of FIGS. 11A to 11C. Case 3 is an example of a case where all four PAs are 26 dBm PAs.

Examples of terminal output power classes that can be supported with the example of Case 1, the example of Case 2, and the example of Case 3 are as follows:

PCs that Case 1 can support may include, for example, PCs based on 23 dBm, 26 dBm, and 29 dBm:

23 dBm(PC3)=(23−6)+(23−6)+(23−6)+(23−6) dBm. Here, the UE may perform 6 dB power back off for each 23 dBm PA;

26 dBm(PC2)=(23−3)+(23−3)+(23−3)+(23−3) dBm. Here, the UE may perform 3 dB power back off for each 23 dBm PA;

29 dBm(PC1.5)=23+23+23+23 dBm. Here, the UE does not apply power back off for each 23 dBm PA.

PCs that Case 2 can support may include, for example, PCs based on 23 dBm, 26 dBm, and 29 dBm:

23 dBm(PC3)=(23−6)+(23−6)+(26−9)+(26−9) dBm. Here, the UE may perform 6 dB power back off for each of the 23 dBm PAs and 9 dB power back off for each of the 26 dBm PAs;

26 dBm(PC2)=(23−3)+(23−3)+(26−6)+(26−6) dBm. Here, the UE may perform 3 dB power back off for each of the 23 dBm PAs and 6 dB power back off for each of the 26 dBm PAs;

29 dBm(PC1.5)=(23−0)+(23−0)+(26−3)+(26−3) dBm. Here, the UE may perform 3 dB power back off for each of the 26 dBm PAs without performing power back off for each of the 23 dBm PAs;

30.8 dBm=(23−0)+(23−0)+(26−0)+(26−0) dBm. Here, the UE may not perform power back off for both 23 dBm PAs and 26 dBm PAs. For 30.8 dBm output, the existing PC1 (31 dBm) can be applied or a new PC (e.g., PC1.1) can be defined.

PCs that Case 3 (e.g., 4×26 dBm) can support may include, for example, PCs based on 23 dBm, 26 dBm, and 29 dBm:

23 dBm(PC3)=(26−9)+(26−9)+(26−9)+(26−9) dBm. Here, the UE may perform 9 dB power back off for each of the 26 dBm PAs;

26 dBm(PC2)=(26−6)+(26−6)+(26−6)+(26−6) dBm. Here, the UE may perform 6 dB power back off for each of the 26 dBm PAs;

29 dBm(PC1.5)=(26−3)+(26−3)+(26−3)+(26−3) dBm. Here, the UE may perform 3 dB power back off for each of the 26 dBm PAs;

32 dBm=(26−0)+(26−0)+(26−0)+(26−0) dBm. Here, the UE does not perform power back off for all 26 dBm PAs. For 32 dBm output, a new PC can be defined. For example, PC0.9 may be defined.

As described in the examples of Cases 1 to 3, the terminal may or may not perform a backoff on the PA based on the structure of the terminal and the PC to be supported. Accordingly, the terminal may support 'ul_PowerClass' corresponding to each PC. The terminal may report 'ul_PowerClass' to the network.

Examples of precoding matrix W corresponding to TPMI index and TMPI index corresponding to 1 layer, 2 layer, 3 layer, and 4 layer for 4 antenna ports are as shown in the examples of FIGS. 12 to 15.

The following drawings are intended to illustrate specific embodiments of the present disclosure. The designations of specific devices or the designations of specific signals/messages/fields shown in the drawings are for illustrative purposes only, and the technical features of the present specification are not limited to the specific designations used in the drawings below.

FIG. 12 shows an example of a precoding matrix for 1-layer transmission using four antenna ports according to an embodiment of the present specification.

FIG. 13 shows an example of a precoding matrix for two-layer transmission using four antenna ports according to an embodiment of the present specification.

FIG. 14 shows an example of a precoding matrix for 3-layer transmission using four antenna ports according to an embodiment of the present specification.

FIG. 15 shows an example of a precoding matrix for 4-layer transmission using four antenna ports according to an embodiment of the present specification.

The example of FIG. 12 shows an example of a precoding matrix W used for 1-layer transmission when the UE uses four antenna ports. The example of FIG. 13 shows an example of a precoding matrix W used for two-layer transmission when the UE uses four antenna ports. The example of FIG. 14 shows an example of a precoding matrix W used for 3-layer transmission when the UE uses four antenna ports. The example of FIG. 15 shows an example of a precoding matrix W used for 4-layer transmission when the UE uses four antenna ports.

In the examples of FIGS. 12 to 15, the leftmost TMPI index is an index corresponding to 0 which is the smallest value. It is arranged in ascending order from left to right.

A 4Tx terminal may support UL-MIMO. In this case, the uplink full power transmission mode may be configured for the UE. For example, 'FullPwrMode1', 'FullPwrMode2', or 'FullPwrMode' may be set for the terminal. Based on 4Tx terminals, the following can be applied:

'FullPwrMode' terminal: In the case of a 4Tx terminal, a 'FullPwrMode' terminal is a terminal whose transmit power of each antenna connector satisfies the corresponding 'ue_PowerClass';

'FullPwrMode1' terminal: In the case of a 4Tx terminal, the 'FullPwrMode1' terminal is a terminal for which the sum of transmit powers of all antenna connectors satisfies the corresponding 'ue_PowerClass';

'FullPwrMode2' terminal: In the case of a 4Tx terminal, the 'FullPwrMode2' terminal is a terminal whose transmit power of one antenna out of all antenna connections satisfies the corresponding 'ue_PowerClass';

'FullPwrMode3' terminal: In the case of a 4Tx terminal, the 'FullPwrMode3' terminal is a terminal for which the sum of the transmit powers of the two antenna connectors satisfies the corresponding 'ue_PowerClass'.

'FullPwrMode4' terminal: In the case of a 4Tx terminal, the 'FullPwrMode4' terminal is a terminal in which the sum of the transmit powers of the two antenna connectors of the two pairs satisfies the respective 'ue_PowerClass'.

MPR in the case where the FR1 4Tx UE supports PC3 (23 dBm) and UL-MIMO will be described.

For each of the examples of Case 1 to Case 3, MPR when the UE supports PC3 (23 dBm), and UL-MIMO will be described.

In Case 1 (PA1, PA2, PA3, PA4 are all 23 dBm PAs), PC3 (23 dBm) UE can be designated as PC3 in 'ue_PowerClass' signal information.

When the UE transmits through 4 antenna ports, MPR may be applied to the total transmission power sum in 4 antenna connectors. In this case, for 4/3/2/1 layer UL-MIMO, it is proposed to apply the same MPR as the existing 1Tx PC3 MPR:

If the PC3 UE supports 4/3/2/1 layer UL-MIMO, the MPR may be the conventional PC3_1Tx MPR (e.g., Table 6.2.2-1 Maximum power reduction (MPR) for power class 3 [TS38.101-1 V17.6.0]).

For the UE, UL-MIMO ue full power mode can be configured. In this case, the following explanation may apply:

In the case of 'FullPwrMode' or 'FullPwrMode2', for a 4Tx terminal, the transmission power of 1 antenna connector may be 'ue_PowerClass'=PC3. In this case, as the MPR for the UE, the existing 1Tx PC3 MPR may be applied as it is. For example, the MPR may be the same as the conventional PC3_1Tx MPR (e.g., Table 6.2.2-1 Maximum power reduction (MPR) for power class 3 [TS38.101-1 V17.6.0]).

In the case of 'FullPwrMode3' or 'FullPwrMode4', for the 4Tx terminal, the sum of the transmission power of the two antenna connecting ends may be 'ue_PowerClass'=PC3. In this case, the existing 1Tx PC3 MPR may be applied as the MPR for the terminal. For example, MPR can be the same as conventional PC3_1Tx MPR (e.g., Table 6.2.2-1 Maximum power reduction (MPR) for power class 3 [TS38.101-1 V17.6.0]).

In the case of 'FullPwrMode1', the sum of the transmission power of the four antenna connecting ends may be 'ue_PowerClass'=PC3 for the 4Tx terminal. In this case, the existing 1Tx PC3 MPR may be applied as it is as MPR for the terminal. For example, MPR can be the same as conventional PC3_1Tx MPR (e.g., Table 6.2.2-1 Maximum power reduction (MPR) for power class 3 [TS38.101-1 V17.6.0]).

FR1 4Tx UE supporting PC3 (23 dBm) and UL-MIMO can switch to one antenna port to transmit signals. In this case, the following example may be applied:

If the UE designates 'txDiversity-r16', the sum of transmission power at the two antenna connecting ends may be 'ue_PowerClass'=PC3. In this case, MPR can be the same as the existing 1Tx PC3_1Tx MPR (e.g., Table 6.2.2-1 Maximum power reduction (MPR) for power class 3 [TS38.101-1 V17.6.0]). For reference, in the disclosure of the present specification, the subject designating 'txDiversity-r16' may be a UE.

If 'txDiversity-r16' is not specified, the transmission power at one antenna connector may be 'ue_PowerClass'=PC3. In this case, the MPR for this may be the same as the existing 1Tx PC3_1Tx MPR (e.g., Table 6.2.2-1 Maximum power reduction (MPR) for power class 3 [TS38.101-1 V17.6.0]).

In the case of Case 2 (PA1 and PA2 are 26 dBm PA, and PA3 and PA4 are 23 dBm PA), MPR may be defined in the same manner as Case 1.

In the case of Case 3 (PA1, PA2, PA3, and PA4 are all 26 dBm PA), MPR may be defined in the same manner as Case 1.

MPR for FR1 4Tx UE supporting PC2 (26 dBm) and UL-MIMO will be described.

For each example of Case 1 to Case 3, MPR when the UE supports PC2 (26 dBm), and UL-MIMO is described.

In Case 1 (PA1, PA2, PA3, PA4, all 23 dBm), PC2 (26 dBm) UE can be designated as PC2 in the 'ue_PowerClass' signal information.

When the UE transmits signals based on four antenna ports, MPR may be applied to the total transmission power sum at four antenna connectors. In this case, for 4/3/2/1 layer UL-MIMO, the existing 2Tx PC2 MPR may be used as the MPR. This is because the existing 2Tx PC2 MPR was standardized based on on a 23 dBm+23 dBm, and the 4Tx Case1 PC2 can be assumed to be (20 dBm+20 dBm)+(20 dBm+20 dBm)=23 dBm+23 dBm. For reference, in the case of the existing 2Tx PC3 UL-MIMO, (23 dBm-3 dB power back off)+(23 dBm-3 dB power back off)=(20 dBm+20 dBm)=23 dBm is assumed, and PC3_1Tx MPR was applied. The following description applies:

If the PC2 UE supports 4/3/2/1 layer UL-MIMO, the MPR may be the same as the conventional PC2_2Tx MPR (e.g., Table 6.2D.2-1 Maximum power reduction (MPR) for power class 2 with dual Tx [TS38.101-1 V17.6.0].

When UL-MIMOue full power mode is set, the following description may be applied:

In the case of 'FullPwrMode3' or 'FullPwrMode4', for the 4Tx terminal, the sum of the transmission power of the two antenna connecting ends may be 'ue_PowerClass'=PC2. In this case, the existing 2Tx PC2 MPR may be applied to the MPR for the terminal as it is. For example, MPR can be the same as conventional PC2_2Tx MPR (e.g., Table 6.2D.2-1 Maximum power reduction (MPR) for power class 2 with dual Tx [TS38.101-1 V17.6.0]).

In the case of 'FullPwrMode1', the sum of the transmission power of the four antenna connecting ends may be 'ue_PowerClass'=PC2 for the 4Tx terminal. In this case, the existing 2Tx PC2 MPR may be applied to the MPR for the terminal as it is. For example, MPR can be the same as conventional PC2_2Tx MPR (e.g., Table 6.2D.2-1 Maximum power reduction (MPR) for power class 2 with dual Tx [TS38.101-1 V17.6.0]).

In Case 1, FR1 4Tx UE supporting PC2 (26 dBm) and UL-MIMO can switch to one antenna port to transmit signals. In this case, the following example may be applied:

If 'txDiversity-r16' is designated, the sum of transmission power at the two antenna connecting ends may be 'ue_PowerClass'=PC2. In this case, MPR can be the same as the existing 2Tx PC2 MPR (e.g., Table 6.2D.2-1 Maximum power reduction (MPR) for power class 2 with dual Tx [TS38.101-1 V17.6.0]).

Alternatively, a terminal capability for the number of antennas supporting tx diversity may be newly added. For example, this capability may be defined as 'txDiversity-r18'. For example, it may be defined in the following form:
'txDiversity-r18'=2, 3, 4; or
'txDiversity2-r18', 'txDiversity3-r18', 'txDiversity4-r18'.

If 'txDiversity-r18' is newly defined, the following description may be applied. If the terminal switches to one antenna port and transmits (no UL-MIMO), the following description may be applied according to the terminals, the 'txDiversity-r18' capability below:
In the case of 'txDiversity-r18'=2 (or 'txDiversity2-r18'), the sum of transmission power at the two antenna connectors may satisfy the corresponding 'ue_Power-Class';
In the case of 'txDiversity-r18'=3 (or 'txDiversity3-r18') the sum of transmission power at the three antenna connectors may satisfy the corresponding 'ue_Power-Class'; or
In the case of 'txDiversity-r18'=4 (or 'txDiversity4-r18'), the sum of transmission power at the four antenna connectors may satisfy the corresponding 'ue_Power-Class'.

The terminal may designate 'txDiverisity-r18=4'. In this case, the sum of transmission power at the four antenna connectors may be 'ue_PowerClass'=PC2. For reference, in the disclosure of the present specification, both an antenna end and an antenna connector may mean an antenna connector. In this case, the MPR may be the same as the existing 2Tx PC2 MPR (e.g., Table 6.2D.2-1 Maximum power reduction (MPR) for power class 2 with dual Tx [TS38.101-1 V17.6.0]).

In Case 2 (PA1, PA2 are 26 dBm PA, PA3, PA4 are 23 dBm), PC2 (26 dBm) UE can be designated as PC2 in 'ue_PowerClass' signal information.

When the UE transmits through 4 antenna ports, MPR may be applied to the total transmission power sum in 4 antenna connectors. In this case, for 4/3/2/1 layer UL-MIMO, it is proposed to apply the existing 2Tx PC2 MPR as it is. The following explanation applies:
If the PC2 UE supports 4/3/2/1 layer UL-MIMO, the MPR may be the same as the conventional PC2_2Tx MPR (e.g., Table 6.2D.2-1 Maximum power reduction (MPR) for power class 2 with dual Tx [TS38.101-1 V17.6.0]).

For the UE, when UL-MIMO ue full power mode is configured, the following description may be applied:
In the case of 'FullPwrMode2', for a 4Tx terminal, the transmit power of one antenna connector may be 'ue_PowerClass'=PC2. In this case, as the MPR, the existing 1Tx PC2 MPR may be applied as it is. For example, the MPR may be the same as the conventional PC2_1Tx MPR (e.g., Table 6.2.2-2 Maximum power reduction (MPR) for power class 2 [TS38.101-1 V17.6.0]).
In the case of 'FullPwrMode3' or 'FullPwrMode4', for a 4Tx terminal, the sum of transmit powers of two antenna connectors may be 'ue_PowerClass'=PC2. In this case, as the MPR, the existing 2Tx PC2 MPR may be applied as it is. For example, the MPR may be the same as the conventional PC2_2Tx MPR (e.g., Table 6.2D.2-1 Maximum power reduction (MPR) for power class 2 with dual Tx [TS38.101-1 V17.6.0]).
In the case of 'FullPwrMode1', for a 4Tx terminal, the sum of transmit powers of 4 antenna connectors may be 'ue_PowerClass'=PC2. In this case, as the MPR, the existing 2Tx PC2 MPR may be applied as it is. For example, the MPR may be the same as the conventional PC2_2Tx MPR (e.g., Table 6.2D.2-1 Maximum power reduction (MPR) for power class 2 with dual Tx [TS38.101-1 V17.6.0]).

In Case 2, an FR1 4Tx UE supporting PC2 (26 dBm) and UL-MIMO can switch to one antenna port and transmit a signal. In this case, the following examples may apply:
If 'txDiversity-r16' is specified, the sum of transmit power at the two antenna connectors can be 'ue_PowerClass'=PC2. In this case, the MPR may be the same as the existing 2Tx PC2 MPR (e.g., Table 6.2D.2-1 Maximum power reduction (MPR) for power class 2 with dual Tx [TS38.101-1 V17.6.0]);
If 'txDiversity-r16' is not specified, the transmit power of one antenna connector may be 'ue_PowerClass'=PC2. In this case, the MPR may be the same as the existing 1Tx PC2 MPR (e.g., Table 6.2.2-2 Maximum power reduction (MPR) for power class 2 [TS38.101-1 V17.6.0]).

Alternatively, UE capability for the number of antennas supporting tx diversity may be newly added. As an example, this capability may be defined as 'txDiversity-r18'. For example, it may be defined in the following form:
'txDiversity-r18'=2, 3, 4; or
'txDiversity2-r18', 'txDiversity3-r18', 'txDiversity4-r18'.

If 'txDiversity-r18' is newly defined, the following description may be applied. If the terminal switches to one antenna port and transmits (no UL-MIMO), the following description may be applied according to the terminals, the 'txDiversity-r18' capability below:
In the case of 'txDiversity-r18'=2 (or 'txDiversity2-r18'), the sum of transmission power at the two antenna connectors may satisfy the corresponding 'ue_Power-Class';
In the case of 'txDiversity-r18'=3 (or 'txDiversity3-r18') the sum of transmission power at the three antenna connectors may satisfy the corresponding 'ue_Power-Class'; or
In the case of 'txDiversity-r18'=4 (or 'txDiversity4-r18'), the sum of transmission power at the four antenna connectors may satisfy the corresponding 'ue_Power-Class'.

The terminal may designate 'txDiverisity-r18=4'. In this case, the sum of transmission power at the four antenna connectors may be 'ue_PowerClass'=PC2. In this case, the MPR may be the same as the existing 2Tx PC2 MPR (e.g., Table 6.2D.2-1 Maximum power reduction (MPR) for power class 2 with dual Tx [TS38.101-1 V17.6.0]).

The terminal may not specify 'txDiverisity-r18=4'. In this case, the sum of transmission power at one antenna connector may be 'ue_PowerClass'=PC2. In this case, the MPR may be the same as the existing 1Tx PC2 MPR (e.g., Table 6.2.2-2 Maximum power reduction (MPR) for power class 2 [TS38.101-1 V17.6.0]).

In Case 3 (PA1, PA2, PA3, PA4 are all 26 dBm PAs), PC2 (26 dBm) UE can be designated as PC2 in 'ue_PowerClass' signal information.

When the UE transmits through 4 antenna ports, MPR may be applied to the total transmission power sum in 4 antenna connectors. In this case, for 4/3/2/1 layer UL-MIMO, it is proposed to apply the existing 2Tx PC2 MPR as it is. The following explanation applies:

If the PC2 UE supports 4/3/2/1 layer UL-MIMO, the MPR may be the same as the conventional PC2_2Tx MPR (e.g., Table 6.2D.2-1 Maximum power reduction (MPR) for power class 2 with dual Tx [TS38.101-1 V17.6.0]).

For the UE, when UL-MIMO ue full power mode is configured, the following description may be applied:

In the case of 'FullPwrMode' or 'FullPwrMode2', for a 4Tx terminal, the transmission power of one antenna connector may be 'ue_PowerClass'=PC2. In this case, as the MPR, the existing 1Tx PC2 MPR may be applied as it is. For example, the MPR may be the same as the conventional PC2_1Tx MPR (e.g., Table 6.2.2-2 Maximum power reduction (MPR) for power class 2 [TS38.101-1 V17.6.0]).

In the case of 'FullPwrMode3' or 'FullPwrMode3', for a 4Tx terminal, the sum of transmit powers of two antenna connectors may be 'ue_PowerClass'=PC2. In this case, as the MPR, the existing 2Tx PC2 MPR may be applied as it is. For example, the MPR may be the same as the conventional PC2_2Tx MPR (e.g., Table 6.2D.2-1 Maximum power reduction (MPR) for power class 2 with dual Tx [TS38.101-1 V17.6.0]).

In the case of 'FullPwrMode1', the sum of transmit powers of 4 antenna connectors for 4Tx terminals may be 'ue_PowerClass'=PC2. In this case, as the MPR, the existing 2Tx PC2 MPR may be applied as it is. For example, the MPR may be the same as the conventional PC2_2Tx MPR (e.g., Table 6.2D.2-1 Maximum power reduction (MPR) for power class 2 with dual Tx [TS38.101-1 V17.6.0]).

In Case 3, a FR1 4Tx UE supporting PC2 (26 dBm) and UL-MIMO can switch to one antenna port and transmit a signal. In this case, the following examples may apply:

If 'txDiversity-r16' is specified, the sum of transmit power at the two antenna connectors can be 'ue_PowerClass'=PC2. In this case, the MPR may be the same as the existing 2Tx PC2 MPR (e.g., Table 6.2D.2-1 Maximum power reduction (MPR) for power class 2 with dual Tx [TS38.101-1 V17.6.0]);

If 'txDiversity-r16' is not specified, the transmit power of one antenna connector may be 'ue_PowerClass'=PC2. In this case, the MPR may be the same as the existing 1Tx PC2 MPR (e.g., Table 6.2.2-2 Maximum power reduction (MPR) for power class 2 [TS38.101-1 V17.6.0]).

Alternatively, UE capability for the number of antennas supporting tx diversity may be newly added. As an example, this capability may be defined as 'txDiversity-r18'. For example, it may be defined in the following form:

'txDiversity-r18'=2, 3, 4; or

'txDiversity2-r18', 'txDiversity3-r18', 'txDiversity4-r18'.

If 'txDiversity-r18' is newly defined, the following description may be applied. If the terminal switches to one antenna port and transmits (no UL-MIMO), the following description may be applied according to the terminals, the 'txDiversity-r18' capability below:

In the case of 'txDiversity-r18'=2 (or 'txDiversity2-r18'), the sum of transmission power at the two antenna connectors may satisfy the corresponding 'ue_PowerClass';

In the case of 'txDiversity-r18'=3 (or 'txDiversity3-r18') the sum of transmission power at the three antenna connectors may satisfy the corresponding 'ue_PowerClass'; or In the case of 'txDiversity-r18'=4 (or 'txDiversity4-r18'), the sum of transmission power at the four antenna connectors may satisfy the corresponding 'ue_PowerClass'.

The terminal may designate 'txDiverisity-r18=4'. In this case, the sum of transmission power at the four antenna connectors may be 'ue_PowerClass'=PC2. In this case, the MPR may be the same as the existing 2Tx PC2 MPR (e.g., Table 6.2D.2-1 Maximum power reduction (MPR) for power class 2 with dual Tx [TS38.101-1 V17.6.0]).

The terminal may not specify 'txDiverisity-r18=4'. In this case, the sum of transmission power at one antenna connector may be 'ue_PowerClass'=PC2. In this case, the MPR may be the same as the existing 1Tx PC2 MPR (e.g., Table 6.2.2-2 Maximum power reduction (MPR) for power class 2 [TS38.101-1 V17.6.0]).

MPR when the FR1 4Tx UE supports PC1.5 (29 dBm) and UL-MIMO will be described.

For each of the examples of Case 1 to Case 3, MPR when the UE supports PC1.5 (29 dBm) and UL-MIMO will be described.

In Case 1 (PA1, PA2, PA3, PA4, all 23 dBm), PC1.5 (29 dBm) UE can be designated as PC1.5 in 'ue_PowerClass' signal information.

When the UE transmits through 4 antenna ports, MPR may be applied to the total transmission power sum in 4 antenna connectors. In this case, for 4/3/2/1 layer UL-MIMO, the following description applies:

i) For MPR, the existing 2Tx PC1.5 MPR (e.g., Table 6.2D.2-2 & Table 6.2D.2-3 Maximum power reduction (MPR) for power class 1.5 with dual Tx [TS38.101-1 V17.6.0]) can be applied as it is. This is because the existing 2Tx PC1.5 MPR is standardized based on a 26 dBm+26 dBm, and 4Tx Case1 PC1.5 can be assumed to be (23 dBm+23 dBm)+(23 dBm+23 dBm)=26 dBm+26 dBm; or ii) For MPR, it is proposed to apply a new 4Tx PC1.5 MPR (e.g., Tables 11 and 12). Specific MPR values may refer to examples of Table 11 and Table 12 below. If the PC1.5 UE supports 4/3/2/1 layer UL-MIMO, the MPR is the same as the conventional PC1.5_2Tx MPR (e.g., Table 6.2D.2-2 & Table 6.2D.2-3 Maximum power reduction (MPR) for power class 1.5 with dual Tx [TS38.101-1 V17.6.0]), or the MPR is PC1.5_4Tx MPR described in the examples of Table 11 and Table 12 below.

PC1.5_4Tx MPR may be the same as the examples of Table 11 and Table 12. For example, in the case of a 23 dBm+23 dBm+23 dBm+23 dBm PA structure, Table 11 or Table 12 may be applied according to antenna isolation. For example, in the case of a terminal with antenna isolation of 10 dB, MPR based on Table 11 may be applied. For a terminal with antenna isolation of 20 dB or more, MPR based on Table 12 can be applied.

TABLE 11

| Modulation | | MPR (dB) | | |
|---|---|---|---|---|
| | | Edge RB allocations | Outer RB allocations | Inner RB allocations |
| DFT-s- | Pi/2 BPSK | ≤8.0 | ≤3.0 | ≤2.0 |
| OFDM | QPSK | ≤8.5 | ≤3.5 | ≤2.0 |
| | 16 QAM | ≤8.5 | ≤4.0 | ≤2.5 |

TABLE 11-continued

| | | MPR (dB) | | |
| | | Edge RB allocations | Outer RB allocations | Inner RB allocations |
|---|---|---|---|---|
| | 64 QAM | ≤8.5 | ≤4.5 | ≤4.0 |
| | 256 QAM | ≤9.5 | ≤7.0 | ≤7.0 |
| CP- | QPSK | ≤9.5 | ≤5.0 | ≤3.5 |
| OFDM | 16 QAM | ≤9.5 | ≤5.0 | ≤4.0 |
| | 64 QAM | ≤9.5 | ≤7.0 | ≤7.0 |
| | 256 QAM | ≤9.5 | ≤9.5 | ≤9.5 |

The example of Table 11 is an example of MPR of a 4Tx PC1.5 UE. The example of Table 11 can be applied when the antenna isolation is 10 dB. For example, when the power class of the 4Tx terminal is 1.5 and the antenna isolation is 10 dB, the MPR value according to the example of Table 11 may be applied.

TABLE 12

| | | MPR (dB) | | |
| | | Edge RB allocations | Outer RB allocations | Inner RB allocations |
|---|---|---|---|---|
| DFT-s- | Pi/2 | ≤7.5 | ≤1.5 | ≤0.5 |
| OFDM | BPSK | | | |
| | QPSK | ≤8.0 | ≤2.0 | ≤0.5 |
| | 16 QAM | ≤8.0 | ≤2.5 | ≤1.5 |
| | 64 QAM | ≤8.0 | ≤3.0 | ≤3.0 |
| | 256 QAM | ≤8.0 | ≤6.0 | ≤6.0 |
| CP- | QPSK | ≤8.0 | ≤3.5 | ≤2.0 |
| OFDM | 16 QAM | ≤8.0 | ≤3.5 | ≤2.5 |
| | 64 QAM | ≤8.0 | ≤5.0 | ≤5.0 |
| | 256 QAM | ≤8.0 | ≤8.0 | ≤8.0 |

The example of Table 12 is an example of MPR of a 4Tx PC1.5 UE. The example of Table 12 can be applied when the antenna isolation is 20 dB or more. For example, when the power class of the 4Tx terminal is 1.5 and the antenna isolation is 20 dB, the MPR value according to the example of Table 12 may be applied.

Additionally, in Tables 11 and 12, an MPR considering an additional implementation margin a can be proposed. Here, a may be ±0 to ±3.0. As an example, in α=±0, ±0.5, ±1.0, ±1.5, ±2.0, ±2.5, ±3.0, Tables 11 and 12 correspond to the case of α=0.

For reference, the MPR of Table 11 and the MPR of Table 12 were defined according to the simulation performed as in the example below. For example, in the simulation results, the MPR of Table 11 and the MPR of Table 12 were derived by considering the implementation margin for the maximum MPR value in each Edge, Inner, and Outer section. Here, the simulation may be a simulation based on the example of FIG. 16, the example of FIG. 17, and Tables 13 to 17.

For example, when antenna isolation is 10 dB, Table 14 may be CP-OFDM-based MPR, and Table 15 may be DFT-s-OFDM-based MPR.

When antenna isolation is 20 dB or greater than 20 dB, Table 15 may be CP-OFDM-based MPR, and Table 17 may be DFT-s-OFDM-based MPR.

In the simulation to derive the MPR, the assumed simulation parameters are:

Channel Bandwidth=20 MHz

Subcarrier spacing (SCS)=15 kHz

Antenna isolation=10 dB, 20 dB

Front End Path Loss (FEPL)(=Post PA loss)=4 dB

RB_start: Start position of the allocated Resource Block (RB) (see Table 14, Table 15, Table 16, Table 17)

L_CRB: Number of allocated RBs (see Table 14, Table 15, Table 16, Table 17)

Tables 14, 15, 16, and 17 are examples of MPR values derived by considering the influence of reverse inter-modulation (IMD) by antenna isolation and FEPL. RIMD affects Error Vector Magnitude (EVM), and compared to 1Tx MPR, a larger MPR may be required for 2Tx MPR. For example, when antenna isolation=10 dB and FEPL=4 dB, reverse IMD applied from PA1 to PA2 is the same as the example of FIG. 16.

The following drawings are intended to illustrate specific embodiments of the present disclosure. The designations of specific devices or the designations of specific signals/messages/fields shown in the drawings are for illustrative purposes only, and the technical features of the present specification are not limited to the specific designations used in the drawings below.

Figure 16:
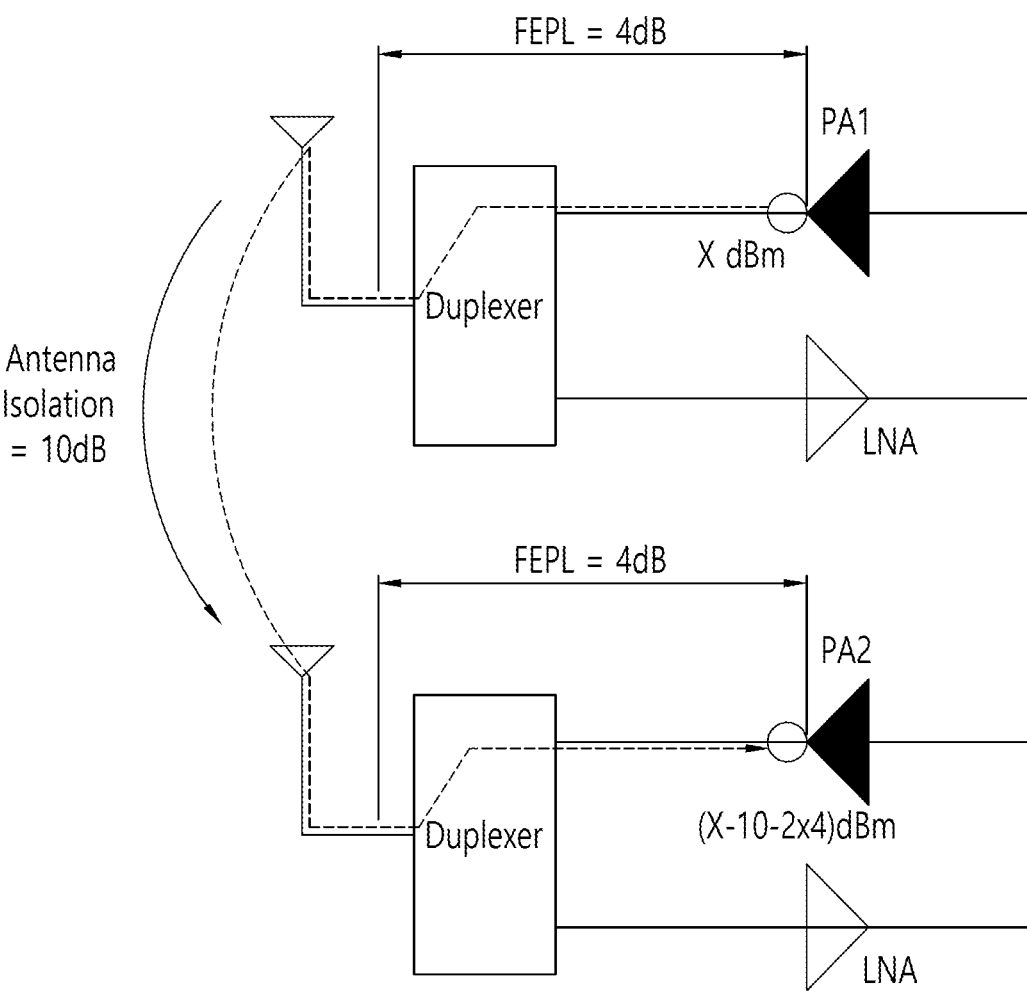
FIG. 16 is an example of a Reverse IMD for 2Tx according to an embodiment of the present specification.

FIG. 16 is an example of a Reverse IMD for 2Tx according to an embodiment of the present specification.

FIG. 16 is an example of reverse IMD for 2Tx when the antenna isolation is 10 dB. In the example of FIG. 16, an example of reverse IMD applied from PA1 to PA2 is shown. Reverse IMD applied from PA2 to PA1 may also occur in the same manner as in the example of FIG. 16. Reverse IMD according to the example of FIG. 16 can be expressed by the following formula:

$$\text{Reverse IMD}=X-\text{Antenna\_Isolation}-2*\text{FEPL(dBm)}$$
$$=23-10-2*4=5 \text{ (dBm)}$$

The example of FIG. 16 is an example of reverse IMD in case of 2Tx. Reverse IMD in case of 4Tx is as follows.

In the case of 4Tx (PA1=PA2=PA3=PA4=X(dBm)), the maximum outputs of PAs 1 to 4 may all be equal to X dBm. In this case, the reverse IMD applied to PA1 from {PA2, PA3, PA4} is as follows. The reverse IMD applied to PA2, PA3, and PA4 may also be the same as the reverse IMD applied to PA1.

$$\text{Reverse IMD}=X-\text{Antenna\_Isolation}-2*\text{FEPL}+10*\log$$
$$10(3)(\text{dBm})=23-10-2*4+4.77=9.77 \text{ (dBm)}$$

Compared to the reverse IMD of 2Tx, the reverse IMD of 4Tx is larger. Therefore, a larger EVM is applied and consequently a larger MPR may be required.

As an example, EVM according to total output power (total Tx Power) by reverse IMD can be assumed as shown in the example of Table 13 below. Here, among the reverse IMDs, the $3^{rd}$ order RIMD may be the most important value (e.g., the RIMD value that has the greatest effect).

TABLE 13

| | EVM (%) Antenna Isolation | | | |
| | 10 dB | | 20 dB | |
| Total Tx Power | CP-OFDM | DFT-s-OFDM | CP-OFDM | DFT-s-OFDM |
|---|---|---|---|---|
| 29.0 | 3.65 | 4.17 | 0.58 | 0.38 |
| 28.5 | 3.50 | 3.83 | 0.56 | 0.41 |
| 28.0 | 3.31 | 3.40 | 0.54 | 0.44 |
| 27.5 | 3.03 | 2.87 | 0.55 | 0.42 |
| 27.0 | 2.74 | 2.38 | 0.55 | 0.39 |

TABLE 13-continued

| Total Tx Power | EVM (%) Antenna Isolation | | | |
| --- | --- | --- | --- | --- |
| | 10 dB | | 20 dB | |
| | CP-OFDM | DFT-s-OFDM | CP-OFDM | DFT-s-OFDM |
| 26.5 | 2.46 | 2.01 | 0.51 | 0.34 |
| 26.0 | 2.19 | 1.65 | 0.46 | 0.29 |
| 25.5 | 1.92 | 1.31 | 0.37 | 0.21 |
| 25.0 | 1.65 | 0.98 | 0.29 | 0.15 |
| 24.5 | 1.38 | 0.72 | 0.25 | 0.14 |
| 24.0 | 1.14 | 0.51 | 0.21 | 0.12 |
| 23.5 | 0.95 | 0.39 | 0.19 | 0.10 |
| 23.0 | 0.77 | 0.28 | 0.16 | 0.08 |
| 22.5 | 0.61 | 0.21 | 0.10 | 0.07 |
| 22.0 | 0.47 | 0.16 | 0.07 | 0.06 |
| 21.5 | 0.36 | 0.15 | 0.07 | 0.07 |
| 21.0 | 0.28 | 0.14 | 0.07 | 0.06 |
| 20.5 | 0.21 | 0.12 | 0.06 | 0.04 |

An example of Table 15 may be third order RIMD induced EVM contribution vs output power and antenna isolation versus output power and antenna isolation.

TABLE 14

| CP-OFDM | RB_start | L_CRB | QPSK | 16QAM | 64QAM | 256QAM |
| --- | --- | --- | --- | --- | --- | --- |
| Edge | 0 | 1 | 8.16 | 8.22 | 8.19 | 8.22 |
| | 0 | 2 | 7.28 | 7.28 | 7.31 | 7.53 |
| Inner | 51 | 3 | 0.88 | 2.75 | 4.44 | 7.41 |
| | 48 | 10 | 1.22 | 3.03 | 4.72 | 7.53 |
| | 9 | 20 | 2.34 | 3.13 | 4.78 | 7.72 |
| | 43 | 20 | 1.34 | 3.09 | 4.78 | 8.03 |
| | 19 | 40 | 1.34 | 3.09 | 4.78 | 7.81 |
| | 33 | 40 | 1.69 | 3.09 | 4.78 | 7.78 |
| | 25 | 53 | 1.94 | 3.06 | 4.78 | 7.75 |
| Outer | 10 | 54 | 3.66 | 3.66 | 4.78 | 7.78 |
| | 30 | 54 | 2.00 | 3.09 | 4.78 | 7.72 |
| | 0 | 80 | 4.09 | 4.09 | 4.78 | 7.72 |
| | 16 | 80 | 3.91 | 3.91 | 4.72 | 7.69 |
| | 0 | 106 | 3.41 | 3.41 | 4.78 | 7.78 |

The example of Table 14 may mean MPR result values based on CP-OFDM. For example, when antenna isolation is 10 dB, CP-OFDM is used, and the UE is a 4Tx PC1.5 UE, an MPR value can be derived based on the MPR result of Table 14.

In the example of Table 14, Edge, Inner, and Outer mean locations to which RBs are allocated. In the example of Table 14, according to the combination of the location where the RB is allocated (e.g., Edge, Inner, Outer), the start time of the RB, the length of consecutive RBs, LCRB, and the modulation (e.g., QPSK, 16QAM, 64QAM, 256 QAM) The largest value was derived. The largest values derived are highlighted in the examples in Table 14. The largest values derived are MPR result values based on CP-OFDM. These values may be used to define the MPR value according to Table 11 described above.

TABLE 15

| CP-OFDM | RB_start | L_CRB | QPSK | 16QAM | 64QAM | 256QAM |
| --- | --- | --- | --- | --- | --- | --- |
| Edge | 0 | 1 | 8.16 | 8.13 | 8.19 | 8.28 |
| | 0 | 2 | 7.28 | 7.28 | 7.34 | 7.25 |
| Inner | 51 | 3 | 0 | 0 | 2.03 | 4.94 |
| | 48 | 10 | 0 | 0 | 2.03 | 4.91 |

TABLE 15-continued

| CP-OFDM | RB_start | L_CRB | QPSK | 16QAM | 64QAM | 256QAM |
| --- | --- | --- | --- | --- | --- | --- |
| | 9 | 20 | 1.66 | 1.91 | 2.00 | 4.84 |
| | 43 | 20 | 0 | 0 | 2.03 | 4.91 |
| | 19 | 40 | 0.66 | 0.91 | 2.00 | 4.91 |
| | 33 | 40 | 0.91 | 0.84 | 2.03 | 4.91 |
| | 25 | 53 | 1.16 | 1.28 | 2.00 | 4.91 |
| Outer | 10 | 54 | 1.84 | 2.34 | 2.41 | 4.88 |
| | 30 | 54 | 1.25 | 1.53 | 2.03 | 4.91 |
| | 0 | 80 | 2.13 | 2.53 | 2.66 | 4.91 |
| | 16 | 80 | 2.03 | 2.47 | 2.56 | 5.03 |
| | 0 | 106 | 1.56 | 1.97 | 2.06 | 4.91 |

The example of Table 15 may mean MPR result values based on DFT-s-OFDM. For example, when antenna isolation is 10 dB, DFT-s-OFDM is used, and the UE is a 4Tx PC1.5 UE, an MPR value can be derived based on the MPR result of Table 15.

In the example of Table 15, Edge, Inner, and Outer mean locations to which RBs are allocated. In the example of Table 15, according to the combination of the location where the RB is allocated (e.g., Edge, Inner, Outer), the start time of the RB, the length of consecutive RBs, LCRB, and the modulation (e.g., QPSK, 16QAM, 64QAM, 256 QAM) The largest value was derived. The largest values derived are highlighted in the examples in Table 15. The largest values derived are MPR result values based on DFT-s-OFDM. These values may be used to define the MPR value according to Table 11 described above.

TABLE 16

| CP-OFDM | RB_start | L_CRB | QPSK | 16QAM | 64QAM | 256QAM |
| --- | --- | --- | --- | --- | --- | --- |
| Edge | 0 | 1 | 6.34 | 6.22 | 6.53 | 6.22 |
| | 0 | 2 | 5.53 | 5.53 | 5.41 | 6.22 |
| Inner | 51 | 3 | 0 | 1.03 | 2.78 | 6.03 |
| | 48 | 10 | 0 | 1.28 | 3.06 | 6.31 |
| | 9 | 20 | 0.53 | 1.47 | 3.16 | 6.09 |
| | 43 | 20 | 0 | 1.44 | 3.22 | 6.28 |
| | 19 | 40 | 0 | 1.34 | 3.13 | 6.09 |
| | 33 | 40 | 0 | 1.38 | 3.16 | 6.16 |
| | 25 | 53 | 0 | 1.34 | 3.13 | 6.16 |
| Outer | 10 | 54 | 1.84 | 1.84 | 3.09 | 6.16 |
| | 30 | 54 | 0.03 | 1.41 | 3.16 | 6.13 |
| | 0 | 80 | 2.31 | 2.31 | 3.13 | 6.06 |
| | 16 | 80 | 2.09 | 2.09 | 3.09 | 6.09 |
| | 0 | 106 | 1.59 | 1.59 | 3.09 | 6.09 |

The example of Table 16 may mean MPR result values based on CP-OFDM. For example, when the antenna isolation is 20 dB or more, CP-OFDM is used, and the UE is a 4Tx PC1.5 UE, an MPR value can be derived based on the MPR result of Table 16.

In the example of Table 16, Edge, Inner, and Outer mean locations to which RBs are allocated. In the example of Table 16, according to the combination of the location where the RB is allocated (e.g., Edge, Inner, Outer), the start time of the RB, the length of consecutive RBs, LCRB, and the modulation (e.g., QPSK, 16QAM, 64QAM, 256 QAM) The largest value was derived. The largest values derived are highlighted in the examples in Table 16. The largest values derived are MPR result values based on CP-OFDM. These values may be used to define the MPR value according to Table 12 described above.

45

TABLE 17

| CP-OFDM | RB_start | L_CRB | QPSK | 16QAM | 64QAM | 256QAM |
|---|---|---|---|---|---|---|
| Edge | 0 | 1 | 6.31 | 6.53 | 6.34 | 6.41 |
|  | 0 | 2 | 5.41 | 5.47 | 5.38 | 5.59 |
| Inner | 51 | 3 | 0 | 0 | 1.09 | 4.03 |
|  | 48 | 10 | 0 | 0 | 1.03 | 3.84 |
|  | 9 | 20 | 0 | 0.09 | 1.03 | 3.84 |
|  | 43 | 20 | 0 | 0 | 1.03 | 3.84 |
|  | 19 | 40 | 0 | 0 | 1.03 | 3.88 |
|  | 33 | 40 | 0 | 0 | 1.06 | 3.84 |
|  | 25 | 53 | 0 | 0 | 1.03 | 3.88 |
| Outer | 10 | 54 | 0.06 | 0.53 | 1.03 | 3.88 |
|  | 30 | 54 | 0 | 0 | 1.03 | 4.03 |
|  | 0 | 80 | 0.31 | 0.75 | 1.06 | 3.88 |
|  | 16 | 80 | 0.22 | 0.66 | 1.03 | 3.84 |
|  | 0 | 106 | 0 | 0.16 | 1.03 | 3.91 |

The example of Table 17 may mean MPR result values based on DFT-s-OFDM. For example, when the antenna isolation is 20 dB or more, DFT-s-OFDM is used, and the UE is a 4Tx PC1.5 UE, an MPR value can be derived based on the MPR result of Table 17.

In the example of Table 17, Edge, Inner, and Outer mean locations to which RBs are allocated. In the example of Table 17, according to the combination of the location where the RB is allocated (e.g., Edge, Inner, Outer), the start time of the RB, the length of consecutive RBs, LCRB, and the modulation (e.g., QPSK, 16QAM, 64QAM, 256 QAM) The largest value was derived. The largest values derived are highlighted in the examples in Table 17. The largest values derived are MPR result values based on DFT-s-OFDM. These values may be used to define the MPR value according to Table 11 described above.

For reference, in the examples of Tables 12 to 17, Edge means Edge RB allocation. Outer means outer RB allocation. Inner means inner RB allocation.

For Edge, Inner and Outer, you may refer to 38.101-1 V17.6.0.

The following parameters may be defined to specify valid RB allocation ranges for Outer RB allocation and Inner RB allocation:

$N_{RB}$ means the maximum value of the number of RBs for a given channel bandwidth and SCS. $N_{RB}$ can be defined as shown in Table 18 below.

TABLE 18

| SCS (kHz) | 5 MHz | 10 MHz | 15 MHz | 20 MHz | 25 MHz | 30 MHz | 35 MHz | 40 MHz | 45 MHz | 50 MHz | 60 MHz | 70 MHz | 80 MHz | 90 MHz | 100 MHz |
|---|---|---|---|---|---|---|---|---|---|---|---|---|---|---|---|
| 15 | 25 | 52 | 79 | 106 | 133 | 160 | 188 | 216 | 242 | 270 | N/A | N/A | N/A | N/A | N/A |
| 30 | 11 | 24 | 38 | 51 | 65 | 78 | 92 | 106 | 119 | 133 | 162 | 189 | 217 | 245 | 273 |
| 60 | N/A | 11 | 18 | 24 | 31 | 38 | 44 | 51 | 58 | 65 | 79 | 93 | 107 | 121 | 135 |

Examples of Table 18 include examples of $N_{RB}$ according to SCSs of 15 kHz, 30 kHz, and 60 kHz and channel bandwidths of 5 MHz to 100 MHz.

RBStart,Low can be defined as follows. $RB_{Start,Low}=\max(1, floor(L_{CRB}/2))$. Here, $L_{CRB}$ may be a transmission bandwidth indicating the length of contiguous resource block allocation indicated in resource block units. max( ) represents the largest of all parameters, and floor(x) represents the largest integer less than or equal to x.

$RB_{Start,High}$ can be defined as follows. $RB_{Start,High}=N_{RB}-RB_{Start,Low}-L_{CRB}$.

An RB assignment is an Inner RB assignment if the following two conditions are satisfied:

$$RB_{Start,Low} \leq RB_{Start} \leq RB_{Start,High} \text{ 및 } L_{CRB} \leq ceil(N_{RB}/2)$$

46

Where ceil(x) is the smallest integer greater than or equal to x.

Edge RB allocation means that an RB is allocated as an $L_{CRB}$ of 2 RBs or less to a lowermost edge or an uppermost edge of a channel.

All other allocations other than Inner RB assignments or Edge RB allocations are Outer RB allocations.

The MPR according to the examples of Table 14, Table 15, Table 15, and Table 17 is Error Vector Magnitude (EVM), Adjacent Channel Leakage Ratio (ACLR), Spectrum Emission Mask (SEM), Spurious Emission (SE), InBand Emission (IBE)) is a value corresponding to power back off that satisfies all.

Figure 17:
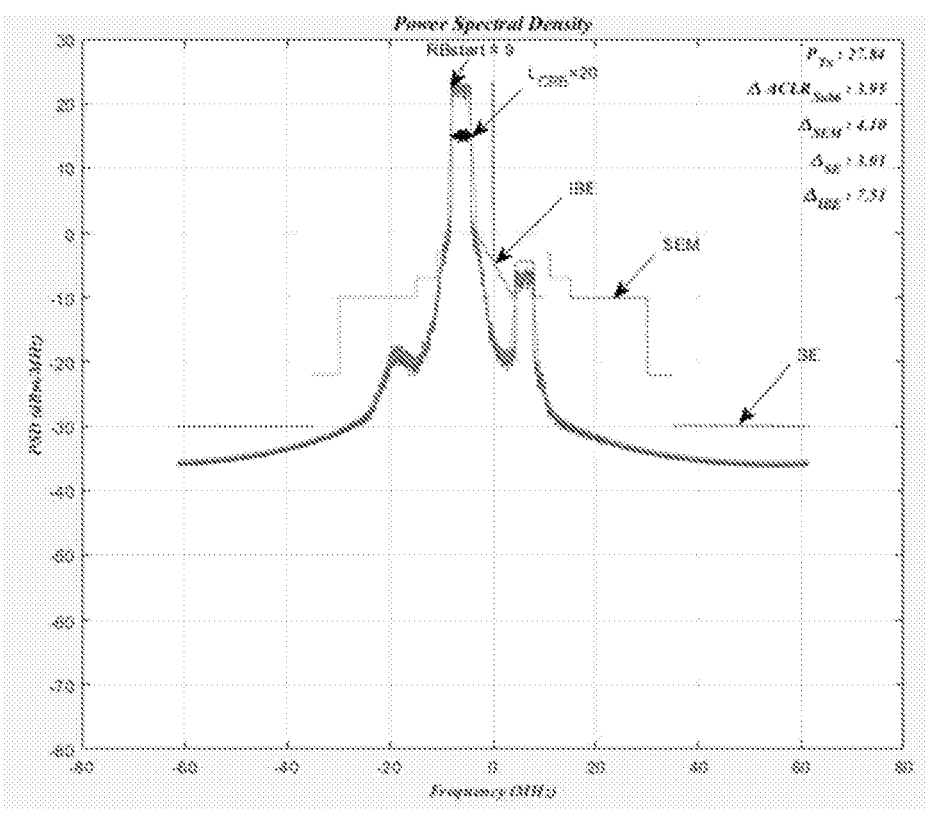
FIG. 17 is an example of a PSD for deriving an MSD value according to an embodiment of the present specification.

For example, FIG. 17 is an example of power spectrum density (PSD) for the case where RB_start=9 and L_CRB=20 of 16QAM.

The following drawings are intended to illustrate specific embodiments of the present disclosure. The designations of specific devices or the designations of specific signals/messages/fields shown in the drawings are for illustrative purposes only, and the technical features of the present specification are not limited to the specific designations used in the drawings below.

FIG. 17 is an example of a PSD for deriving an MSD value according to an embodiment of the present specification.

The example of FIG. 17 shows the power spectrum density (PSD) for the case where RB_start=9 and L_CRB=20 of 16QAM. In the example of FIG. 17, PSD was compared with SEM, SE, and IBE. The example of FIG. 17 is an example when DFT-s-OFDM is used.

The example in FIG. 17 shows an example of a PSD that meets ACLR requirements with a margin of 3.95 dB compared to the standard, meets SEM requirements with a margin of 4.1 dB compared to the standard, meets SE requirements with a margin of 3.01 dB compared to the standard, and meets IBE requirements with a margin of 7.51 dB compared to the standard.

As described above, the MPR of Table 11 and the MPR of Table 12 were defined as simulated as shown in the following example. For example, in the simulation results, MPR and 12 MPR in Table 11 were derived in consideration of the implementation margin in the maximum MPR values in each Edge, Inner, and Outer section. The simulation may be a simulation based on the example of FIG. 16, the example of FIG. 17, and Tables 13 to 17.

MPR values according to Table 11 and Table 12 MPR are values corresponding to power back off that satisfy EVM, ACLR, SEM, SE, and IBE, as shown in the example of FIG. 17. For reference, an example of FIG. 17 is illustrated only in a case where RB_start=9 and L_CRB=20 of 16QAM, but this is only an example. In order to derive MPR values according to Table 11 and Table 12 MPR, a power back off was derived in which PSD according to all RB allocation and all modulation combinations satisfies EVM, ACLR, SEM, SE, and IBE.

For the UE, when UL-MIMO ue full power mode is configured, the following description may be applied:

In the case of 'FullPwrMode1', the sum of the transmission power of the four antenna connecting ends for the 4Tx terminal may be 'ue_PowerClass'=PC1.5. In this case, the 4Tx PC1.5 MPR of Table 11 or the 4Tx PC1.5 MPR of Table 12 may be applied. For example, MPR may be applied as shown in the following example:

For UEs that support 10 dB of antenna isolation (e.g., handheld UE/vehicle UE/industrial device), PC1.5_4Tx MPR according to the example in Table 11 may be applied;

For UEs (e.g., FWA/CPE/industrial devices) that support antenna isolation of 20 dB or more, PC1.5_4Tx MPR according to the example in Table 12 can be applied.

FR1 4Tx UE supporting PC1.5 (29 dBm) and UL-MIMO can switch to one antenna port to transmit signals. In this case, the following example may be applied:

If 'txDiversity-r16' is designated, the sum of transmission power at the four antenna connecting ends may be 'ue_PowerClass'=PC1.5. In this case, the 4Tx PC1.5 MPR of Table 11 or the 4Tx PC1.5 MPR of Table 12 may be applied. For example, MPR may be applied as shown in the following example:

For UEs that support 10 dB of antenna isolation (e.g., handheld UE/vehicle UE/industrial device), PC1.5_4Tx MPR according to the example in Table 11 may be applied;

UE with 20 dB or more antenna isolation (e.g., FWA/CPE/industrial devices)

Alternatively, UE capability for the number of antennas supporting tx diversity may be newly added. As an example, this capability may be defined as 'txDiversity-r18'. For example, it may be defined in the following form:

'txDiversity-r18'=2, 3, 4; or

'txDiversity2-r18', 'txDiversity3-r18', 'txDiversity4-r18'.

For example, the terminal may switch to one antenna port and transmit the same (no UL-MIMO). In this case, the terminal may designate 'txDivergence-r18=4'. In this case, the sum of transmission power at the four antenna connectors may be 'ue_PowerClass'=PC1.5. In this case, the 4Tx PC1.5 MPR of Table 11 or the 4Tx PC1.5 MPR of Table 12 may be applied. For example, MPR may be applied as shown in the following example:

For UEs that support 10 dB of antenna isolation (e.g., handheld UE/vehicle UE/industrial device), PC1.5_4Tx MPR according to the example in Table 11 may be applied;

For UEs (e.g., FWA/CPE/industrial devices) that support antenna isolation of 20 dB or more, PC1.5_4Tx MPR according to the example in Table 12 can be applied.

In the case of Case2 (PA1 and PA2 are 26 dBm PA, and PA3 and PA4 are 23 dBm PA), the PC1.5 (29 dBm) UE can be designated as PC1.5 in the 'ue_PowerClass' signal information.

When the UE transmits through 4 antenna ports, MPR may be applied to the total transmission power sum in 4 antenna connectors. In this case, for 4/3/2/1 layer UL-MIMO, the following description applies:

i) For MPR, the existing 2Tx PC1.5 MPR (e.g., Table 6.2D.2-2 & Table 6.2D.2-3 Maximum power reduction (MPR) for power class 1.5 with dual Tx [TS38.101-1 V17.6.0]) can be applied as it is; or ii) For MPR, it is proposed to apply a new 4Tx PC1.5 MPR (e.g., Tables 11 and 12). For specific MPR values, the examples of Table 11 and Table 12 may be applied according to the antenna isolation.

PC1.5_4Tx MPR may have the same MPR value for Case 2 (e.g., 26 dBm+26 dBm+23 dBmPA structure) and Case 1 (23 dBm+23 dBm+23 dBm). For example, a terminal having an antenna isolation of 10 dB may apply an MPR value based on Table 11. For example, when the antenna isolation is 20 dB or 20 dB or more, the terminal may apply an MPR value based on Table 12.

For the UE, when UL-MIMO ue full power mode is configured, the following description may be applied:

In the case of 'FullPwrMode3', the sum of the transmission power of the two antenna connecting ends may be 'ue_PowerClass'=PC1.5 for the 4Tx terminal. In this case, MPR can be the same as the existing 2Tx PC1.5 MPR (e.g., Table 6.2D.2-2 & Table 6.2D.2-3 Maximum power reduction (MPR) for power class 1.5 with dual Tx [TS38.101-1 V17.6.0]). Alternatively, 4Tx PC1.5 MPR of Table 11 or 4Tx PC1.5 MPR of Table 12 may be applied.

In the case of 'FullPwrMode1', the sum of the transmission power of the four antenna connecting ends may be 'ue_PowerClass'=PC1.5 for the 4Tx terminal. In this case, the terminal may apply the 4Tx PC1.5 MPR according to Tables 11 and 12 based on antenna isolation. I propose to apply it.

FR1 4Tx UE supporting PC1.5 (29 dBm) and UL-MIMO can switch to one antenna port to transmit signals. In this case, the following example may be applied:

When 'txDiversity-r16' is designated, the sum of transmission power at the two antenna connectors of the FR14Tx UE may be 'ue_PowerClass'=PC1.5. In this case, MPR can be the same as existing PC1.5_2Tx MPR (e.g., Table 6.2D.2-2 & Table 6.2D.2-3 Maximum power reduction (MPR) for power class 1.5 with dual Tx [TS38.101-1 V17.6.0]). Alternatively, 4Tx PC1.5 MPR of Table 11 or 4Tx PC1.5 MPR of Table 12 may be applied.

Alternatively, since 'txDiversity-r16' is conventionally applied to 2 Tx, in order to support 4Tx diversity, UE capability for the number of antennas supporting tx diversity may be newly added. As an example, this capability may be defined as 'txDiversity-r18'. If there is a UE capability for the number of antennas supporting tx diversity, it may be defined in the following form:

'txDiversity-r18'=2, 3, 4; or

'txDiversity2-r18', 'txDiversity3-r18', 'txDiversity4-r18'.

In this case, the terminal may designate 'txDivergence-r18=4' or 'txDiversity4-r18'. In this case, the sum of transmission power at the four antenna connectors may be 'ue_PowerClass'=PC1.5. In this case, according to antenna isolation, 4Tx PC1.5 MPR of Table 11 or 4Tx PC1.5 MPR of Table 12 may be applied.

In Case 3 (PA1, PA2, PA3, and PA4 are all 26 dBm PA), PC1.5 (29 dBm) UE can be designated as PC1.5 in the 'ue_PowerClass' signal information.

When the UE transmits through 4 antenna ports, MPR may be applied to the total transmission power sum in 4 antenna connectors. In this case, for 4/3/2/1 layer UL-MIMO, the following description applies:

i) For MPR, the existing 2Tx PC1.5 MPR (e.g., Table 6.2D.2-2 & Table 6.2D.2-3 Maximum power reduction (MPR) for power class 1.5 with dual Tx [TS38.101-1 V17 0.6.0]) may be applied verbatim; or ii) For MPR, it is proposed to apply a new 4Tx PC1.5 MPR (e.g., Tables 11 and 12). For specific MPR values, the examples of Table 11 and Table 12 may be applied according to the antenna isolation.

For case 3 (e.g., 26 dBm+26 dBm+26 dBm+26 dBm PA structure), PC1.5_4Tx MPR can be applied equally to Case 1 (23 dBm+23 dBm+23 dBm+23 dBm). For example, a terminal with antenna isolation of 10 dB may apply an MPR value based on Table 11. For example, if the antenna isolation is 20 dB or more than 20 dB, the terminal may apply the MPR value based on Table 12.

For the UE, when UL-MIMO ue full power mode is configured, the following description may be applied:

In the case of 'FullPwrMode3' or 'FullPwrMode4', for a 4Tx terminal, the sum of transmit powers of two antenna connectors may be 'ue_PowerClass'=PC1.5. In this case, the MPR may be the same as the existing 2Tx PC1.5 MPR (e.g., Table 6.2D.2-2 & Table 6.2D.2-3 Maximum power reduction (MPR) for power class 1.5 with dual Tx [TS38.101-1 V17. 6.0]). Alternatively, the 4Tx PC1.5 MPR of Table 11 or the 4Tx PC1.5 MPR of Table 12 may be applied.

In the case of 'FullPwrMode1', for a 4Tx terminal, the sum of transmit powers of 4 antenna connectors may be 'ue_PowerClass'=PC1.5. In this case, the UE may apply 4Tx PC1.5 MPR according to Tables 11 and 12 based on antenna isolation.

A FR1 4Tx UE supporting PC1.5 (29 dBm) and UL-MIMO may transmit a signal by switching to one antenna port. In this case, the following examples may apply:

If 'txDiversity-r16' is specified, the sum of transmit powers at the two antenna connectors of the FR1 4Tx UE may be 'ue_PowerClass'=PC1.5. In this case, the MPR may be the same as the existing PC1.5_2Tx MPR (e.g., Table 6.2D.2-2 & Table 6.2D.2-3 Maximum power reduction (MPR) for power class 1.5 with dual Tx [TS38.101-1 V17.6.0]). Alternatively, the 4Tx PC1.5 MPR of Table 11 or the 4Tx PC1.5 MPR of Table 12 may be applied.

Alternatively, since 'txDiversity-r16' is conventionally applied to 2 Tx, in order to support 4Tx diversity, UE capability for the number of antennas supporting tx diversity may be newly added. As an example, this capability may be defined as 'txDiversity-r18'. If there is a UE capability for the number of antennas supporting tx diversity, it may be defined in the following form:

'txDiversity-r18'=2, 3, 4; or

'txDiversity2-r18', 'txDiversity3-r18', 'txDiversity4-r18'.

In this case, the terminal may designate 'txDivergence-r18'=4' or 'txDiversity4-r18'. In this case, the sum of transmission power at the four antenna connectors may be 'ue_PowerClass'=PC1.5. In this case, according to antenna isolation, 4Tx PC1.5 MPR of Table 11 or 4Tx PC1.5 MPR of Table 12 may be applied.

The MPR when the UE supports PC1.5 (29 dBm) and UL-MIMO may be applied as shown in the following example.

For example, if the antenna isolation is 10 dB, the 4Tx PC1.5 (29 dBm) UE may apply the MPR of Table 11 to all cases 1, case 2, and case 3. If the antenna isolation is 20 dB or more, the 4Tx PC1.5 (29 dBm) UE may apply the MPR of Table 12 for all cases 1, 2 and 3.

For another example, in the case of UL-MIMO, depending on the full power transmission mode, UE can also apply 4Tx PC1.5 MPR (Table 11, Table 12) or 2Tx PC1.5 MPR (e.g., Table 6.2D.2-2 & Table 6.2D.2-3 Maximum power reduction (MPR) for power class 1.5 with dual Tx [TS38.101-1 V17.6.0]).

For another example, if the Tx Diversity supported by the UE is 2Tx, the UE may apply 2Tx PC1.5 MPR (e.g., Table 6.2D.2-2 & Table 6.2D.2-3 Maximum power reduction (MPR) for power class 1.5 with dual Tx [TS38.101-1 V17.6.0]). When the Tx Diversity supported by the UE is 4Tx, the UE may apply 4Tx PC1.5 MPR (e.g., MPR in Table 11 and Table 12).

1-3. Example of Applying MPR

An example of applying MPR is described.

i) Example of a Device Supporting Tx Diversity

When the terminal supports Tx Diversity, MPR may be applied as shown in the following example.

The UE may transmit power class information and txDiversity capability information of the UE to the network (e.g., base station). Then, when scheduling, the network may consider that the terminal applies the MPR suitable for the corresponding power class and txDiverity capability to Tx power. An antenna isolation value may be different according to a terminal type. Accordingly, when the terminal supports txDiverisity, the terminal may apply a different MPR value according to the terminal type or a different MPR value to Tx power according to the antenna isolation value:

If the UE is a power class 3 UE and does not support txDiversity, the UE may apply MPR (e.g., Table 6.2.2-1 Maximum power reduction (MPR) for power class 3 [TS38.101-1 V17.6.0]).

If the terminal is a power class 2 UE and does not support txDiversity, the terminal may apply MPR (e.g., Table 6.2.2-2 Maximum power reduction (MPR) for power class 2 [TS38.101-1 V17.6.0]).

If the terminal is a power class 2 UE and supports txDiversity=2, the terminal may apply MPR (e.g., Table 6.2D.2-1 Maximum power reduction (MPR) for power class 2 with dual Tx [TS38.101-1 V17.6.0]).

If the terminal is a power class 1.5 UE and supports txDiversity=2, and the terminal type is a terminal type with an antenna isolation of 10 dB or more and less than 20 dB, the terminal may apply MPR (e.g., Table 6.2D.2-2 Maximum power reduction (MPR) for power class 1.5 with dual Tx [TS38.101-1 V17.6.0]).

If the terminal is a power class 1.5 UE, supports txDiversity=2, and the terminal type is a terminal type with an annealing greater than 20 dB, the terminal may apply MPR (e.g., Table 6.2D.2-3 Maximum power reduction (MPR) for power class 1.5 with dual Tx [TS38.101-1 V17.6.0]).

If the terminal is a power class 1.5 UE, supports txDiversity=4, and the terminal type is a terminal type with an antenna isolation of 10 dB or more and less than 20 dB, the terminal may apply MPR according to the example in Table 11.

If the terminal supports power class 1.5 and txDiversity=4, and the terminal type is a terminal type with an antenna isolation of 20 dB or more, the terminal may apply MPR according to the example in Table 12.

ii) When the Terminal Supports UL-MIMO

The terminal may transmit its power class information, the number of antenna ports information, and UL full power mode information to the network (base station). Then, when the network performs scheduling related to UL-MIMO, the network may consider that the terminal applies MPR suitable for the corresponding power class and the number of antenna ports to the Tx power.

Here, the UL full power mode is as follows:

UL full power mode 'Full'=power class is supported by the power of all 1 antenna connector UL full power mode '2=power class is supported by the power of specific one antenna connector UL full power mode '1'=power class is supported by the sum of power at all antenna connectors The antenna isolation value may be different according to the terminal type. Accordingly, when supporting UL-MIMO, the terminal may apply different MPRs to Tx power depending on the terminal type or antenna isolation value:

If the terminal is a power class 3 UE and supports UL-MIMO with antenna port=2, the terminal may apply MPR (e.g., Table 6.2.2-1 Maximum power reduction (MPR) for power class 3 [TS38.101-1 V17.6.0]).

If the terminal is a power class 2 UE, supports UL-MIMO with antenna port=2, and is a UL full power mode 'Full' or '2', the terminal may apply MPR (e.g., Table 6.2.2-2 Maximum power reduction (MPR) for power class 2 [TS38.101-1 V17.6.0].

If the UE is a power class 2 UE, supports UL-MIMO with antenna port=2, and is in UL full power mode '1', the UE supports MPR (e.g., Table 6.2D.2-1 Maximum power reduction (MPR) for power class 2 with dual Tx [TS38.101-1 V17.6.0]).

If the terminal is a power class 1.5 UE, supports UL-MIMO with antenna port=2, is UL full power mode '1', and the terminal type is a terminal type with antenna isolation of 10 dB (or greater than or equal to 10 dB and greater than 20 dB small), the UE may apply MPR (e.g., Table 6.2D.2-2 Maximum power reduction (MPR) for power class 1.5 with dual Tx [TS38.101-1 V17.6.0]).

If the terminal is a power class 1.5 UE, supports UL-MIMO with antenna port=2, is in UL full power mode '1', and the terminal type has antenna isolation greater than or equal to 20 dB, the terminal may use MPR (e.g., Table 6.2D.2-3 Maximum power reduction (MPR) for power class 1.5 with dual Tx [TS38.101-1 V17.6.0]).

If the terminal is a power class 1.5 UE, supports UL-MIMO with antenna port=4, is UL full power mode '1', and the terminal type is a terminal type with antenna isolation of 10 dB (or antenna isolation of 10 dB or more and less than 20 dB), the terminal may apply MPR (e.g., MPR according to the example of Table 11).

If the terminal is a power class 1.5 UE, supports UL-MIMO with antenna port=4, UL full power mode '1', and the terminal type is a terminal type with an antenna isolation of 20 dB or more, the terminal may apply MPR (e.g., MPR according to the example in Table 12).

iii) In Case the Terminal Supports Both Tx Diversity and UL-MIMO

The terminal may transmit information about the power class of the terminal, information about txDiversity capability, and information about the number of antenna ports of the terminal to the network (base station). Then, when performing UL-MIMO scheduling, the network may consider that the terminal applies MPR suitable for the corresponding power class, txDiversity capability, and number of antenna ports to Tx power.

The terminal may transmit information about the power class of the terminal, information about txDiversity capability of the terminal, information about number of antenna ports of the terminal, and information about UL full power mode of the terminal to the network (base station). Then, when the network performs UL-MIMO scheduling, the terminal may consider applying an MPR suitable for the corresponding power class, txDiversity capability, and number of antenna ports to Tx power.

Here, the UL full power mode is as follows:

UL full power mode 'Full'=power class is supported by the power of all 1 antenna connector UL full power mode '2=power class is supported by the power of specific one antenna connector UL full power mode '1'=power class is supported by the sum of power at all antenna connectors The antenna isolation value may be different according to the terminal type. Accordingly, when supporting UL-MIMO, the terminal may apply different MPRs to Tx power depending on the terminal type or antenna isolation value:

If the terminal is a power class 3 UE and supports UL-MIMO with antenna port=2, the terminal may apply MPR (e.g., Table 6.2.2-1 Maximum power reduction (MPR) for power class 3 [TS38.101-1 V17.6.0]).

If the terminal is a power class 2 UE, supports UL-MIMO with antenna port=2, and is a UL full power mode 'Full' or '2', the terminal may apply MPR (e.g., Table 6.2.2-2 Maximum power reduction (MPR) for power class 2 [TS38.101-1 V17.6.0]).

If the UE is a power class 2 UE, supports UL-MIMO with antenna port=2, and is in UL full power mode '1', the UE supports MPR (e.g., Table 6.2D.2-1 Maximum power reduction (MPR) for power class 2 with dual Tx [TS38.101-1 V17.6.0]).

If the terminal is a power class 2 UE, supports UL-MIMO with antenna port=1, and supports UL full power mode '1, and txDiversity=2, the terminal can apply MPR (e.g., Table 6.2D.2-1 Maximum power reduction (MPR) for power class 2 with dual Tx [TS38.101-1 V17.6.0]).

If the terminal is a power class 2 UE, supports UL-MIMO with antenna port=1, is UL full power mode '1, and does not support txDiversity, the terminal may apply MPR (e.g., Table 6.2.2-2 Maximum power reduction (MPR) for power class 2 [TS38.101-1 V17.6.0]).

If the terminal is a power class 1.5 UE, supports UL-MIMO with antenna port=2, and the terminal type is UL full power mode '1', and the terminal type is an antenna isolation 10 dB or more (and less than 20 dB), the terminal may apply MPR (e.g., Table 6.2D.2-2 Maximum power reduction (MPR) for power class 1.5 with dual Tx [TS38.101-1 V17.6.0]).

If the terminal is a power class 1.5 UE, supports UL-MIMO with antenna port=2, and the terminal type is UL full power mode '1', and the terminal type is antenna isolation 20 dB or more, the terminal may apply MPR (e.g., Table 6.2D.2-3 Maximum power reduction (MPR) for power class 1.5 with dual Tx [TS38.101-1 V17.6.0]).

If the terminal is a power class 1.5 UE, supports UL-MIMO with antenna port=1, supports UL full power mode '1', supports txDiversity=2, and the terminal type is a terminal type with an antenna isolation of 10 dB or more (and less than 20 dB), the terminal can apply MPR (e.g., Table 6.2D.2-1 Maximum power reduction (MPR) for power class 2 with dual Tx [TS38.101-1 V17.6.0]).

If the terminal is a power class 1.5 UE, supports UL-MIMO with antenna port=1, UL full power mode '1', supports txDiversity=2, and the terminal type is a terminal type with antenna isolation of 20 dB or more, The terminal may apply MPR (e.g., Table 6.2.2-2 Maximum power reduction (MPR) for power class 2 [TS38.101-1 V17.6.0]).

If the terminal is a power class 1.5 UE, supports UL-MIMO with antenna port=4, is UL full power mode '1', and the terminal type is a terminal type with antenna isolation of 10 dB (or antenna isolation is greater than or equal to 10 dB and less than 20 dB), the UE may apply MPR (e.g., MPR according to the example of Table 11).

If the terminal is a power class 1.5 UE, supports UL-MIMO with antenna port=4, UL full power mode '1', and the terminal type is a terminal type with an antenna isolation of 20 dB or more, the terminal may apply MPR (e.g., MPR according to the example in Table 12).

If the terminal is a power class 1.5 UE, supports UL-MIMO with antenna port=1, UL full power mode '1', supports txDiversity=4, and the terminal type is a terminal type with antenna isolation of 10 dB (Alternatively, if the antenna isolation is greater than or equal to 10 dB and less than 20 dB), the terminal may apply MPR (e.g., MPR according to the example of Table 11).

If the terminal is a power class 1.5 UE, supports UL-MIMO with antenna port=1, UL full power mode '1', supports txDiversity=4, and the terminal type is a terminal type with antenna isolation of 20 dB or more, The UE may apply MPR (e.g., MPR according to the example of Table 12).

2. Second Disclosure of the Present Specification

In the disclosure of the present specification, the transmission performance requirement of a UE for an FR1 UE supporting 4Tx will be described. For example, related requirements including UL-MIMO will be described.

2-1. Existing FR1 Terminal Transmission Requirements

The description of the existing FR1 terminal requirements standard may be the same as "1-1. It the existing FR1 terminal transmission requirements".

2-2. Transmission Requirements of FR1 4Tx Terminal

Transmission requirements (e.g., RF requirements related to transmission) of the FR1 4Tx terminal will be described. For example, the transmission requirements of the FR1 4Tx terminal may include MPR.

In order to further improve uplink coverage than the existing 2Tx terminal's uplink coverage, a terminal with four transmission antennas will be introduced.

In relation to 4Tx, the terminal's the transmission PA structure may be as shown in cases 1 to 3 below. For example, based on 23 dBm PA and 26 dBm PA considered for current implementation, the following combination can be used as a terminal transmission PA structure for 4Tx Case 1: 4*23 dBm (예: 23 dBm+23 dBm+23 dBm+23 dBm)

Case 2: 2*23 dBm+2*26 dBm (e.g., 26 dBm+26 dBm+23 dBm+23 dBm)

Case 3: 4*26 dBm (예: 26 dBm+26 dBm+26 dBm+26 dBm)

The terminal output power that can be supported by Case 1, Case 2, and Case 3 above can be determined by applying power back off, as in the following example:

PCs that Case 1 can support may include, for example, PCs based on 23 dBm, 26 dBm, and 29 dBm:

23 dBm(PC3)=(23−6)+(23−6)+(23−6)+(23−6) dBm. Here, the UE may perform 6 dB power back off for each 23 dBm PA;

26 dBm(PC2)=(23−3)+(23−3)+(23−3)+(23−3) dBm. Here, the UE may perform 3 dB power back off for each 23 dBm PA;

29 dBm(PC1.5)=23+23+23+23 dBm. Here, the UE does not apply power back off for each 23 dBm PA.

PCs that Case 2 can support may include, for example, PCs based on 23 dBm, 26 dBm, and 29 dBm:

23 dBm(PC3)=(23−6)+(23−6)+(26−9)+(26−9) dBm. Here, the UE may perform 6 dB power back off for each of the 23 dBm PAs and 9 dB power back off for each of the 26 dBm PAs;

26 dBm(PC2)=(23−3)+(23−3)+(26−6)+(26−6) dBm. Here, the UE may perform 3 dB power back off for each of the 23 dBm PAs and 6 dB power back off for each of the 26 dBm PAs;

29 dBm(PC1.5)=(23−0)+(23−0)+(26−3)+(26−3) dBm. Here, the UE may perform 3 dB power back off for each of the 26 dBm PAs without performing power back off for each of the 23 dBm PAs;

30.8 dBm=(23−0)+(23−0)+(26−0)+(26−0) dBm. Here, the UE may not perform power back off for both 23 dBm PAs and 26 dBm PAs. For 30.8 dBm output, the existing PC1 (31 dBm) can be applied or a new PC (e.g., PC1.1) can be defined.

PCs that Case 3 (e.g., 4×26 dBm) can support may include, for example, PCs based on 23 dBm, 26 dBm, and 29 dBm:

23 dBm(PC3)=(26−9)+(26−9)+(26−9)+(26−9) dBm. Here, the UE may perform 9 dB power back off for each of the 26 dBm PAs;

26 dBm(PC2)=(26−6)+(26−6)+(26−6)+(26−6) dBm. Here, the UE may perform 6 dB power back off for each of the 26 dBm PAs;

29 dBm(PC1.5)=(26−3)+(26−3)+(26−3)+(26−3) dBm. Here, the UE may perform 3 dB power back off for each of the 26 dBm PAs;

32 dBm=(26−0)+(26−0)+(26−0)+(26−0) dBm. Here, the UE does not perform power back off for all 26 dBm PAs. For 32 dBm output, a new PC can be defined. For example, PC0.9 may be defined.

As described in the examples of Cases 1 to 3, the terminal may or may not perform a backoff on the PA based on the structure of the terminal and the PC to be supported. Accordingly, the terminal may support 'ul_PowerClass' corresponding to each PC. The terminal may report 'ul_PowerClass' to the network.

The 4Tx RF requirements of the UE are described in detail.

For each of the examples of Case 1 to Case 3, the 4Tx RF standard of the UE will be described.

The UE can support 4 layer UL-MIMO in Case 1 (e.g., (23 dBm+23 dBm+23 dBm+23 dBm). In this case, the 4Tx RF requirements of the UE will be described.

In this case, the 4Tx RF standard for PC3, PC2, and PC1.5 terminals supporting 4 layer UL-MIMO may be defined based on the following assumptions. For example, the RF standard for such a terminal assumes TPMI (Transmit Precoding Matrix Indicator)=0, corresponding W (e.g., W corresponding to TMPI 0 in FIG. 15), 1 SRS resource and 4 SRS antenna ports 4Tx RF standards can be defined.

Examples of Precoding matrix W corresponding to TPMI index and TMPI index corresponding to 1 layer, 2 layer, 3 layer, and 4 layer for 4 antenna ports are the same as the examples of FIGS. 12 to 15 described in the first opening of the present specification.

Figure 18:
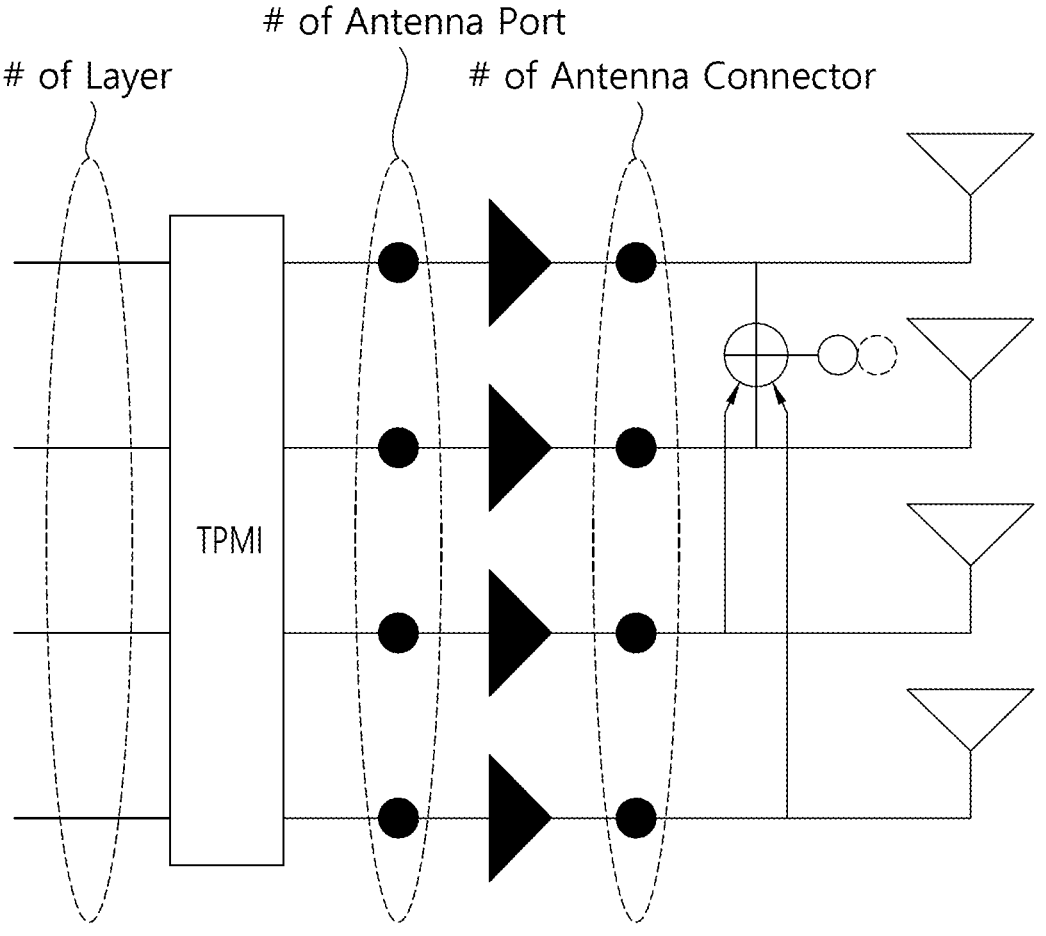
FIG. 18 illustrates an example of a structure for transmitting a 4Tx terminal according to an embodiment of the present specification.

FIG. 18 illustrates the number of layers, the number of antenna ports, and the number of antenna connectors of 4Tx UL-MIMO.

The following drawings are intended to illustrate specific embodiments of the present disclosure. The designations of specific devices or the designations of specific signals/messages/fields shown in the drawings are for illustrative purposes only, and the technical features of the present specification are not limited to the specific designations used in the drawings below.

FIG. 18 illustrates an example of a structure for transmitting a 4Tx terminal according to an embodiment of the present specification.

FIG. 18 is an example of a structure for transmission of a 4Tx terminal. For reference, the example of FIG. 18 may be the same as the case 1 in the above-described examples of FIGS. 11A to 11C.

Figure 19A:
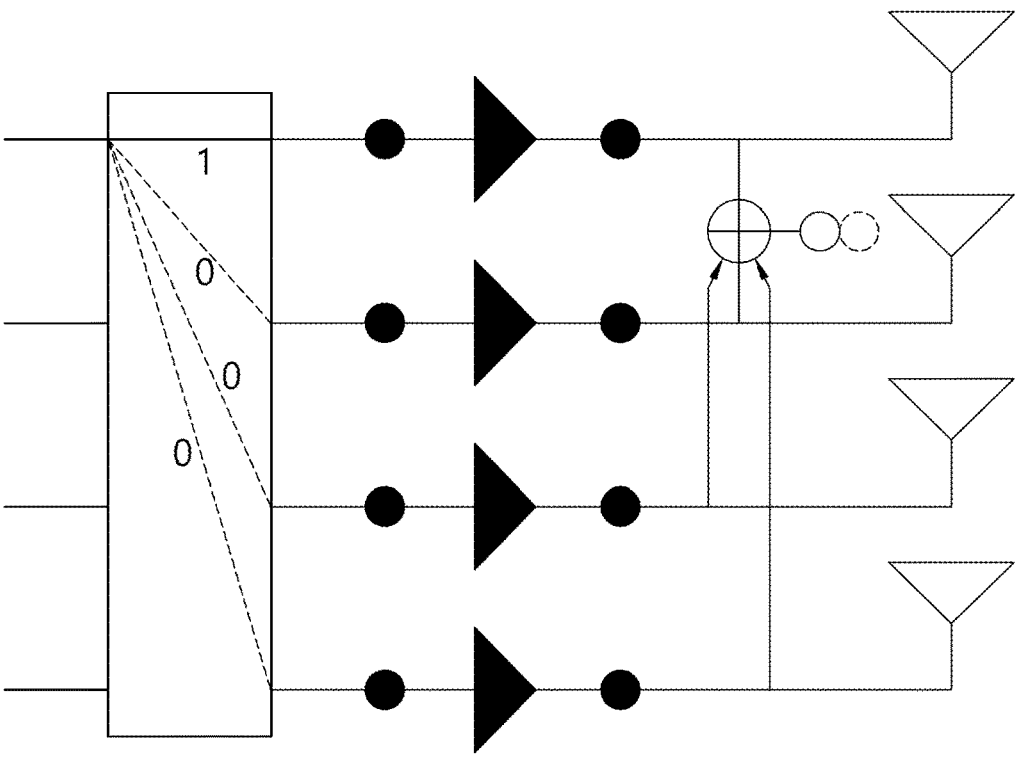
FIGS. 19A to 19G are examples in which TPMI is used in 4Tx1 layer UL-MIMO in Case 1 according to an embodiment of the present disclosure.
Figure 19B:
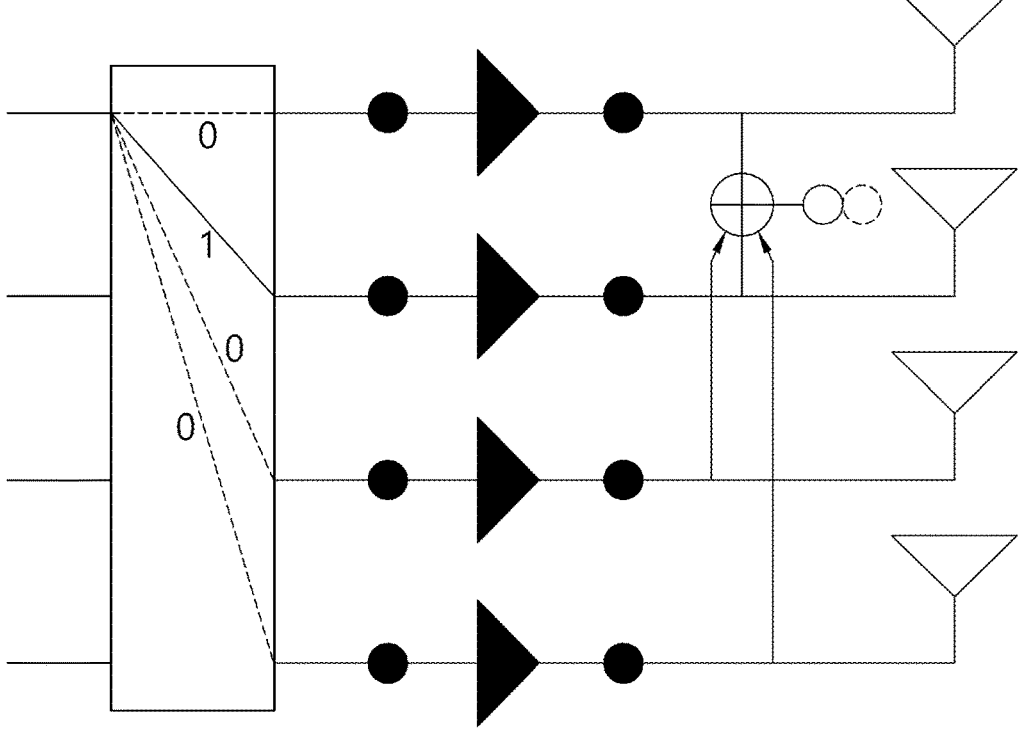
Figure 19C:
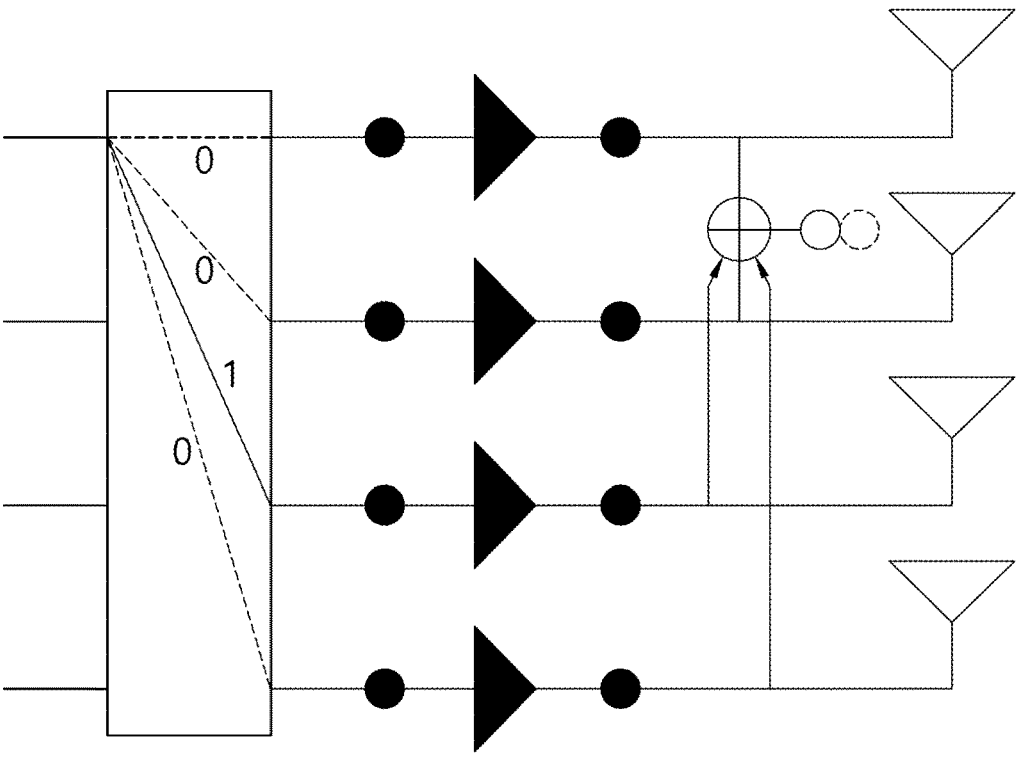
Figure 19D:
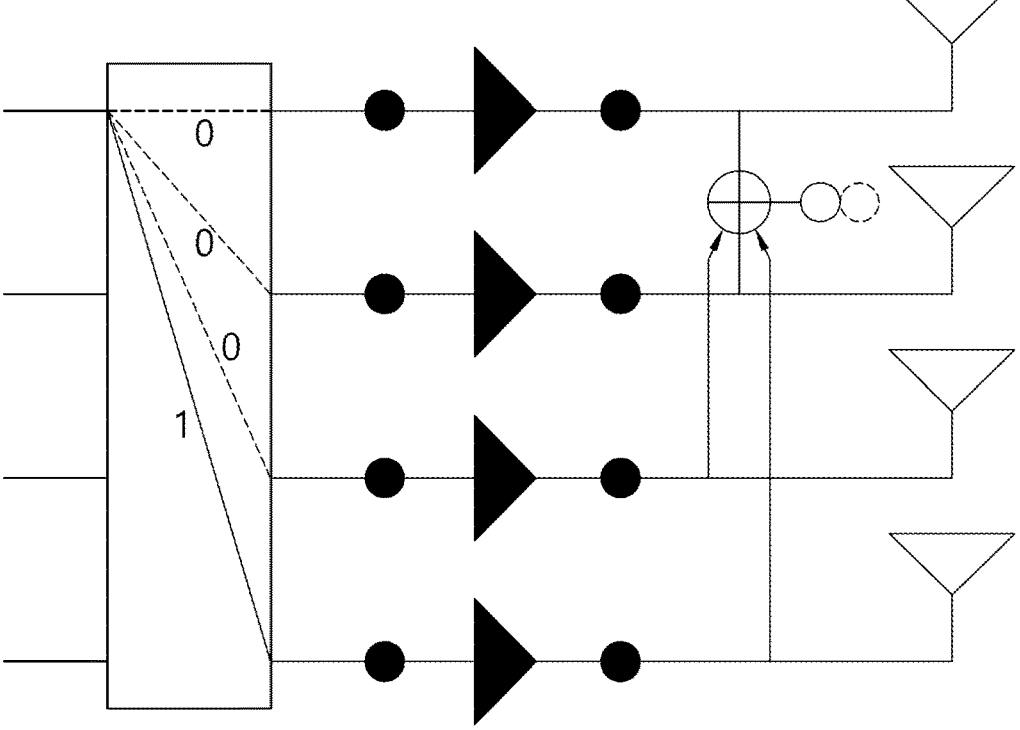
Figure 19E:
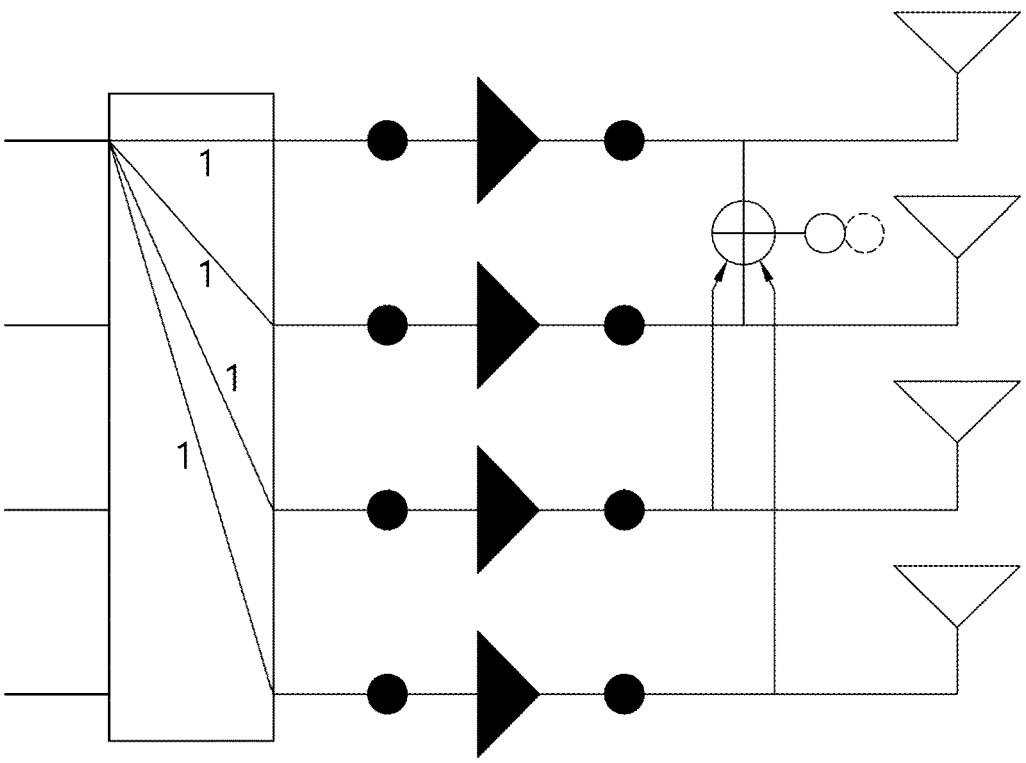
Figure 19F:
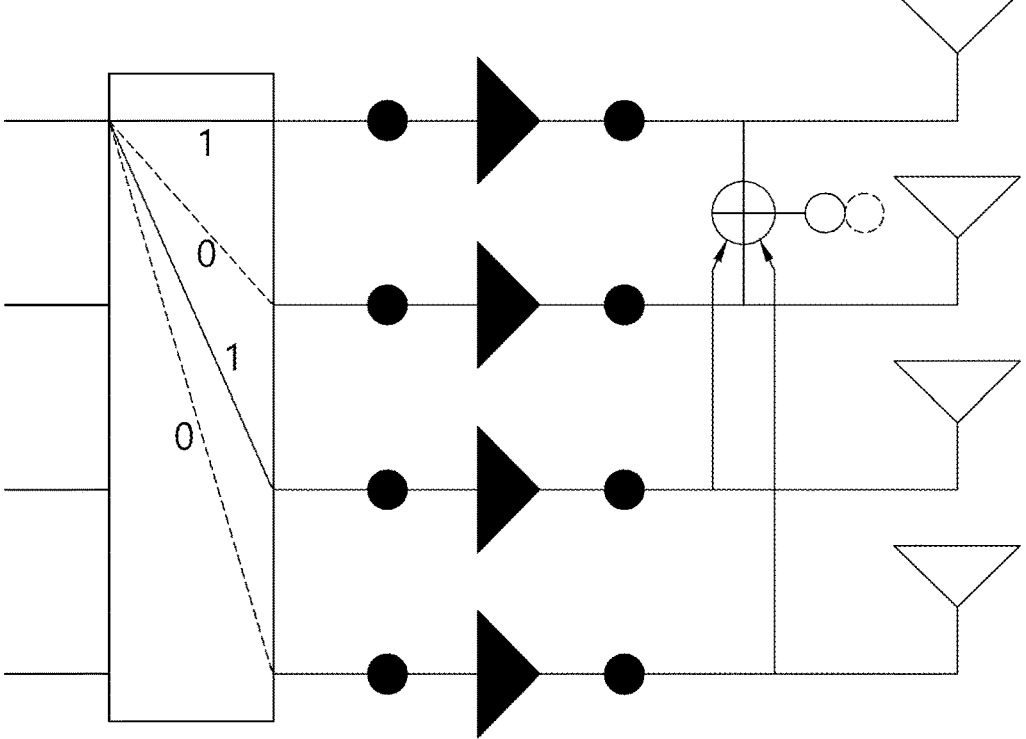
Figure 19G:
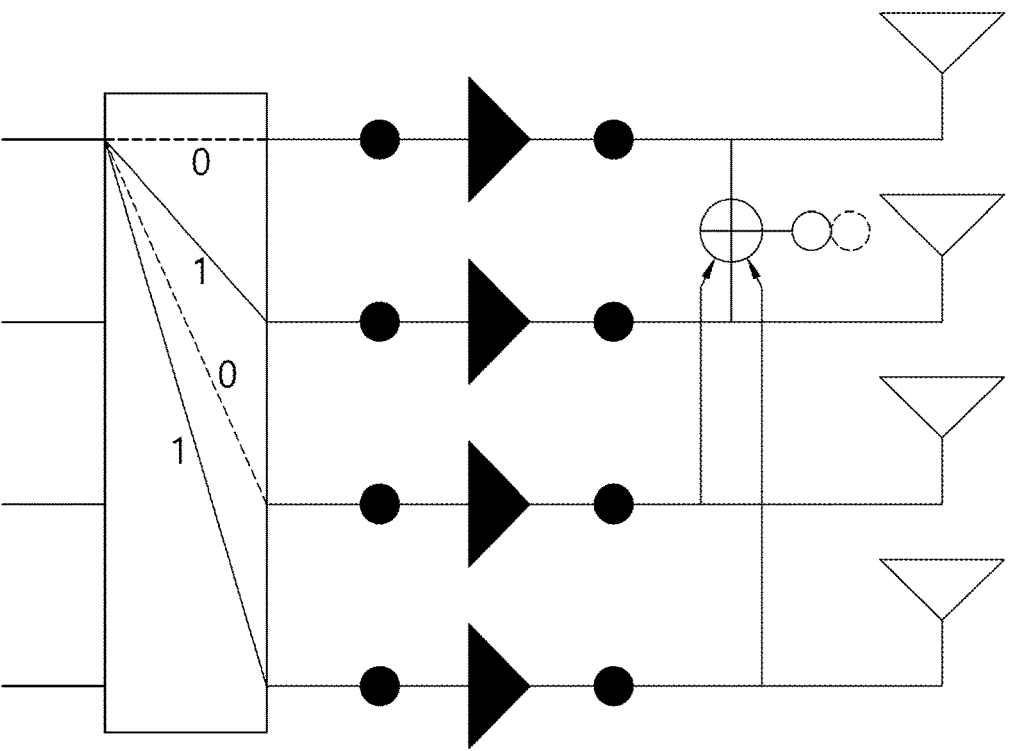
Figure 20A:
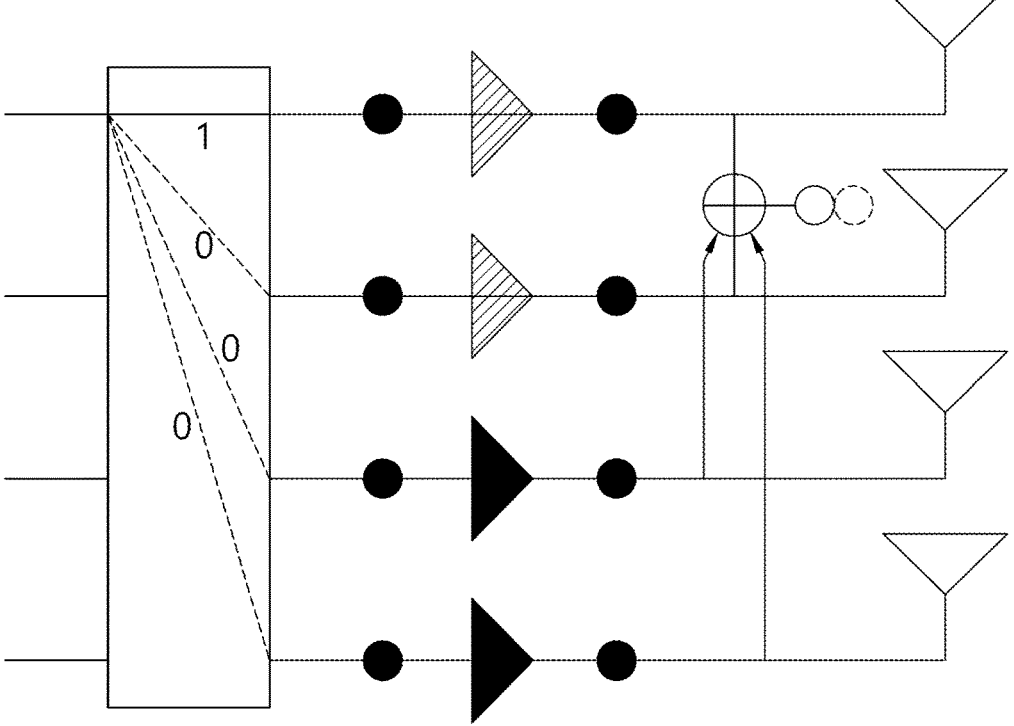
FIGS. 20A to 20H are examples in which TPMI is used in 4Tx1 layer UL-MIMO in Case 2 according to an embodiment of the present disclosure.
Figure 20B:
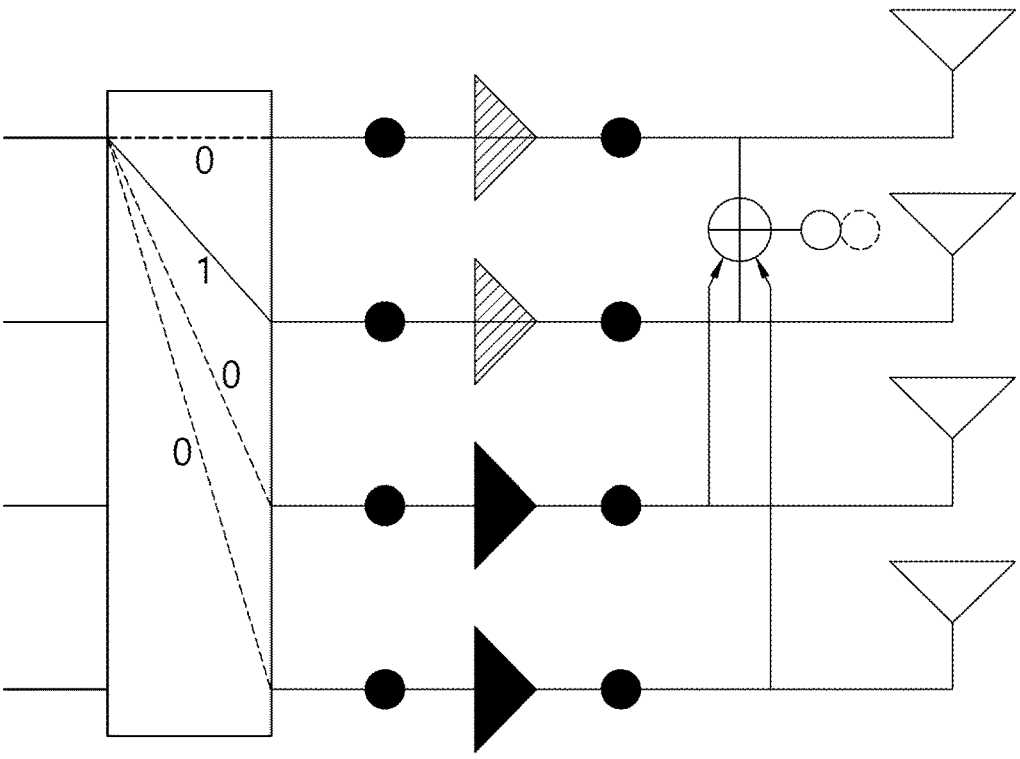
Figure 20C:
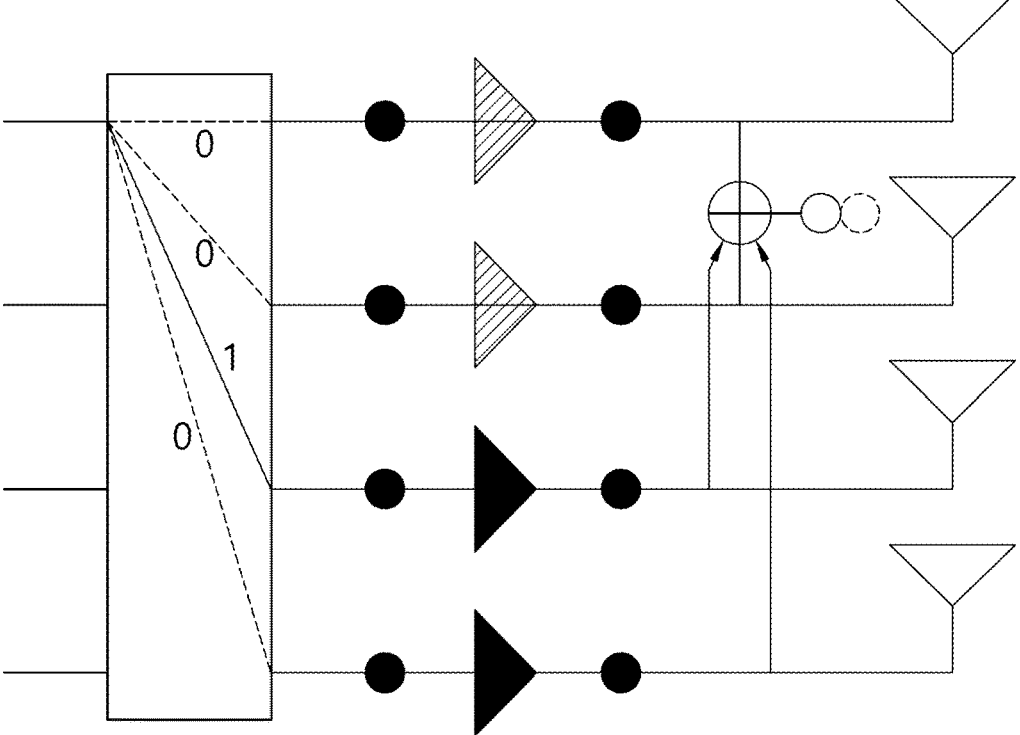
Figure 20D:
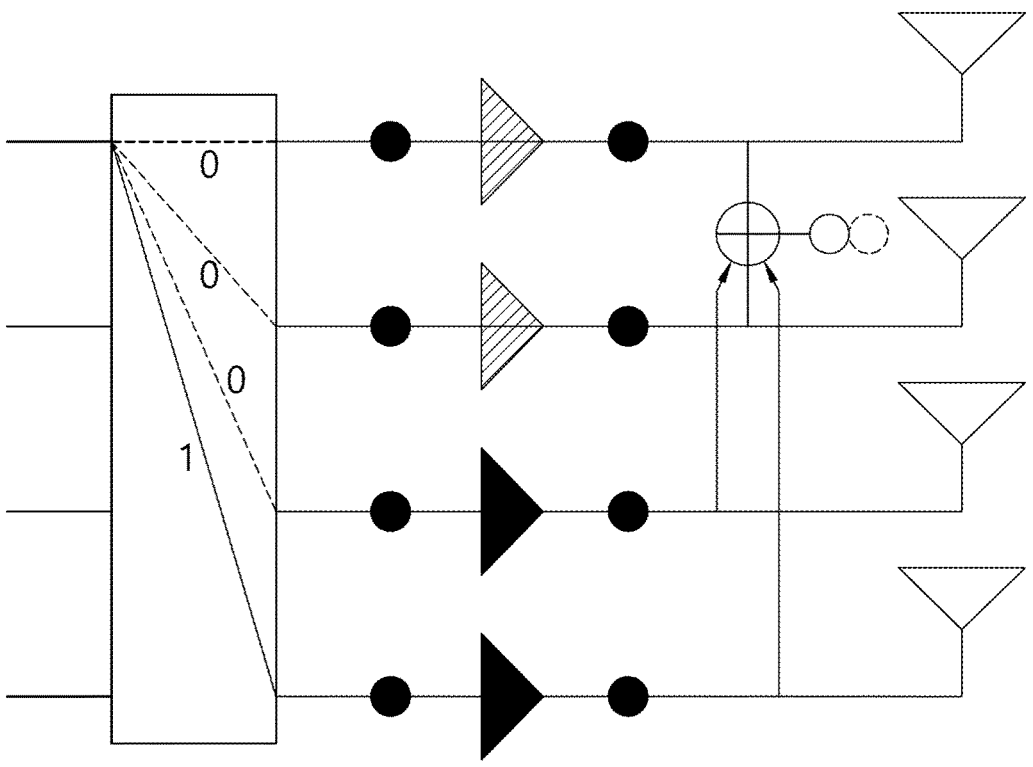
Figure 20E:
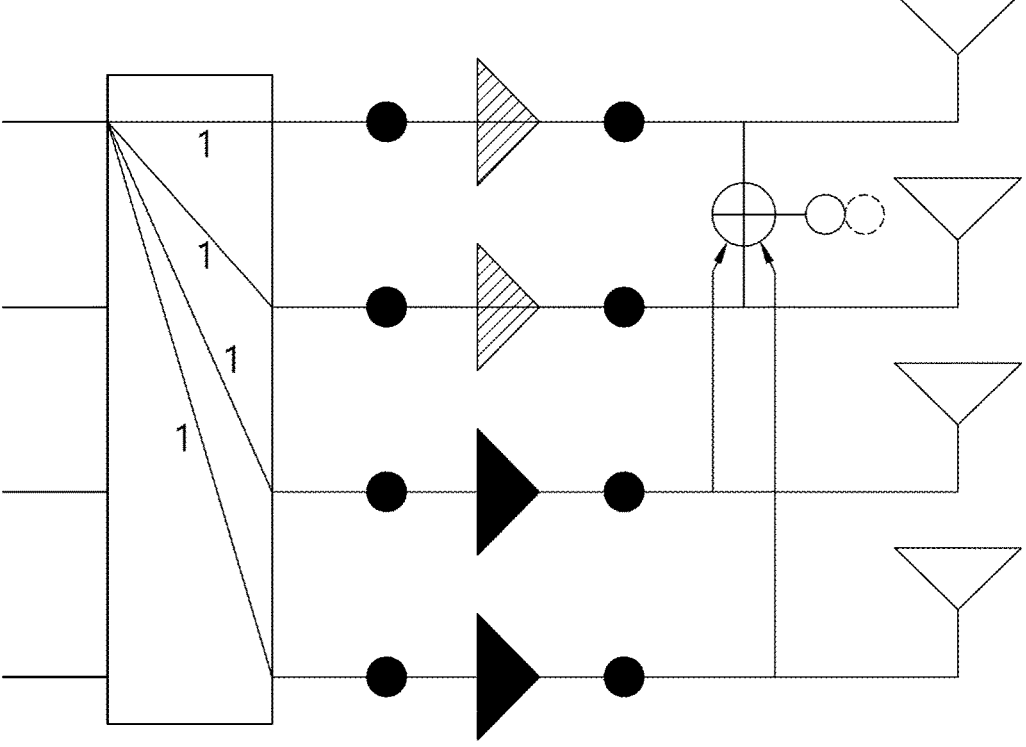
Figure 20F:
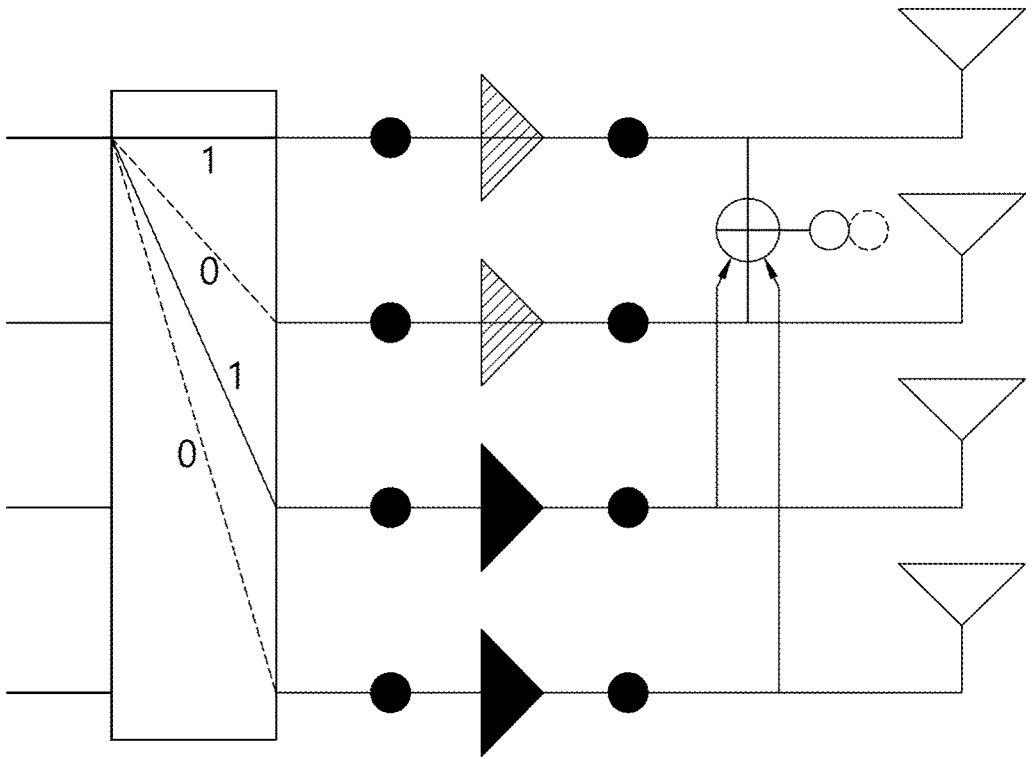
Figure 20G:
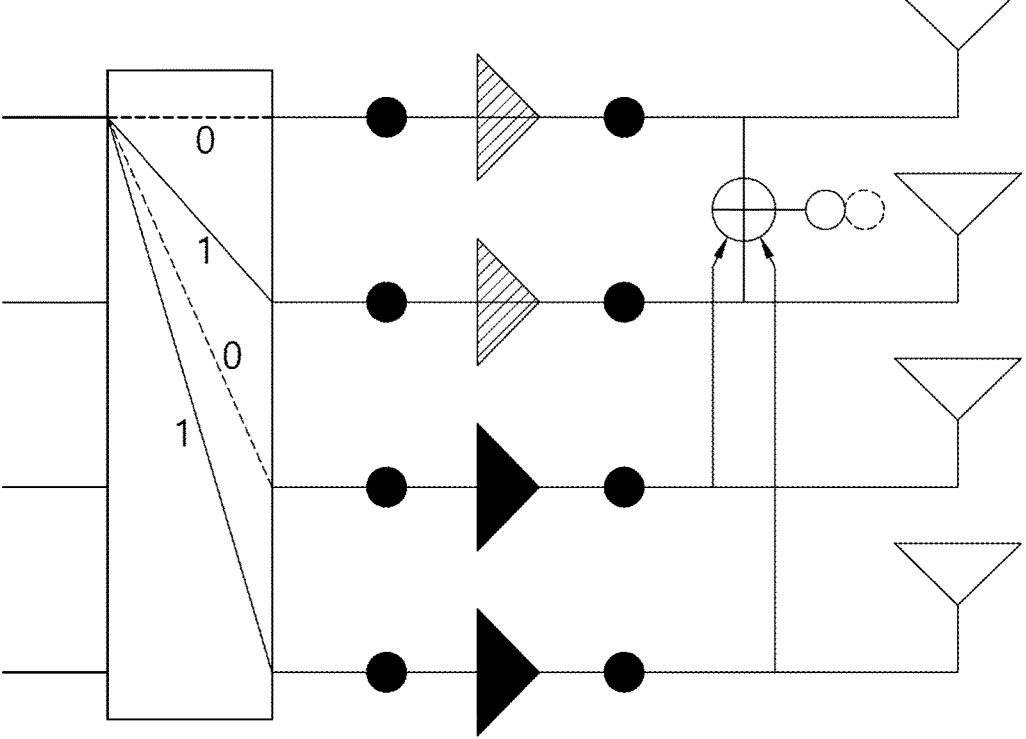
Figure 20H:
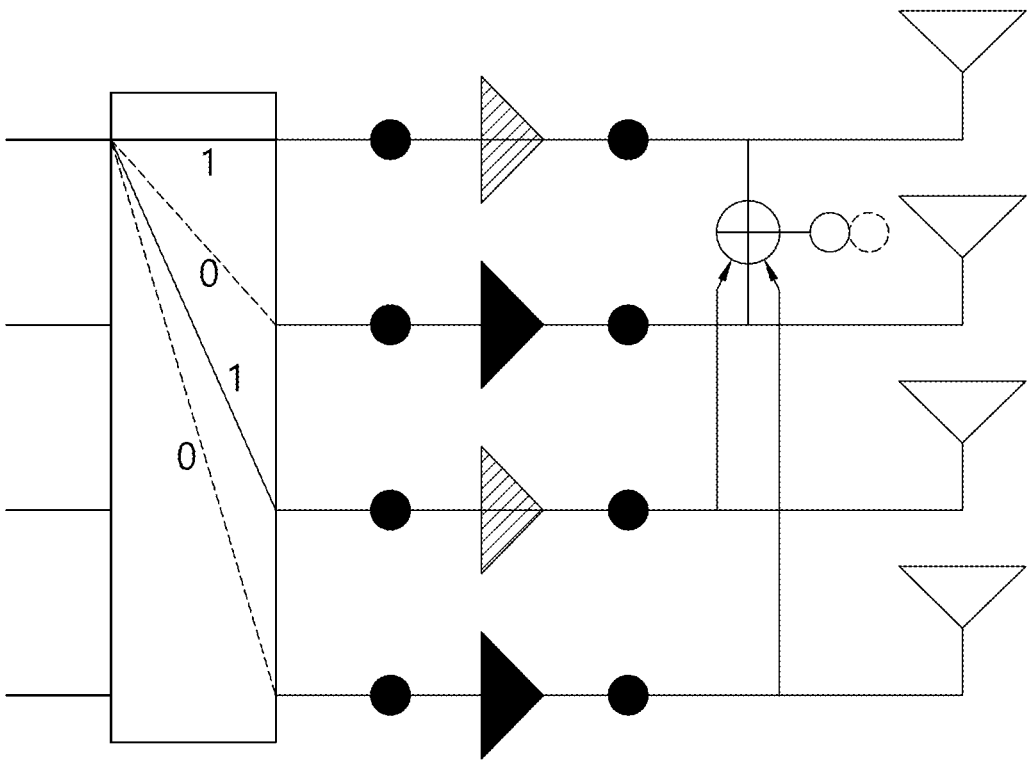
Figure 21A:
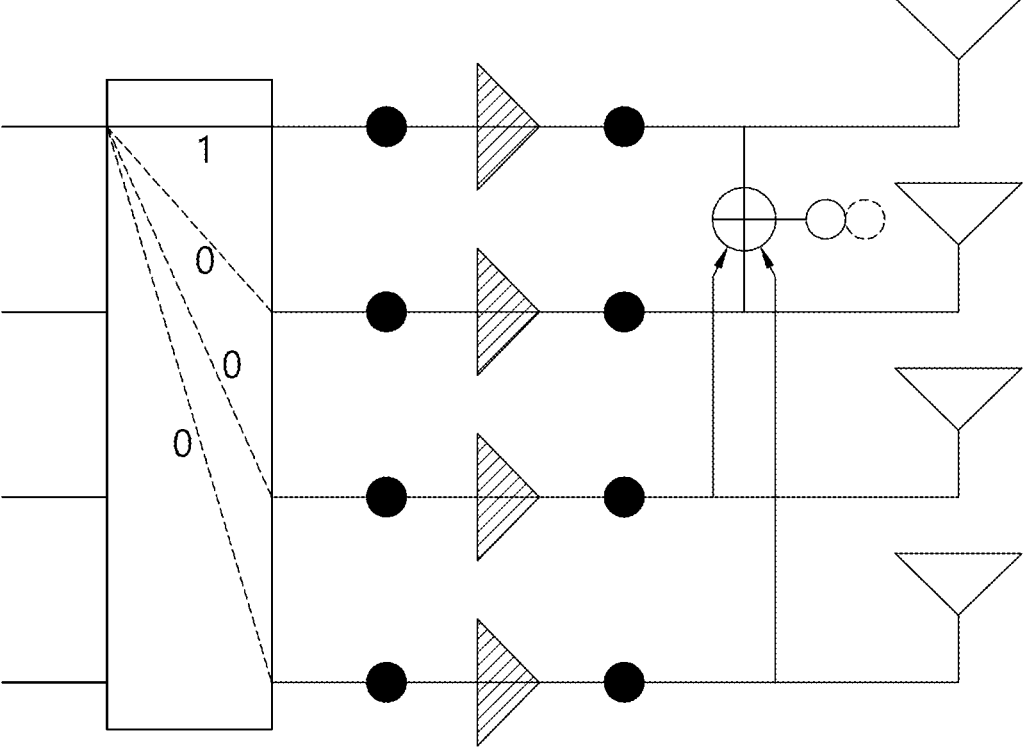
FIGS. 21A to 21G are examples in which TPMI is used in 4Tx1 layer UL-MIMO in Case 3 according to an embodiment of the present disclosure.
Figure 21B:
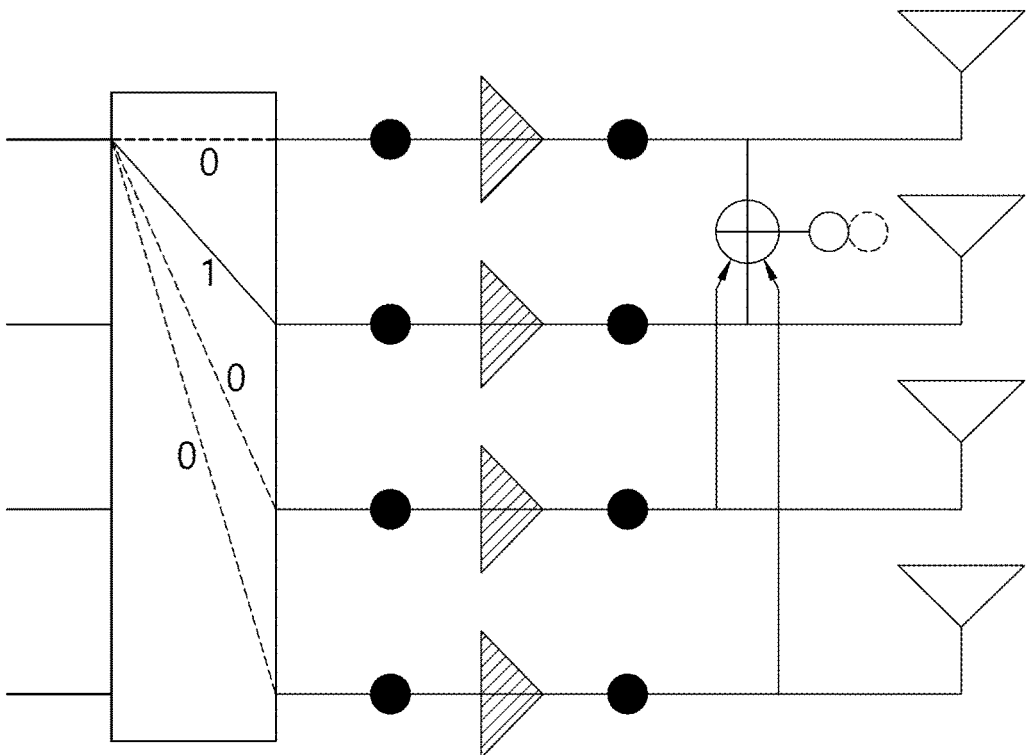
Figure 21C:
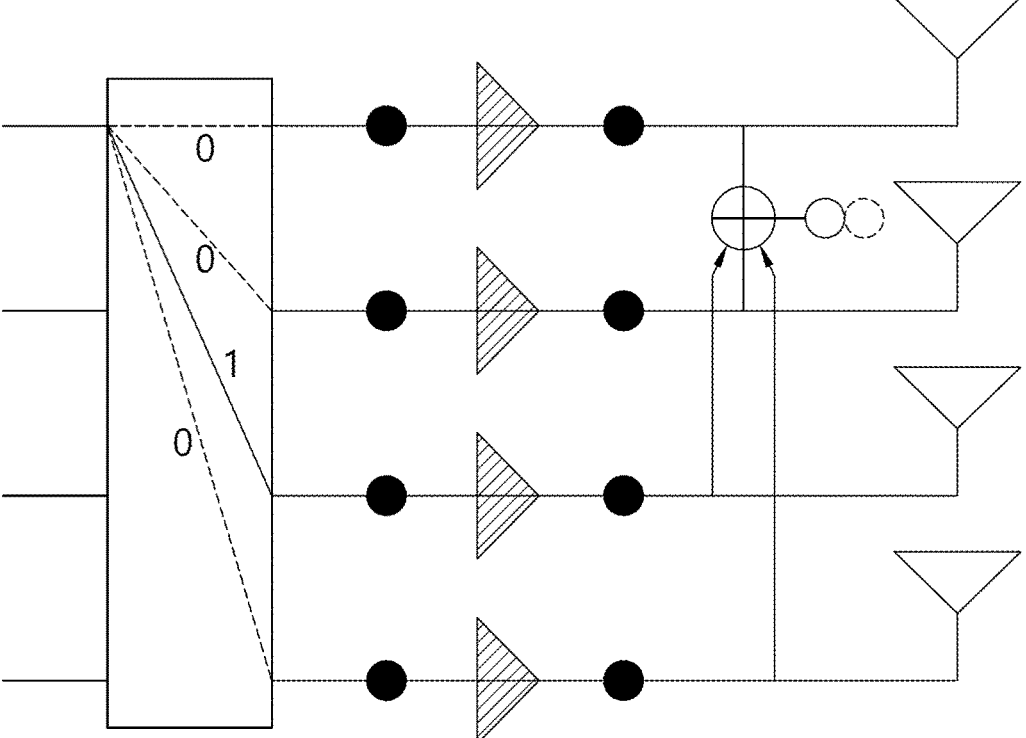
Figure 21D:
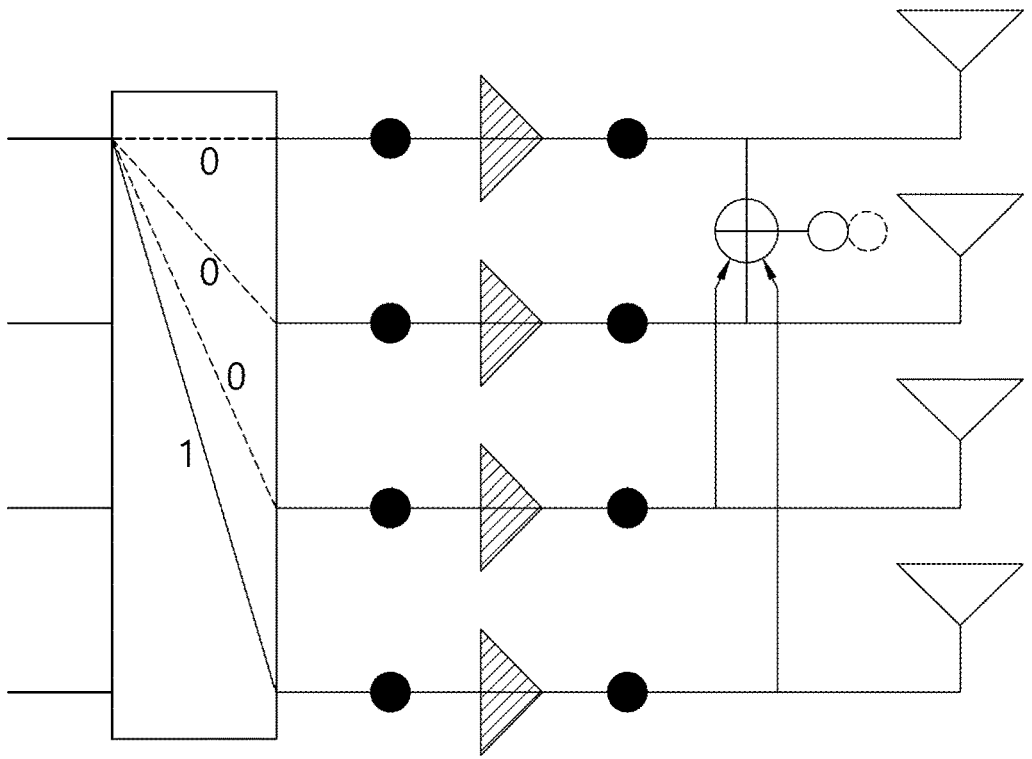
Figure 21E:
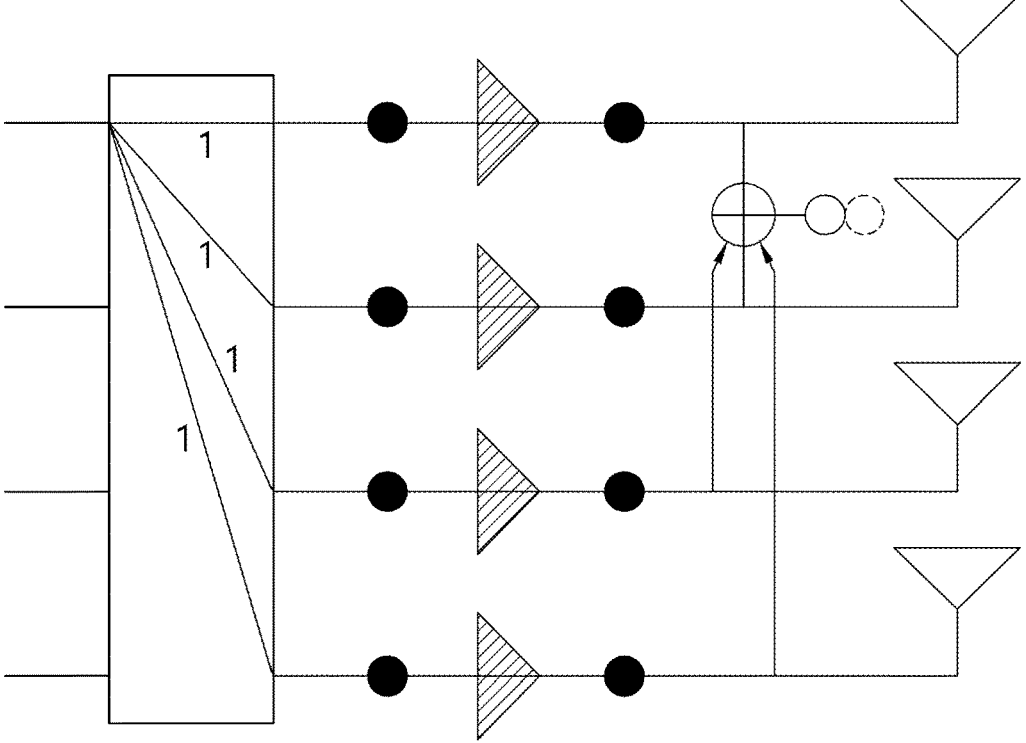
Figure 21F:
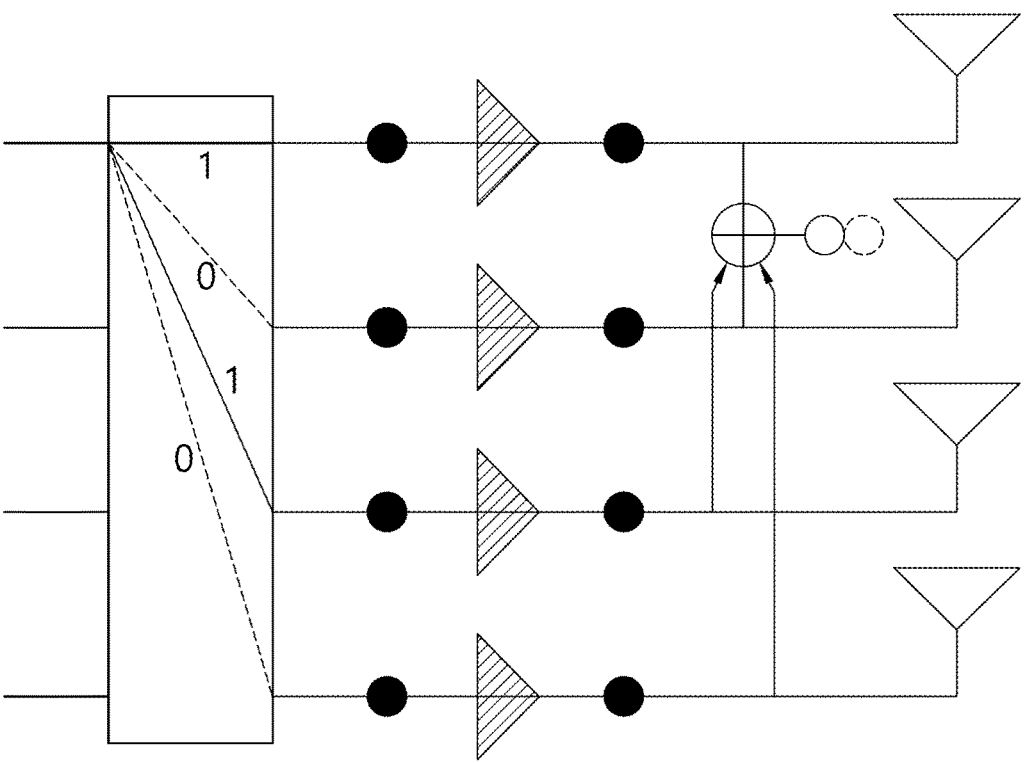
Figure 21G:
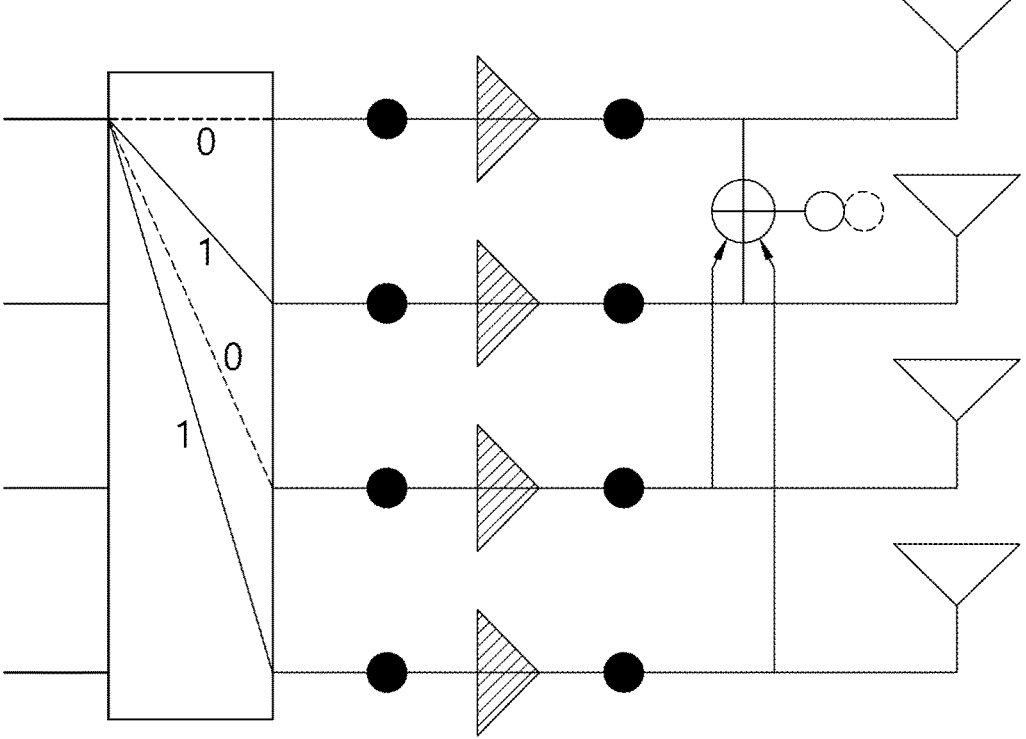

Examples of FIGS. 19A to 19B are examples of TPMI used in full power mode transmission applied to 4Tx 1 layer UL-MIMO corresponding to Case 1.

The following drawings are intended to illustrate specific embodiments of the present disclosure. The designations of specific devices or the designations of specific signals/messages/fields shown in the drawings are for illustrative purposes only, and the technical features of the present specification are not limited to the specific designations used in the drawings below.

FIGS. 19A to 19G are examples in which TPMI is used in 4Tx1 layer UL-MIMO in Case 1 according to an embodiment of the present disclosure.

Examples of FIGS. 19A to 19G are examples in which the TPMI according to the example of FIG. 12 is applied to the 4Tx1 layer UL-MIMO. For example, a precoding matrix W corresponding to the TPMI index, such as the following example, was applied:

a=TPMI index '0'
    b=TPMI index '1'
    c=TPMI index '2'
    d=TPMI index '3'
    e=TPMI index '12'
    f=TPMI index '4'
    g=TPMI index '8'

The 4Tx RF requirements of PC3 based on Case1 is described. For PC3 terminals (e.g., when PA1, PA2, PA3, and PA4 are all 23 dBm PA according to Case 1) that support 4 layer UL-MIMO, PC3 can be specified in the 'ue_PowerClass' signal information of the terminal. The terminal can transmit based on 4 antenna ports. In this case, it is proposed that the total transmit power sum of the four antenna connectors should satisfy 23 dBm. Below is an example.

In the case of PC3 4 layer UL-MIMO, the UE may apply W corresponding to TPMI=0 in FIG. 15. And the terminal can apply PA power back off as follows:
PA1: 6 dB power back off (17 dBm=23 dBm-6 dB)
PA2: 6 dB power back off (17 dBm=23 dBm-6 dB)
PA3: 6 dB power back off (17 dBm=23 dBm-6 dB)
PA4: 6 dB power back off (17 dBm=23 dBm-6 dB)

In the case of PC3 3 layer UL-MIMO, the UE may apply W corresponding to TPMI=0 in FIG. 14. And the terminal can apply PA power back off as follows:
PA1: 6 dB power back off (17 dBm=23 dBm-6 dB)
PA2: 6 dB power back off (17 dBm=23 dBm-6 dB)
PA3: 3 dB power back off (20 dBm=23 dBm-3 dB)
PA4: no power back off (23 dBm)
It is assumed that W of the above TPMI is applied in order of PA1/PA2/PA3/PA4.

In the case of PC3 2 layer UL-MIMO, the UE may apply W corresponding to TPMI=0/1/2/3/4/5 of FIG. 13. And the terminal can apply PA power back off as follows:
PA1: 3 dB power back off (20 dBm=23 dBm-3 dB)
PA2: 3 dB power back off (20 dBm=23 dBm-3 dB)
PA3: 3 dB power back off (20 dBm=23 dBm-3 dB)
PA4: 3 dB power back off (20 dBm=23 dBm-3 dB)
It is assumed that W of the above TPMI is applied in order of PA1/PA2/PA3/PA4.

In case of PC3 1 layer UL-MIMO, the UE may apply W corresponding to TPMI=0/1/2/3 of FIG. 12. And the terminal can apply PA power back off as follows:
PA1: no power back off (23 dBm);
PA2: no power back off (23 dBm);
PA3: no power back off (23 dBm);
PA4: no power back off (23 dBm).

When the PC3 terminal supporting the 4 layer UL-MIMO is Case 1 (e.g., PA1, PA2, PA3, and PA4 are all 23 dBm PA), the uplink full power transmission mode can be set. In the case of 1 layer, TPMI may be assumed as follows, and based on the assumption below, the output power of the UE 23 dBm may be satisfied.

'FullPwrMode': The output power at each connector of the terminal's antenna can satisfy 23 dBm respectively. Alternatively, the UE may apply W corresponding to TPMI=0, 1, 2, 3 of FIG. 12 (e.g., see a to d of FIGS. 19A to 19G). And the terminal can apply PA power back off as follows:
PA1: no power back off
PA2: no power back off
PA3: no power back off
PA4: no power back off 'FullPwrMode2': The output power from one antenna terminal of the terminal can satisfy 23 dBm respectively. Alternatively, the UE may apply W corresponding to TPMI=0 or 1 or 2 or 3 of FIG. 12 (e.g., see a to d of FIGS. 19A to 19G). And the terminal can apply PA power back off as follows:
PA1: no power back off
PA2: no power back off
PA3: no power back off
PA4: no power back off 'FullPwrMode1': The sum of the output power from the four antenna connectors of the terminal can satisfy 23 dBm. Alternatively, the terminal may apply TPMI=12 of FIG. 12 (e.g., see FIGS. 19A to 19G (e)). And the terminal can apply PA power back off as follows:
PA1: 6 dB power back off
PA2: 6 dB power back off
PA3: 6 dB power back off
PA4: 6 dB power back off 'FullPwrMode3': The sum of the output power at the terminal connecting the two antennas of the terminal can satisfy 23 dBm. Alternatively, the UE may apply W corresponding to TPMI=4 or 8 of FIG. 12 (e.g., see (f) of FIGS. 19A to 19G). And the terminal can apply PA power back off as follows:

PA1: 3 dB power back off

PA2: 3 dB power back off

PA3: 3 dB power back off

PA4: 3 dB power back off

'FullPwrMode4': The sum of the output powers of the terminal connecting the two antennas of the two pairs can each satisfy 23 dBm. Alternatively, the UE may apply W corresponding to TPMI={4, 8} of FIG. 12 (e.g., see (f) and (g) of FIGS. 19A to 19G). And the terminal can apply PA power back off as follows:

PA1: 3 dB power back off

PA2: 3 dB power back off

PA3: 3 dB power back off

PA4: 3 dB power back off

Here, in order to satisfy the output power of 23 dBm, power back off applied to each PA may also be considered.

Here, new uplink full power transmission modes, 'FullPwrMode3' and 'FullPwrMode4' are proposed:

If the 'FullPwrMode3' terminal is a 4Tx terminal, the terminal may be a terminal in which the sum of transmit powers of 2 antenna connectors of UL-MIMO satisfies the corresponding 'ue_PowerClass'.

If the 'FullPwrMode4' terminal is a 4Tx terminal, the terminal may be a terminal in which the sum of transmit powers of two pairs of 2 antenna connectors of UL-MIMO satisfies the respective 'ue_PowerClass'.

Here, 'FullPwrMode3' and ', 'FullPwrMode4' do not apply to 2Tx terminals.

Even if the terminal switches to one antenna port and transmits it, it is suggested that the transmission power at one antenna connector satisfies the corresponding 'ue_PowerClass'. (i.e., if UL-MIMO is not set)

The 4Tx RF specification of PC2 based on Case1 is described. PC2 terminals that support 4 layer UL-MIMO (e.g., when PA1, PA2, PA3, and PA4 are all 23 dBm PA according to Case 1) can be designated as PC2 in the 'ue_PowerClass' signal information. In this case, the terminal may transmit based on four antenna ports. In this case, it is proposed that the sum of the total transmission power in the four antenna connectors should satisfy 26 dBm. The following is an example.

In the case of PC2 4 layer UL-MIMO, the terminal may apply W corresponding to TPMI=0 of FIG. 15. In addition, the terminal may apply the PA power back off as follows:

PA1: 3 dB power back off (20 dBm=23 dBm-3 dB)

PA2: 3 dB power back off (20 dBm=23 dBm-3 dB)

PA3: 3 dB power back off (20 dBm=23 dBm-3 dB)

PA4: 3 dB power back off (20 dBm=23 dBm-3 dB)

In the case of PC2 3 layer UL-MIMO, the terminal may apply W corresponding to TPMI=0 of FIG. 14. In addition, the terminal may apply the PA power back off as follows:

PA1: 3 dB power back off (20 dBm=23 dBm-3 dB)

PA2: 3 dB power back off (20 dBm=23 dBm-3 dB)

PA3: no power back off (23 dBm)

PA4: no power back off (23 dBm)

It is assumed that W of the above TPMI is applied in order of PA1/PA2/PA3/PA4.

In the case of PC2 2 layer UL-MIMO, the terminal may apply W corresponding to TPMI=0/1/2/3/4/5 of FIG. 13. In addition, the terminal may apply the PA power back off as follows:

PA1: no power back off (23 dBm)

PA2: no power back off (23 dBm)

PA3: no power back off (23 dBm)

PA4: no power back off (23 dBm)

It is assumed that W of the above TPMI is applied in order of PA1/PA2/PA3/PA4.

In the case of PC22 layer UL-MIMO, the terminal may apply W corresponding to TPMI=0/1/2/3/4/5 of FIG. 13. In addition, the terminal may apply the PA power back off as follows:

PA1: no power back off (23 dBm)

PA2: no power back off (23 dBm)

PA3: no power back off (23 dBm)

PA4: no power back off (23 dBm)

For PC2 terminals that support 4 layer UL-MIMO (e.g., when PA1, PA2, PA3, and PA4 are all 23 dBm PA according to Case 1), the uplink full power transmission mode can be set. In the case of 1 layer, TPMI may be assumed as below, and the output power of the UE may be satisfied based on the following assumption.

'FullPwrMode1': The sum of output power at four antenna connectors of the terminal may satisfy 26 dBm. Alternatively, the terminal may apply W (e.g., see (e) of FIGS. 19A to 19G) corresponding to the TPMI=12 of FIG. 12. In addition, the terminal may apply the PA power back off as follows:

PA1: 3 dB power back off

PA2: 3 dB power back off

PA3: 3 dB power back off

PA4: 3 dB power back off

'FullPwrMode3': The sum of output power at the two antenna connectors of the terminal may satisfy 26 dBm. Alternatively, the terminal may apply W (e.g., (f) of FIGS. 19A to 19G) corresponding to TPMI=4 or 8 of FIG. 12. In addition, the terminal may apply the PA power back off as follows:

PA1: no power back off

PA2: no power back off

PA3: no power back off

PA4: no power back off

'FullPwrMode4': The sum of output power at the two pairs of antenna connectors of the terminal may satisfy 26 dBm, respectively. Alternatively, the terminal may apply W corresponding to TPMI={4, 8} of FIG. 12 (e.g., see f and g of FIGS. 19A to 19G). In addition, the terminal may apply the PA power back off as follows:

PA1: no power back off

PA2: no power back off

PA3: no power back off

PA4: no power back off

Here, new uplink full power transmission modes, 'FullPwrMode3' and 'FullPwrMode4' are proposed:

If the 'FullPwrMode3' terminal is a 4Tx terminal, in the case of a 4Tx terminal, the sum of the transmission power of the two antenna connections of the UL-MIMO satisfies the corresponding 'ue_PowerClass'

If the 'FullPwrMode4' terminal is a 4Tx terminal, in the case of a 4Tx terminal, the sum of the transmission power of the two pairs of antenna connections of the UL-MIMO satisfies the corresponding 'ue_PowerClass'

Here, 'FullPwrMode3' and 'FullPwrMode4' are not applied to the 2Tx terminal.

When the terminal switches to one antenna port and transmits (i.e., when UL-MIMO is not set), the terminal can designate 'txDiversity-r16' support. For example, the following examples may apply:

It is proposed to satisfy the sum of transmission power at the two antenna connectors of 26 dBm; or satisfy the combined transmission power of 26 dBm at the three antenna connectors; or, satisfy the sum of the transmission power at the four antenna connectors of 26 dBm.

Alternatively, UE capability for the number of antennas supporting tx diversity may be newly added. As an example, this capability may be defined as 'txDiversity-r18'. For example, it may be defined in the following form:

'txDiversity-r18'=2, 3, 4; or

'txDiversity2-r18', 'txDiversity3-r18', 'txDiversity4-r18'.

If 'txDiversity-r18' is newly defined, the following description may be applied. If the terminal switches to one antenna port and transmits (no UL-MIMO), the following description may be applied according to the terminals, the 'txDiversity-r18' capability below:

In the case of 'txDiversity-r18'=2 (or 'txDiversity2-r18'), the sum of transmission power at the two antenna connectors may satisfy the corresponding 'ue_Power-Class';

In the case of 'txDiversity-r18'=3 (or 'txDiversity3-r18') the sum of transmission power at the three antenna connectors may satisfy the corresponding 'ue_Power-Class'; or In the case of 'txDiversity-r18'=4 (or 'txDiversity4-r18'), the sum of transmission power at the four antenna connectors may satisfy the corresponding 'ue_Power-Class'.

The terminal can transmit by switching to one antenna port (i.e., when UL-MIMO is not configured). In this case, a terminal to which the 'txDiversity-r16' or "txDiversity-r18' capability is not designated cannot support PC2. Therefore, it is proposed that the terminal informs the network of power class information designated as a power class lower than PC2, that is, PC3 terminal. As an example, a UE in this case may be a UE whose uplink full power transmission mode is 'FullPwrMode1', 'FullPwrMode3', or 'FullPwrMode4'.

The 4Tx RF requirements of PC1.5 based on Case 1 will be described. In the case of a PC1.5 terminal supporting 4 layer UL-MIMO (e.g., when PA1, PA2, PA3, and PA4 are all 23 dBm PAs according to Case 1), 'ue_PowerClass' signal information can be designated as PC1.5. In this case, the terminal can transmit through 4 antenna ports. In this case, the sum of the total transmission powers of the four antenna connectors of the terminal may have to satisfy 29 dBm. Below is an example.

In the case of PC1.5 4 layer UL-MIMO, the UE may apply W corresponding to TPMI=0 in FIG. 15. And the terminal can apply PA power back off as follows:

PA1: no power back off (23 dBm)
PA2: no power back off (23 dBm)
PA3: no power back off (23 dBm)
PA4: no power back off (23 dBm)

In the case of PC1.5 3 layer UL-MIMO, the UE may apply W corresponding to TPMI=1, 2 of FIG. 14. And the terminal can apply PA power back off as follows:

PA1: no power back off (23 dBm)
PA2: no power back off (23 dBm)
PA3: no power back off (23 dBm)
PA4: no power back off (23 dBm)

In the case of PC1.5 2 layer UL-MIMO, the UE may apply W corresponding to TPMI=6/7/8/9/10/11/12/13 of FIG. 13. And the terminal can apply PA power back off as follows:

PA1: no power back off (23 dBm)
PA2: no power back off (23 dBm)
PA3: no power back off (23 dBm)
PA4: no power back off (23 dBm)

In the case of PC1.5 1 layer UL-MIMO, the UE may apply W corresponding to TPMI=12 of FIG. 12. And the terminal can apply PA power back off as follows:

PA1: no power back off (23 dBm)
PA2: no power back off (23 dBm)
PA3: no power back off (23 dBm)
PA4: no power back off (23 dBm)

For a PC1.5 terminal supporting 4 layer UL-MIMO (e.g., when PA1, PA2, PA3, and PA4 are all 23 dBm PAs), uplink full power transmission mode can be configured. In the case of layer 1, TPMI can be assumed as follows, and the output power of the UE of 29 dBm can be satisfied based on the following assumption.

'FullPwrMode1': The sum of the output powers from the four antenna connectors of the terminal can satisfy 29 dBm. Alternatively, the UE may apply W corresponding to TPMI=12 of FIG. 12 (e.g., see (e) of FIGS. 19A to 19G). And the terminal can apply PA power back off as follows:

PA1: no power back off
PA2: no power back off
PA3: no power back off
PA4: no power back off When the terminal switches to one antenna port and transmits (i.e., when UL-MIMO is not set), the terminal can designate 'txDiversity-r16' support. For example, the following examples may apply:

It is proposed to satisfy the sum of transmit power of 29 dBm in 4 antenna connectors.

Alternatively, UE capability for the number of antennas supporting tx diversity may be newly added. As an example, this capability may be defined as 'txDiversity-r18'. For example, it may be defined in the following form:

'txDiversity-r18'=2, 3, 4; or

'txDiversity2-r18', 'txDiversity3-r18', 'txDiversity4-r18'.

If 'txDiversity-r18' is newly defined, the following description may be applied. If the terminal switches to one antenna port and transmits (no UL-MIMO), the following description may be applied according to the terminal's the 'txDiversity-r18' capability below:

In the case of 'txDiversity-r18'=4 (or 'txDiversity4-r18'), the sum of transmission power at the four antenna connectors may satisfy the corresponding 'ue_PowerClass'.

The terminal may switch to one antenna port and transmit the signal (that is, when the UL-MIMO is not set). In this case, a terminal that does not specify a 'txDiversity-r16' or 'txDiversity-r18' capability cannot support PC1.5ue_PowerClass. Accordingly, the terminal may inform the network of power class information designated as a PC3 terminal and power class information lower than PC1.5. For example, the terminal in this case may be a terminal in which the uplink full power transmission mode is 'FullPwrMode1'.

The terminal may support 4 layer UL-MIMO with Case 2 (e.g., 26 dBm+26 dBm+23 dBm). In this case, the 4Tx RF requirements of the UE will be described.

In this case, the 4Tx RF standard for PC3, PC2, and PC1.5 terminals supporting 4 layer UL-MIMO may be defined based on the following assumptions. For example, the RF standard for such a terminal assumes TPMI (Transmit Precoding Matrix Indicator)=0, corresponding W (e.g., W corresponding to TMPI 0 in FIG. 15), 1 SRS resource and 4 SRS antenna ports 4Tx RF standards can be defined.

Examples of FIGS. 20A to 20H are examples of TPMI used in full power mode transmission applied to 4Tx1 layer UL-MIMO corresponding to Case 2.

The following drawings are intended to illustrate specific embodiments of the present disclosure. The designations of specific devices or the designations of specific signals/messages/fields shown in the drawings are for illustrative purposes only, and the technical features of the present specification are not limited to the specific designations used in the drawings below.

FIGS. 20A to 20H are examples in which TPMI is used in 4Tx1 layer UL-MIMO in Case 2 according to an embodiment of the present disclosure.

Examples of FIGS. 20A to 20H are examples in which the TPMI according to the example of FIG. 12 is applied to the 4Tx1 layer UL-MIMO.

The 4Tx RF requirements of PC3 based on Case2 is described. In the case of PC3 terminals that support 4 layer UL-MIMO (e.g., PA1, PA2 are 26 dB PA, PA3, PA4 are 23 dBm PA), the terminal can designate the terminal's 'ue_PowerClass' signal information as PC3. The terminal may transmit based on four antenna ports. In this case, it is proposed that the sum of the total transmission power in the four antenna connectors should satisfy 23 dBm. The following is an example.

In the case of PC3 4 layer UL-MIMO, the terminal may apply W corresponding to TPMI=0 of FIG. 15. In addition, the terminal may apply the PA power back off as follows:

PA1: 9 dB power back off (17 dBm=26 dBm-9 dB)
PA2: 9 dB power back off (17 dBm=26 dBm-9 dB)
PA3: 6 dB power back off (17 dBm=23 dBm-6 dB)
PA4: 6 dB power back off (17 dBm=23 dBm-6 dB)

In the case of PC3 4 layer UL-MIMO, the terminal may apply W corresponding to TPMI=0 of FIG. 15. In addition, the terminal may apply the PA power back off as follows:

PA1: 9 dB power back off (17 dBm=26 dBm-9 dB)
PA2: 9 dB power back off (17 dBm=26 dBm-9 dB)
PA3: 3 dB power back off (20 dBm=23 dBm-3 dB)
PA4: no power back off (23 dBm)

It is assumed that W of the above TPMI is applied in order of PA1/PA2/PA3/PA4.

In the case of PC3 2 layer UL-MIMO, the terminal may apply W corresponding to TPMI=0/1/2/3/4/5 of FIG. 13. In addition, the terminal may apply the PA power back off as follows:

PA1: 6 dB power back off (20 dBm=26 dBm-6 dB)
PA2: 6 dB power back off (20 dBm=26 dBm-6 dB)
PA3: 3 dB power back off (20 dBm=23 dBm-3 dB)
PA4: 3 dB power back off (20 dBm=23 dBm-3 dB)

It is assumed that W of the above TPMI is applied in order of PA1/PA2/PA3/PA4.

In the case of PC3 1 layer UL-MIMO, the terminal may apply W corresponding to TPMI=0/1/2/3 of FIG. 12. In addition, the terminal may apply the PA power back off as follows:

PA1: 3 dB power back off (23 dBm=26 dBm-3 dB)
PA2: 3 dB power back off (23 dBm=26 dBm-3 dB)
PA3: no power back off (23 dBm)
PA4: no power back off (23 dBm)

When the PC3 terminal supporting the 4 layer UL-MIMO is Case 2 (e.g., PA1, PA2 are 26 dBm, PA3, and PA4 are 23 dBm), the uplink full power transmission mode can be set. In the case of 1 layer, TPMI may be assumed as follows, and based on the assumption below, the output power of the UE 23 dBm may be satisfied.

'FullPwrMode': The output power at each connector of the antenna of the terminal may satisfy 23 dBm, respectively. Alternatively, the terminal may apply W corresponding to TPMI=0, 1, 2, 3 of FIG. 12 (for example, see FIGS. 20A to 20D). In addition, the terminal may apply the PA power back off as follows:

PA1: 3 dB power back off
PA2: 3 dB power back off
PA3: no power back off
PA4: no power back off 'FullPwrMode2': The output power at one antenna connector of the terminal may satisfy 23 dBm, respectively. Alternatively, the terminal may apply W corresponding to TPMI=0 or 1 or 2 or 3 of FIG. 12 (for example, see FIGS. 20A to 20D). In addition, the terminal may apply the PA power back off as follows:

PA1: 3 dB power back off
PA2: 3 dB power back off
PA3: no power back off
PA4: no power back off 'FullPwrMode1': The sum of output power at four antenna connectors of the terminal may satisfy 23 dBm. Alternatively, the terminal may apply W corresponding to the TPMI=12 of FIG. 12 (for example, see FIG. 20e). In addition, the terminal may apply the PA power back off as follows:

PA1: 9 dB power back off
PA2: 9 dB power back off
PA3: 6 dB power back off
PA4: 6 dB power back off 'FullPwrMode3': The sum of output power at the two antenna connectors of the terminal may satisfy 23 dBm. Alternatively, the terminal may apply W corresponding to TPMI=4 or 8 of FIG. 12 (for example, see FIG. 20F):

PA1: 6 dB power back off
PA2: 6 dB power back off
PA3: 3 dB power back off
PA4: 3 dB power back off 'FullPwrMode4': The sum of output power at the two pairs of antenna connectors of the terminal may satisfy 23 dBm, respectively. Alternatively, the terminal may apply W corresponding to TPMI={4, 8} of FIG. 12 (e.g., see FIG. 20F, FIG. 20G):

PA1: 6 dB power back off
PA2: 6 dB power back off
PA3: 3 dB power back off
PA4: 3 dB power back off Here, in order to satisfy the output power of 23 dBm, power back off applied to each PA may also be considered.

Here, new uplink full power transmission modes, 'FullPwrMode3' and 'FullPwrMode4' are proposed:

If the 'FullPwrMode3' terminal is a 4Tx terminal, the terminal may be a terminal in which the sum of transmit powers of 2 antenna connectors of UL-MIMO satisfies the corresponding 'ue_PowerClass'.

If the 'FullPwrMode4' terminal is a 4Tx terminal, the terminal may be a terminal in which the sum of transmit powers of two pairs of 2 antenna connectors of UL-MIMO satisfies the respective 'ue_PowerClass'.

Here, 'FullPwrMode3' and ', 'FullPwrMode4' do not apply to 2Tx terminals.

Even if the terminal switches to one antenna port and transmits it, it is suggested that the transmission power at one antenna connector satisfies the corresponding 'ue_PowerClass'. (i.e., if UL-MIMO is not set)

The 4Tx RF specification of PC2 based on Case2 is described. In the case of a PC2 terminal that supports 4 layer UL-MIMO (e.g., when PA1, PA2 is 26 dBm, PA3, and PA4 is 23 dBm according to Case 2), the terminal designate PC2 information in the 'ue_PowerClass' signal information as PC2. In this case, the terminal may transmit to four antenna ports. In this case, it is proposed that the sum of the total transmission power in the four antenna connectors should satisfy 26 dBm. The following is an example.

In the case of PC2 4 layer UL-MIMO, the terminal may apply W corresponding to TPMI=0 of FIG. 15. In addition, the terminal may apply the PA power back off as follows:

PA1: 6 dB power back off (20 dBm=26 dBm-6 dB)

PA2: 6 dB power back off (20 dBm=26 dBm-6 dB)

PA3: 3 dB power back off (20 dBm=23 dBm-3 dB)

PA4: 3 dB power back off (20 dBm=23 dBm-3 dB)

In the case of PC2 3 layer UL-MIMO, the terminal may apply W corresponding to TPMI=0 of FIG. 14. In addition, the terminal may apply the PA power back off as follows:

PA1: 6 dB power back off (20 dBm=26 dBm-6 dB)

PA2: 6 dB power back off (20 dBm=26 dBm-6 dB)

PA3: no power back off (23 dBm)

PA4: no power back off (23 dBm)

It is assumed that W of the above TPMI is applied in order of PA1/PA2/PA3/PA4.

In the case of PC2 2 layer UL-MIMO, the terminal may apply W corresponding to TPMI=0/1/2/3/4/5 of FIG. 13. In addition, the terminal may apply the PA power back off as follows:

PA1: 3 dB power back off (23 dBm=26 dBm-3 dB)

PA2: 3 dB power back off (23 dBm=26 dBm-3 dB)

PA3: no power back off (23 dBm)

PA4: no power back off (23 dBm)

It is assumed that W of the above TPMI is applied in order of PA1/PA2/PA3/PA4.

In the case of PC2 1 layer UL-MIMO, the terminal may apply W corresponding to TPMI=0/1 of FIG. 12. For reference, TPMI=2/3 may be applied when PA3=PA4=26 dBm and PA1=PA2=23 dBm. In addition, the terminal may apply the PA power back off as follows:

PA1: no power back off (26 dBm)

PA2: no power back off (26 dBm)

PA3: no power back off (23 dBm)

PA4: no power back off (23 dBm)

For PC2 terminals that support 4 layer UL-MIMO (e.g., when PA1, PA2 is 26 dBm, PA3, and PA4 is 23 dBm according to Case 2), the uplink full power transmission mode can be set. In the case of 1 layer, TPMI may be assumed as below, and the output power of the UE may be satisfied based on the following assumption.

'FullPwrMode2': The output power at one antenna connector of the terminal may satisfy 26 dBm. Alternatively, the terminal may apply W (e.g., see FIG. 20A, FIG. 20B) corresponding to TPMI=0 or 1 of FIG. 12. In addition, the terminal may apply the PA power back off as follows:

PA1: no power back off

PA2: no power back off

PA3: no power back off

PA4: no power back off

'FullPwrMode1': The sum of output power at four antenna connectors of the terminal may satisfy 26 dBm. Alternatively, the terminal may apply W (e.g., see FIG. 20E) corresponding to the TPMI=12 of FIG. 12. In addition, the terminal may apply the PA power back off as follows:

PA1: 6 dB power back off

PA2: 6 dB power back off

PA3: 3 dB power back off

PA4: 3 dB power back off

'FullPwrMode3': The sum of the output power at the two antenna connectors of the terminal may satisfy 26 dBm. Alternatively, the terminal may apply W (e.g., see FIG.

20*f*) corresponding to TPMI=4 or 8 of FIG. 12. In addition, the terminal may apply the PA power back off as follows:

PA1: 3 dB power back off

PA2: 3 dB power back off

PA3: no power back off

PA4: no power back off

'FullPwrMode4': The sum of the output power at the two antenna connectors of the pair may satisfy 26 dBm, respectively. Alternatively, the terminal may apply W (e.g., 20*f* of FIG. 20G) corresponding to TPMI={4, 8} of FIG. 12. In addition, the terminal may apply the PA power back off as follows:

PA1: 3 dB power back off

PA2: 3 dB power back off

PA3: no power back off

PA4: no power back off

Here, new uplink full power transmission modes, 'FullPwrMode3' and 'FullPwrMode4' are proposed:

If the 'FullPwrMode3' terminal is a 4Tx terminal, in the case of a 4Tx terminal, the sum of the transmission power of the two antenna connections of the UL-MIMO satisfies the corresponding 'ue_PowerClass'

If the 'FullPwrMode4' terminal is a 4Tx terminal, in the case of a 4Tx terminal, the sum of the transmission power of the two pairs of antenna connections of the UL-MIMO satisfies the corresponding 'ue_Power-Class'

Here, 'FullPwrMode3' and 'FullPwrMode4' are not applied to the 2Tx terminal.

The terminal can transmit by switching to one antenna port (i.e., when UL-MIMO is not set). In this case, the transmission power of one antenna connector of the terminal may satisfy the corresponding 'ue_PowerClass' (if UL-MIMO is not configured).

The 4Tx RF standard of PC1.5 based on Case 2 will be described. In the case of a PC1.5 terminal (e.g., when PA1 and PA2 are 26 dBm and PA3 and PA4 are 23 dBm according to Case 2) supporting 4 layer UL-MIMO, 'ue_PowerClass' signal information can be designated as PC1.5. In this case, the terminal can transmit based on 4 antenna ports. In this case, the sum of the total transmission powers of the four antenna connectors of the terminal may have to satisfy 29 dBm. Below is an example.

In the case of PC1.5 4 layer UL-MIMO, the terminal may apply W corresponding to TPMI=0 in FIG. 15. And the terminal can apply PA power back off as follows:

PA1: 3 dB power back off (23 dBm=26 dBm-3 dB)

PA2: 3 dB power back off (23 dBm=26 dBm-3 dB)

PA3: no power back off (23 dBm)

PA4: no power back off (23 dBm)

In the case of PC1.5 3 layer UL-MIMO, the terminal may apply W corresponding to TPMI=1, 2 in FIG. 14. And the terminal can apply PA power back off as follows:

PA1: 3 dB power back off (23 dBm=26 dBm-3 dB)

PA2: 3 dB power back off (23 dBm=26 dBm-3 dB)

PA3: no power back off (23 dBm)

PA4: no power back off (23 dBm)

In the case of PC1.5 2 layer UL-MIMO, the terminal may apply W corresponding to TPMI=6/7/8/9/10/11/12/13 of FIG. 13. And the terminal can apply PA power back off as follows:

PA1: 3 dB power back off (23 dBm=26 dBm-3 dB)

PA2: 3 dB power back off (23 dBm=26 dBm-3 dB)

PA3: no power back off (23 dBm)

PA4: no power back off (23 dBm)

In the case of PC1.5 1 layer UL-MIMO, the terminal may apply W corresponding to TPMI=12 of FIG. 12. And the terminal can apply PA power back off as follows:

PA1: 3 dB power back off (23 dBm=26 dBm-3 dB)

PA2: 3 dB power back off (23 dBm=26 dBm-3 dB)

PA3: no power back off (23 dBm)

PA4: no power back off (23 dBm)

For PC1.5 terminals that support 4 layer UL-MIMO (e.g., when PA1, PA2 is 26 dBm, PA3, and PA4 are 23 dBm according to Case 2), the uplink full power transmission mode can be set. In the case of 1 layer, TPMI may be assumed as follows, and the output power of the UE may be satisfied based on the assumption below.

'FullPwrMode1': The sum of output power at four antenna connectors of the terminal may satisfy 29 dBm. Alternatively, the terminal may apply W (e.g., see FIG. 20E) corresponding to the TPMI=12 of FIG. 12. In addition, the terminal may apply the PA power back off as follows:

PA1: 3 dB power back off (23 dBm=26 dBm-3 dB)

PA2: 3 dB power back off (23 dBm=26 dBm-3 dB)

PA3: no power back off (23 dBm)

PA4: no power back off (23 dBm)

'FullPwrMode3': The sum of the output power at the two antenna connectors of the terminal may satisfy 29 dBm. Alternatively, the terminal may apply W (e.g., see FIG. 20H) corresponding to TPMI=4 or 8 of FIG. 12. In addition, the terminal may apply the PA power back off as follows:

PA1: no power back off

PA2: no power back off

PA3: no power back off

PA4: no power back off

When the terminal switches to one antenna port and transmits (i.e., when UL-MIMO is not set), the terminal can designate 'txDiversity-r16' support. For example, the following examples may apply:

It is proposed that the sum of the transmit powers in the four antenna connectors satisfies the corresponding 'ue_PowerClass'.

Alternatively, UE capability for the number of antennas supporting tx diversity may be newly added. As an example, this capability may be defined as 'txDiversity-r18'. For example, it may be defined in the following form:

'txDiversity-r18'=2, 3, 4; or

'txDiversity2-r18', 'txDiversity3-r18', 'txDiversity4-r18'.

If 'txDiversity-r18' is newly defined, the following description may be applied. If the terminal switches to one antenna port and transmits (no UL-MIMO), the following description may be applied according to the terminals, the 'txDiversity-r18' capability below:

In the case of 'txDiversity-r18'=2 (or 'txDiversity2-r18'), the sum of transmission power at the two antenna connectors may satisfy the corresponding 'ue_Power-Class';

In the case of 'txDiversity-r18'=3 (or 'txDiversity3-r18') the sum of transmission power at the three antenna connectors may satisfy the corresponding 'ue_Power-Class'; or In the case of 'txDiversity-r18'=4 (or 'txDiversity4-r18'), the sum of transmission power at the four antenna connectors may satisfy the corresponding 'ue_Power-Class'.

The terminal may switch to one antenna port and transmit the signal (that is, when the UL-MIMO is not set). In this case, a terminal that does not specify a 'txDiversity-r16' or 'txDiversity-r18' capability cannot support PC1.5ue_PowerClass. Accordingly, the terminal may inform the network of power class information designated as a PC3 terminal and power class information lower than PC1.5. For example, the terminal in this case may be a terminal in which the uplink full power transmission mode is 'FullPwrMode1' or 'FullPwrMode3'.

The terminal may support 4 layer UL-MIMO with Case 3 (e.g., 26 dBm+26 dBm+26 dBm+26 dBm). In this case, the 4Tx RF requirements of the UE will be described.

In this case, the 4Tx RF standard for PC3, PC2, and PC1.5 terminals supporting 4 layer UL-MIMO may be defined based on the following assumptions. For example, the RF standard for such a terminal assumes TPMI (Transmit Pre-coding Matrix Indicator)=0, corresponding W (e.g., W corresponding to TMPI 0 in FIG. 15), 1 SRS resource and 4 SRS antenna ports 4Tx RF standards can be defined.

Examples of FIGS. 21A to 21G are examples of TPMI used in full power mode transmission applied to 4Tx 1 layer UL-MIMO corresponding to Case 3.

The following drawings are intended to illustrate specific embodiments of the present disclosure. The designations of specific devices or the designations of specific signals/messages/fields shown in the drawings are for illustrative purposes only, and the technical features of the present specification are not limited to the specific designations used in the drawings below.

FIGS. 21A to 21G are examples in which TPMI is used in 4Tx1 layer UL-MIMO in Case 3 according to an embodiment of the present disclosure.

Examples of FIGS. 21A to 21G are examples in which the TPMI according to the example of FIG. 12 is applied to the 4Tx1 layer UL-MIMO. For example, a precoding matrix W corresponding to TPMI, such as the following example, was applied:

a==TPMI index '0' b==TPMI index '1' c==TPMI index '2' d==TPMI index '3' e==TPMI index '12' f==TPMI index '4' g==TPMI index '8'

The 4Tx RF requirements of PC3 based on Case3 is described. In the case of a PC3 terminal that supports 4 layer UL-MIMO (e.g., PA1, PA2, PA3, and PA4 are all 26 dBm PA according to Case 3), the 'ue_PowerClass' signal information of the terminal can be designated as PC3. The terminal may transmit based on four antenna ports. In this case, it is proposed that the sum of the total transmission power in the four antenna connectors should satisfy 23 dBm. The following is an example.

In the case of PC3 4 layer UL-MIMO, the terminal may apply W corresponding to TPMI=0 of FIG. 15. In addition, the terminal may apply the PA power back off as follows:

PA1: 9 dB power back off (17 dBm=26 dBm-9 dB)

PA2: 9 dB power back off (17 dBm=26 dBm-9 dB)

PA3: 9 dB power back off (17 dBm=26 dBm-9 dB)

PA4: 9 dB power back off (17 dBm=26 dBm-9 dB)

In the case of PC3 3 layer UL-MIMO, the terminal may apply W corresponding to TPMI=0 of FIG. 14. In addition, the terminal may apply the PA power back off as follows:

PA1: 9 dB power back off (17 dBm=26 dBm-9 dB)

PA2: 9 dB power back off (17 dBm=26 dBm-9 dB)

PA3: 6 dB power back off (20 dBm=26 dBm-6 dB)

PA4: no power back off (26 dBm)

It is assumed that W of the above TPMI is applied in order of PA1/PA2/PA3/PA4.

In the case of PC3 2 layer UL-MIMO, the terminal may apply W corresponding to TPMI=0/1/2/3/4/5 (e.g., TPMI=0) of FIG. 13. In addition, the terminal may apply the PA power back off as follows:

PA1: 6 dB power back off (20 dBm=26 dBm-6 dB)
PA2: 6 dB power back off (20 dBm=26 dBm-6 dB)
PA3: 6 dB power back off (20 dBm=26 dBm-6 dB)
PA4: 6 dB power back off (20 dBm=26 dBm-6 dB)

It is assumed that W of the above TPMI is applied in order of PA1/PA2/PA3/PA4.

In the case of PC3 1 layer UL-MIMO, the terminal may apply W corresponding to TPMI=0/1/2/3 of FIG. 12. In addition, the terminal may apply the PA power back off as follows:

PA1: 3 dB power back off (23 dBm=26 dBm-3 dB)
PA2: 3 dB power back off (23 dBm=26 dBm-3 dB)
PA3: 3 dB power back off (23 dBm=26 dBm-3 dB)
PA4: 3 dB power back off (23 dBm=26 dBm-3 dB)

If the PC3 terminal supporting the 4 layer UL-MIMO is Case 2 (e.g., PA1, PA2, PA3, and PA4 are all 26 dBm), the uplink full power transmission mode can be set. In the case of 1 layer, TPMI may be assumed as follows, and based on the assumption below, the output power of the UE 23 dBm may be satisfied.

'FullPwrMode': The output power at each connector of the antenna of the terminal may satisfy 23 dBm, respectively. Alternatively, the terminal may apply W corresponding to TPMI=0, 1, 2, 3 of FIG. 12 (for example, see FIGS. 21A to 21D). In addition, the terminal may apply the PA power back off as follows:

PA1: 3 dB power back off
PA2: 3 dB power back off
PA3: 3 dB power back off
PA4: 3 dB power back off 'FullPwrMode2': The output power at one antenna connector of the terminal may satisfy 23 dBm, respectively. Alternatively, the terminal may apply W corresponding to TPMI=0 or 1 or 2 or 3 of FIG. 12 (e.g., see FIGS. 21A to 21D). In addition, the terminal may apply the PA power back off as follows:

PA1: 3 dB power back off
PA2: 3 dB power back off
PA3: 3 dB power back off
PA4: 3 dB power back off 'FullPwrMode1': The sum of output power at four antenna connectors of the terminal may satisfy 23 dBm. Alternatively, the terminal may apply W corresponding to the TPMI=12 of FIG. 12 (for example, see FIG. 21E). In addition, the terminal may apply the PA power back off as follows:

PA1: 9 dB power back off
PA2: 9 dB power back off
PA3: 9 dB power back off
PA4: 9 dB power back off 'FullPwrMode3': The sum of output power at the two antenna connectors of the terminal may satisfy 23 dBm. Alternatively, the terminal may apply W corresponding to TPMI=4 or 8 of FIG. 12 (e.g., see FIG. 21F). The terminal may apply PA power back off as follows:

PA1: 6 dB power back off
PA2: 6 dB power back off
PA3: 6 dB power back off
PA4: 6 dB power back off 'FullPwrMode4': The sum of output power at the two pairs of antenna connectors of the terminal may satisfy 23 dBm, respectively. Alternatively, the terminal may apply W corresponding to TPMI={4, 8} of FIG. 12 (see FIG. 21F, FIG. 21G). The terminal may apply PA power back off as follows:

PA1: 6 dB power back off
PA2: 6 dB power back off
PA3: 6 dB power back off
PA4: 6 dB power back off Here, in order to satisfy the output power of 23 dBm, power back off applied to each PA may also be considered.

Here, new uplink full power transmission modes, 'FullPwrMode3' and 'FullPwrMode4' are proposed:

If the 'FullPwrMode3' terminal is a 4Tx terminal, the terminal may be a terminal in which the sum of transmit powers of 2 antenna connectors of UL-MIMO satisfies the corresponding 'ue_PowerClass'.

If the 'FullPwrMode4' terminal is a 4Tx terminal, the terminal may be a terminal in which the sum of transmit powers of two pairs of 2 antenna connectors of UL-MIMO satisfies the respective 'ue_PowerClass'.

Here, 'FullPwrMode3' and ', 'FullPwrMode4' do not apply to 2Tx terminals.

Even if the terminal switches to one antenna port and transmits it, it is suggested that the transmission power at one antenna connector satisfies the corresponding 'ue_PowerClass'. (i.e., if UL-MIMO is not set)

The 4Tx RF specification of PC2 based on Case3 is described. In the case of a PC2 terminal that supports 4 layer UL-MIMO (e.g., when PA1, PA2, PA3, and PA4 are all 26 dB PA according to Case 3), the terminal may designate the 'ue_PowerClass' signal information as PC2. In this case, the terminal may transmit based on four antenna ports. In this case, it is proposed that the sum of the total transmission power in the four antenna connectors should satisfy 26 dBm. The following is an example.

In the case of PC2 4 layer UL-MIMO, the terminal may apply W corresponding to TPMI=0 of FIG. 15. In addition, the terminal may apply the PA power back off as follows:

PA1: 6 dB power back off (20 dBm=26 dBm-6 dB)
PA2: 6 dB power back off (20 dBm=26 dBm-6 dB)
PA3: 6 dB power back off (20 dBm=26 dBm-6 dB)
PA4: 6 dB power back off (20 dBm=26 dBm-6 dB)

In the case of PC2 3 layer UL-MIMO, the terminal may apply W corresponding to TPMI=0 of FIG. 14. In addition, the terminal may apply the PA power back off as follows:

PA1: 6 dB power back off (20 dBm=26 dBm-6 dB)
PA2: 6 dB power back off (20 dBm=26 dBm-6 dB)
PA3: 3 dB power back off (23 dBm=26 dBm-3 dB)
PA4: no power back off (23 dBm)

It is assumed that W of the above TPMI is applied in order of PA1/PA2/PA3/PA4.

In the case of PC2 2 layer UL-MIMO, the terminal may apply W corresponding to TPMI=0/1/2/3/4/5 of FIG. 13. In addition, the terminal may apply the PA power back off as follows:

PA1: 3 dB power back off (23 dBm=26 dBm-3 dB)
PA2: 3 dB power back off (23 dBm=26 dBm-3 dB)
PA3: 3 dB power back off (23 dBm=26 dBm-3 dB)
PA4: 3 dB power back off (23 dBm=26 dBm-3 dB)

It is assumed that W of the above TPMI is applied in order of PA1/PA2/PA3/PA4.

In the case of PC21 layer UL-MIMO, the terminal may apply W corresponding to TPMI=0/1/2/3 of FIG. 12. In addition, the terminal may apply the PA power back off as follows:

PA1: no power back off (26 dBm)
PA2: no power back off (26 dBm)

PA3: no power back off (26 dBm)

PA4: no power back off (26 dBm)

For PC2 terminals that support 4 layer UL-MIMO (e.g., when PA1, PA2, PA3, and PA4 are 26 dB according to Case 3), the uplink full power transmission mode can be set. In the case of 1 layer, TPMI may be assumed as below, and the output power of the UE may be satisfied based on the following assumption.

'FullPwrMode': Output power at each connector of the antenna of the terminal may satisfy 26 dBm, respectively. Alternatively, the terminal may apply W (e.g., see FIGS. 12*a, b, c*, and *d*) corresponding to TPMI=0, 1, 2, and 3 of FIG. 12. In addition, the terminal may apply the PA power back off as follows:

PA1: no power back off

PA2: no power back off

PA3: no power back off

PA4: no power back off

'FullPwrMode2': The output power at one antenna connector of the terminal may satisfy 26 dBm, respectively. Alternatively, the terminal may apply W (e.g., see FIGS. 12*a, b, c*, and *d*) corresponding to TPMI=0 or 1 or 2 or 3 of FIG. 12. In addition, the terminal may apply the PA power back off as follows:

PA1: no power back off

PA2: no power back off

PA3: no power back off

PA4: no power back off

'FullPwrMode1': The sum of output power at four antenna connectors of the terminal may satisfy 26 dBm. Alternatively, the terminal may apply W (e.g., see FIG. 12*e*) corresponding to the TPMI=12 of FIG. 12. In addition, the terminal may apply the PA power back off as follows:

PA1: 6 dB power back off

PA2: 6 dB power back off

PA3: 6 dB power back off

PA4: 6 dB power back off

'FullPwrMode3': The sum of output power at the two antenna connectors of the terminal may satisfy 26 dBm. Alternatively, the terminal may apply W (e.g., see FIG. 12*f*) corresponding to TPMI=4 or 8 of FIG. 12. In addition, the terminal may apply the PA power back off as follows:

PA1: 3 dB power back off

PA2: 3 dB power back off

PA3: 3 dB power back off

PA4: 3 dB power back off

'FullPwrMode4': The sum of output power at the two pairs of antenna connectors of the terminal may satisfy 26 dBm, respectively. Alternatively, the terminal may apply W (e.g., see FIG. 12F, g) corresponding to TPMI={4 and 8} of FIG. 12. In addition, the terminal may apply the PA power back off as follows:

PA1: 3 dB power back off

PA2: 3 dB power back off

PA3: 3 dB power back off

PA4: 3 dB power back off

Here, new uplink full power transmission modes, 'FullPwrMode3' and 'FullPwrMode4' are proposed:

If the 'FullPwrMode3' terminal is a 4Tx terminal, in the case of a 4Tx terminal, the sum of the transmission power of the two antenna connections of the UL-MIMO satisfies the corresponding 'ue_PowerClass'

If the 'FullPwrMode4' terminal is a 4Tx terminal, in the case of a 4Tx terminal, the sum of the transmission power of the two pairs of antenna connections of the UL-MIMO satisfies the corresponding 'ue_PowerClass'

Here, 'FullPwrMode3' and 'FullPwrMode4' are not applied to the 2Tx terminal.

The terminal can transmit by switching to one antenna port (i.e., when UL-MIMO is not set). In this case, the transmission power of one antenna connector of the terminal may satisfy the corresponding 'ue_PowerClass' (if UL-MIMO is not configured).

The 4Tx RF specification of PC1.5 based on Case3 is described. In the case of PC1.5 terminals that support 4 layer UL-MIMO (e.g., when PA1, PA2, PA3, and PA4 are 26 dB according to Case 3), the 'ue_PowerClass' signal information may be designated as PC1.5. In this case, the terminal may transmit based on four antenna ports. In this case, the sum of the total transmission power at the four antenna connectors of the terminal may satisfy 29 dBm. The following is an example.

In the case of PC1.5 4 layer UL-MIMO, the UE may apply W corresponding to TPMI=0 in FIG. 15. And the terminal can apply PA power back off as follows:

PA1: 3 dB power back off (23 dBm=26 dBm-3 dB)

PA2: 3 dB power back off (23 dBm=26 dBm-3 dB)

PA3: 3 dB power back off (23 dBm=26 dBm-3 dB)

PA4: 3 dB power back off (23 dBm=26 dBm-3 dB)

In the case of PC1.5 3 layer UL-MIMO, the terminal may apply W corresponding to TPMI=1, 2 in FIG. 14. And the terminal can apply PA power back off as follows:

PA1: 3 dB power back off (23 dBm=26 dBm-3 dB)

PA2: 3 dB power back off (23 dBm=26 dBm-3 dB)

PA3: 3 dB power back off (23 dBm=26 dBm-3 dB)

PA4: 3 dB power back off (23 dBm=26 dBm-3 dB)

In the case of PC1.5 2 layer UL-MIMO, the UE may apply W corresponding to TPMI=6/7/8/9/10/11/12/13 of FIG. 13. And the terminal can apply PA power back off as follows:

PA1: 3 dB power back off (23 dBm=26 dBm-3 dB)

PA2: 3 dB power back off (23 dBm=26 dBm-3 dB)

PA3: 3 dB power back off (23 dBm=26 dBm-3 dB)

PA4: 3 dB power back off (23 dBm=26 dBm-3 dB)

In the case of PC1.5 1 layer UL-MIMO, the UE may apply W corresponding to TPMI=12 of FIG. 12. And the terminal can apply PA power back off as follows:

PA1: 3 dB power back off (23 dBm=26 dBm-3 dB)

PA2: 3 dB power back off (23 dBm=26 dBm-3 dB)

PA3: 3 dB power back off (23 dBm=26 dBm-3 dB)

PA4: 3 dB power back off (23 dBm=26 dBm-3 dB)

For PC1.5 terminals that support 4 layer UL-MIMO (e.g., when PA1, PA2, PA3, and PA4 are 26 dB according to Case 3), the uplink full power transmission mode can be set. In the case of 1 layer, TPMI may be assumed as follows, and the output power of the UE may be satisfied based on the assumption below.

'FullPwrMode1': The sum of output power at four antenna connectors of the terminal may satisfy 29 dBm. Alternatively, the terminal may apply W (e.g., see FIG. 21*e*) corresponding to the TPMI=12 of FIG. 12. In addition, the terminal may apply the PA power back off as follows:

PA1: 3 dB power back off (23 dBm=26 dBm-3 dB)

PA2: 3 dB power back off (23 dBm=26 dBm-3 dB)

PA3: 3 dB power back off (23 dBm=26 dBm-3 dB)

PA4: 3 dB power back off (23 dBm=26 dBm-3 dB)

'FullPwrMode3': The sum of the output power at the two antenna connectors of the terminal may satisfy 29 dBm. Alternatively, the terminal may apply W (e.g., see FIG.

21F) corresponding to TPMI=4 or 8 of FIG. 12. In addition, the terminal may apply the PA power back off as follows:

PA1: no power back off

PA2: no power back off

PA3: no power back off

PA4: no power back off

'FullPwrMode4': The sum of output power at the two pairs of antenna connectors of the terminal may satisfy 29 dBm, respectively. Alternatively, the terminal may apply W (e.g., see FIG. 12f, g) corresponding to TPMI={4 and 8} of FIG. 12. In addition, the terminal may apply the PA power back off as follows:

PA1: no power back off

PA2: no power back off

PA3: no power back off

PA4: no power back off

When the terminal switches to one antenna port and transmits (i.e., when UL-MIMO is not set), the terminal can designate 'txDiversity-r16' support. For example, the following examples may apply:

It is proposed to satisfy the sum of transmit power of 26 dBm at two antenna connectors; or, It is proposed to satisfy the sum of transmit power of 26 dBm in 4 antenna connectors.

Alternatively, UE capability for the number of antennas supporting tx diversity may be newly added. As an example, this capability may be defined as 'txDiversity-r18'. For example, it may be defined in the following form:

'txDiversity-r18'=2, 3, 4; or

'txDiversity2-r18', 'txDiversity3-r18', 'txDiversity4-r18'.

If 'txDiversity-r18' is newly defined, the following description may be applied. If the terminal switches to one antenna port and transmits (no UL-MIMO), the following description may be applied according to the terminals, the 'txDiversity-r18' capability below:

In the case of 'txDiversity-r18'=2 (or 'txDiversity2-r18'), the sum of transmission power at the two antenna connectors may satisfy the corresponding 'ue_PowerClass';

In the case of 'txDiversity-r18'=3 (or 'txDiversity3-r18') the sum of transmission power at the three antenna connectors may satisfy the corresponding 'ue_PowerClass'; or In the case of 'txDiversity-r18'=4 (or 'txDiversity4-r18'), the sum of transmission power at the four antenna connectors may satisfy the corresponding 'ue_PowerClass'.

The terminal may switch to one antenna port and transmit the same (that is, when the UL-MIMO is not set). In this case, a terminal that does not specify a 'txDiversity-r16' or 'txDiversity-r18' capability cannot support PC1.5ue_PowerClass. Therefore, it is suggested that the terminal inform the network of power class information designated as a PC2 terminal and power class information lower than PC1.5. For example, the terminal in this case may be a terminal in which the uplink full power transmission mode is 'FullPwrMode1', 'FullPwrMode3', or 'FullPwrMode4'.

The following drawings are intended to illustrate specific embodiments of the present disclosure. The designations of specific devices or the designations of specific signals/messages/fields shown in the drawings are for illustrative purposes only, and the technical features of the present specification are not limited to the specific designations used in the drawings below.

Figure 22:
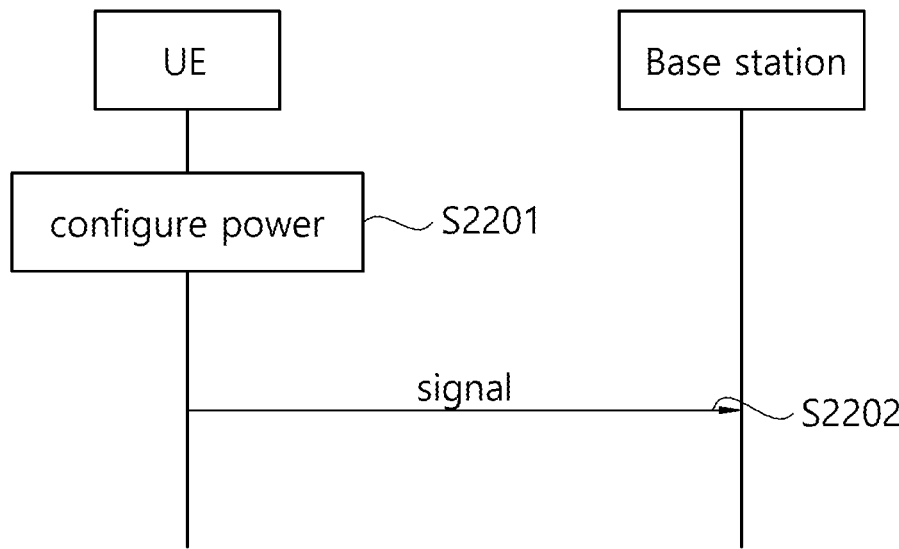
FIG. 22 illustrates an example of an operation according to an embodiment of the present specification.

FIG. 22 illustrates an example of an operation according to an embodiment of the present specification.

In addition, the operation of the UE and the base station shown in the example of FIG. 22 is only an example. The operation of the UE is not limited by the example of FIG. 22, and the UE and the base station may perform the operations described in various examples of the present specification.

In step S2201 the UE may set power for transmitting an uplink signal. For example, the UE may determine transmission power based on the UE's power class, MPR, Tx diversity, antenna isolation, etc. For example, the UE may apply MPR according to an example of Table 11 or an example of Table 12. One or more MPR among the MPRs according to the example of Table 11 or the example of Table 12 may be selectively applied.

For example, the transmission power may be determined based on the set maximum output power based on the MPR. The power class of the UE may be power class 1.5. In this case, the MPR value can be determined based on the UE supporting Tx diversity based on 4Tx, and the antenna isolation for power class 1.5 and 4Tx is i) 10 dB or ii) 20 dB or more.

For example, according to the examples in Table 11 and Table 12, the MPR value may be determined based on whether DFT-s-OFDM or CP OFDM is used and whether Pi/2 BPSK, QPSK, 16 QAM, 64 QAM, or 256 QAM is used. For example, the MPR value may be less than or equal to 8.0, 8.5, or 9.5 for edge RB allocation based on that DFT-s-OFDM is used. For example, the MPR value is based on that DFT-s-OFDM is used, for outer RB allocation: the MPR value may be equal to or less than 3.0 dB, based on Pi/2 BPSK is used; the MPR value may be equal to or less than 3.5 dB, based on QPSK is used; and the MPR value may be equal to or less than 4.0 dB, based on that 16 QAM is used; and the MPR value may be equal to or less than 7.0 dB, based on that 256 QAM is used. For example, the MPR value, based on the DFT-s-OFDM used, for inner RB allocation: based on Pi/2 BPSK being used, the MPR value is less than 2.0 dB, based on QPSK being used, the MPR value is less than 2.0 dB, based on 16 QAM being used, the MPR value is less than 2.5 dB, and based on 256 QAM being used, the MPR value may be less than 7.0 dB. For example, the MPR value may be: 9.5 or less, for edge RB allocation, based on the CP-OFDM being used. For example, the MPR value may be equal to or less than one of 5.0 dB, 7.0 dB, and 9.5 dB for outer RB allocation based on the CP-OFDM being used. For example, the MPR value may be one or less of 3.5B, 4.0 dB, 7.0 dB, or 9.5 dB for inner RB allocation, based on which CP-OFDM is used.

For example, according to the examples in Table 11 and Table 12, the MPR value may be determined based on whether DFT-s-OFDM or CP OFDM is used and whether Pi/2 BPSK, QPSK, 16 QAM, 64 QAM, or 256 QAM is used. For example, based on that the DFT-s-OFDM is used, the MPR value may be one or less of 8.0, 8.5, and 9.5 for edge RB allocation. For example, the MPR value above is based on the use of the DFT-s-OFDM above for inner RB allocation: based on that Pi/2 BPSK is used, the MPR value may be or less than 0.5 dB, based on that QPSK is used, the MPR value may be 0.5 dB or less, and based on that 16 QAM is used, the MPR value may be 1.5 dB or less. For example, the MPR value may be, based on the CP-OFDM above, is used for edge RB allocation: based on the use of QPSK, the MPR value is 8.0 dB or less, based on the use of 16 QAM, the MPR value above is 8.0 dB or less, and based on the use of 64 QAM, the MPR value may be 8.0 dB or less. For example, based on the use of the CP-OFDM, the MPR value may be less than or equal to one of 5.0 dB based on the use of 64 QAM for outer RB allocation. For example, the MPR value above, based on the CP-OFDM above, is used for inner RB allocation: based on that QPSK is used, the MPR value is 2.0 dB or less, based on that 16 QAM is used, the MPR value above shall be 2.5 dB or less, and based on that 64 QAM is used, the MPR value may be 5.0 dB or less.

For example, the UE may configure the maximum output power $P_{CMAX, f, c}$ for carrier f of serving cell c in each slot. The configured maximum output power PCM AX,f,c may be set within the following range:

$$P_{CMAX\_L,f,c} \le P_{CMAX,f,c} \le P_{CMAX\_H,f,c} \text{ with}$$

$$P_{CMAX\_L,f,c}=\text{MIN}\{P_{EMAX,c}-\Delta T_{C,c}, (P_{PowerClass}-\Delta P_{PowerClass})-\text{MAX}(\text{MAX}(M\ PR_c+\Delta MPR_c,A-MPR_c)+\Delta T_{IB,c}+\Delta T_{C,c}+\Delta T_{RxSRS}, P\text{-}MPR_c)\}$$

$$P_{CMAX\_H,f,c}=\text{MIN}\{P_{EMAX,c}, P_{PowerClass}-\Delta P_{PowerClass}\}$$

Here, $MPR_c$ may mean an MPR value according to examples of the present disclosure. Other parameters can be defined by 3GPP TS 38.101-1 V17.6.0.

For example, UE may determine transmission power (e.g., PPRACH, $_{b, f, c}$ (i)) for physical random access channel (PRACH). The transmission power (e.g., PPRACH, b, f, c (i)) for PRACH on active UL BWP (Bandwidth Part) b of carrier f of serving cell c can be determined as follows, based on the Downlink Reference Signal (DL-RS) of serving cell c within transmission okay i:

$$P_{PRACH\ b,f,c}(i)=\min\{P_{CMAX,f,c}(i), P_{PRACH,target,f,c}+PL_{b,f,c}\}[\text{dBm}],$$

Here, $P_{CMAX, f, c}$ (i) may be the maximum output power set by the UE for carrier f of the serving cell c in the transmission occasion I, as described above. $P_{PRACH, target, f, c}$ are PRACH target receive power PRAMABLE_RECEIVED_TARGET_POWER provided in the upper layer for active UL BWP b of carrier f of serving cell c. $PL_{b, f, c}$ is path loss for the active UL BWP b of carrier f based on DL RS related to PRACH transmission in the active DL BWP of the serving cell, and $PL_{b, f, c}$ is a value calculated by the UE in units of dBm based on the RSRP (referenceSignalPower) filtered by the upper layer.

In step S2202, the UE may transmit a signal to the base station. For example, the UE may transmit an uplink signal to the base station based on transmission power. For example, the UE may transmit a PRACH signal including a random access preamble to the base station based on the determined transmission power.

For reference, based on the MPR value according to an embodiment of the present specification, the UE may perform a random access procedure. For example, in one embodiment of the disclosure of the present specification, if RF requirements (e.g., Tx RF performance requirements and/or Rx RF performance requirements) are described, the UE may satisfy these RF requirements. For example, UE can be tested to satisfy RF requirements (e.g., Tx RF performance requirements and/or Rx Rf performance requirements) according to an embodiment of the disclosure of the present specification. In an embodiment of the present specification, a UE satisfying such an RF requirement may perform a RACH procedure. When the UE transmits messages, data, signals, etc. to the gNB, the UE satisfies the Tx RF performance requirements described in one embodiment of the disclosure of the present specification. When the UE receives messages, data, signals, etc. from the gNB, the UE meets the Rx RF performance requirements described in one embodiment of the disclosure of the present specification.

In order to connect the UE to the 5G network, the UE and the 5G network must be synchronized in uplink and downlink. When the UE successfully decodes the SSB transmitted by the gNB, downlink synchronization is performed. In order to establish uplink synchronization and RRC connection, the UE may perform a RACH random access procedure.

The UE may transmit the MSG1 (message 1) based on the PRACH including the random access preamble to the gNB. For example, the UE may determine the transmission power of the PRACH. For example, the UE may configure a configured maximum output power based on an MPR value according to an embodiment of the disclosure of the present specification and determine the transmission power of PRACH based on the configured maximum output power. After the UE transmits the MSG1, the UE may monitor the response of the network within the configured window. The UE may receive the random access response MSG2 from the gNB. Then, the UE may transmit the MSG3 using the UL grant scheduled by the response message. In addition, the UE may monitor the contention resolution. If the contention resolution is not successful even after MSG3 (re)transmission, the UE performs MSG1 transmission again.

According to an embodiment of the present specification, an MPR for a 4Tx PC1.5 UE is proposed.

For example, MPR according to the example in Table 11 is proposed. The MPR according to the example of Table 11 may be applied when the antenna isolation is 10 dB. For example, a device with an antenna isolation of 10 dB may include a handheld UE/vehicular UE/industrial device.

For example, MPR according to the example in Table 12 is proposed. The MPR according to the example of Table 12 may be applied when the antenna isolation is 20 dB or more. For example, a device having an antenna isolation of 20 dB or more may include FWA/CPE/industrial devices.

For example, in addition to the MPR according to the example in Table 11 and the MPR according to the example in Table 12, MPR considering implementation margin may be proposed.

According to an embodiment of the present specification, terminal capability for a 4Tx UL-MIMO support terminal may be proposed. For example, the PA of the terminal may be configured as follows:

-23 dBm+23 dBm+23 dBm+23 dBm (Case 1)

-26 dBm+26 dBm+23 dBm+23 dBm (Case 2)

-26 dBm+26 dBm+26 dBm+26 dBm (Case 3)

According to an embodiment of the present specification, MPR according to a PA configuration method and a UL-MIMO full power transmission mode may be proposed. For example, based on UL-MIMO full power transmission modes (e.g., 'FullPwrMode', 'FullPwrMode1', 'FullPwrMode2', 'FullPwrMode3', and 'FullPwrMode4'), MPR may be applied. Depending on the PA configuration method, a support mode may be set.

According to an embodiment of the present specification, a Tx diversity support mode may be proposed. For example, 'txDiversity-r18'=2, 3, 4. For example, 2, 3, and 4 respectively mean: 2 Tx, 3 Tx, and 4 Tx.

According to an embodiment of the present specification, when the UL-MIMO support terminal transmits a signal to one antenna port, MPR according to the Tx diversity support mode may be proposed. For example, MPR may be applied as shown in the following example:

When the terminal supports 2 Tx as the Tx diversity, an MPR value based on the antenna isolation 10 dB may be applied. For example, a device with an antenna isolation of 10 dB may include a handheld UE/vehicular UE/industrial device. When the terminal supports 2 Tx with the Tx diversity, an MPR value based on the case in which the antenna isolation is 20 dB or more may be applied. For example, a device having an antenna isolation of 20 dB or more may include FWA/ CPE/industrial devices.

When the terminal supports 4 Tx as the Tx diversity, an MPR value based on the antenna isolation 10 dB may be applied. For example, a device with an antenna isolation of 10 dB may include a handheld UE/vehicular UE/industrial device. When the terminal supports 4 Tx with the Tx diversity, an MPR value based on the case in which the antenna isolation is 20 dB or more may be applied. For example, a device having an antenna isolation of 20 dB or more may include FWA/ CPE/industrial devices.

When the terminal does not support Tx diversity, MPR may be applied.

According to an embodiment of the present specification, the terminal may apply MPR as shown in the following example. For example, MPR may be applied when the terminal supports Tx Diversity. For example, MPR when the terminal supports UL-MIMO may be applied. For example, MPR may be applied when the terminal supports both Tx Diversity and UL-MIMO.

According to an embodiment of the present specification, when the 4Tx UL-MIMO support terminal transmits 1 Tx, the terminal power class may be defined according to the present specification.

The terminal may switch to one antenna port and transmit signal (that is, when the UL-MIMO is not set). In this case, a terminal that does not specify a 'txDiversity-r16' or 'txDiversity-r18' capability cannot support the corresponding ue_PowerClass. Therefore, it is suggested that the terminal informs the network of power class information by switching its power class to a power class lower than its power class.

The present specification may have various effects.

For example, by defining RF performance standards for high-power terminals that support FR1 bands (e.g., 29 dBm high-power terminals based on 4Tx), communication between networks and terminals can be ensured. In addition, it is possible to commercialize a 29 dBm high-power terminal based on 4Tx.

The effects that may be obtained from the specific examples of this disclosure are not limited to those listed above. For example, there may be a variety of technical effects that a person having ordinary skill in the related art may understand or infer from this disclosure. Accordingly, the specific effects of the present disclosure are not limited to those expressly set forth herein, but may include a variety of effects that may be understood or inferred from the technical features of the present disclosure.

For reference, the operation of the terminal (e.g., UE) described in the present disclosure of the present specification may be implemented by the devices of FIGS. 1 to 3 described above. For example, the terminal (e.g., UE) may be the first device 100 or the second device 200 of FIG. 1. For example, the operation of a terminal (e.g., UE) described in the present disclosure of the present specification may be processed by one or more processors 102 or 202. The operation of the terminal described in the present disclosure of the present specification may be stored in one or more memories 104 or 204 in the form of an instruction/program (e.g., instruction and executable code) executable by the one or more processors 102 or 202. The one or more processors 102 or 202 may control the one or more memories 104 or 204 and one or more transceivers 105 or 206 and execute instructions/programs stored in the one or more memories 104 or 204 to perform the operation of a terminal (e.g., UE) described in the present disclosure of the present specification.

In addition, instructions for performing the operation of the terminal (e.g., UE) described in the present disclosure of the present specification may be stored in a non-volatile computer-readable storage medium. The storage medium may be included in the one or more memories 104 or 204. In addition, the instructions recorded in the storage medium may be executed by the one or more processors 102 or 202 to perform the operation of a terminal (e.g., UE) described in the present disclosure of the present specification.

For reference, the operations of network node or base station (e.g., NG-RAN, gNB, eNB, etc.) described in the present disclosure of the present specification may be implemented by the devices of FIGS. 1 to 3 which will be described below. For example, the network node or the base station may be the first device 100a or the second device 100b of FIG. 1. For example, the operation of the network node or the base station described in the present disclosure of the present specification may be processed by one or more processors 102 or 202. The operation of the network node or the base station described in the present disclosure of the present specification may be stored in one or more memories 104 or 204 in the form of an instruction/program (e.g., instruction and executable code) executable by the one or more processors 102 or 202. The one or more processors 102 or 202 may control the one or more memories 104 or 204 and one or more transceivers 106 or 206 and execute instructions/programs stored in the one or more memories 104 or 204 to perform the operation of the network node or the base station described in the present disclosure of the present specification.

In addition, the instructions for performing the operation of the NTN network described in the present disclosure of the present specification may be stored in a non-volatile (or non-transitory) computer-readable storage medium. The storage medium may be included in the one or more memories 104 or 204. In addition, the instructions recorded in the storage medium may be executed by the one or more processors 102 or 202 to perform the operation of the NTN network described in the present disclosure of the present specification.

Although preferred embodiments have been described above, the present disclosure of the present specification is not limited to such specific embodiments and thus can be modified, changed, or improved in various manners within the spirt of the present disclosure of the present specification and the scope of the claims.

Although methods are described as a series of steps or blocks based on a flowchart in the exemplary system described above, they are not limited to the order of the described steps, and some steps may occur in a different order or simultaneously with other steps as described above. In addition, those skilled in the art will understand that the steps shown in the flowchart are not exclusive, and that other steps may be included or that one or more steps of a flowchart may be deleted without affecting the scope of rights.

The claims described herein may be combined in various ways. For example, the technical features of the method claims of the present disclosure of the present specification may be combined and implemented as an apparatus, and the technical features of the apparatus claims of the present disclosure of the present specification may be combined and implemented as a method. In addition, the technical features of the method claims of the present disclosure of the present specification and the technical features of the apparatus claims may be combined and implemented as an apparatus, and the technical features of the method claims of the present disclosure and the technical features of the apparatus claims may be combined and implemented as a method. Other implementations are within the scope of the following claims.

What is claimed is:

1. A User Equipment (UE) comprising:

at least one transceiver;

at least one processor; and at least one memory that stores instructions and is operably electrically connectable with the at least one processor, wherein operations performed based on the instructions being executed by the at least one processor include:

setting a maximum output power; and transmitting an uplink signal based on the maximum output power, wherein the maximum output power is based on a Maximum Power Reduction (MPR) for power class 1.5 with four transmit antenna connectors of the UE, and wherein the MPR for the power class 1.5 with the four transmit antenna connectors of the UE is based i) antenna isolation being 10 dB, or 20 dB or above, ii) a Discrete Fourier Transform spread Orthogonal Frequency Division Multiplexing (OFDM) (DFT-s-OFDM) or a Cyclic Prefix OFDM (CP-OFDM), iii) an edge Resource Block (RB) allocation, an outer RB allocation, or an inner RB allocation, and iv) a Pi/2 Binary Phase-Shift Keying (BPSK), a Quadrature Phase Shift Keying (QPSK), a 16 Quadrature Amplitude Modulation (QAM), a 64 QAM, or a 256 QAM.

2. The UE of claim 1, wherein based on i) the antenna isolation being 10 dB, ii) the DFT-s-OFDM, iii) the edge RB allocation, the MPR for the power class 1.5 with the four transmit antenna connectors of the UE is equal to or less than:

8.0 dB, based on the Pi/2 BPSK, 8.5 dB, based on the QPSK, 8.5 dB, based on the 16 QAM, 8.5 dB, based on the 64 QAM, and 9.5 dB, based on the 256 QAM.

3. The UE of claim 1, wherein based on i) the antenna isolation being 10 dB, ii) the CP-OFDM, iii) the edge RB allocation, the MPR for the power class 1.5 with the four transmit antenna connectors of the UE is equal to or less than:

9.5 dB, based on the QPSK, 9.5 dB, based on the 16 QAM, 9.5 dB, based on the 64 QAM, and 9.5 dB, based on the 256 QAM.

4. The UE of claim 1, wherein based on i) the antenna isolation being 10 dB, ii) the DFT-s-OFDM, iii) the outer RB allocation, the MPR for the power class 1.5 with the four transmit antenna connectors of the UE is equal to or less than:

3.0 dB, based on the Pi/2 BPSK is used, 3.5 dB, based on the QPSK is used, 4.0 dB, based on the 16 QAM is used, and 7.0 dB, based on the 256 QAM is used.

5. The UE of claim 1, wherein based on i) the antenna isolation being 10 dB, ii) the DFT-s-OFDM, iii) the inner RB allocation, the MPR for the power class 1.5 with the four transmit antenna connectors of the UE is equal to or less than:

2.0 dB, based on the Pi/2 BPSK is used, 2.0 dB, based on the QPSK is used, 2.5 dB, based on the 16 QAM is used, and 7.0 dB, based on the 256 QAM is used.

6. The UE of claim 1, wherein based on i) the antenna isolation being 10 dB, ii) the CP-OFDM, iii) the outer RB allocation, the MPR for the power class 1.5 with the four transmit antenna connectors of the UE is equal to or less than:

5.0 dB, based on the QPSK, 5.0 dB, based on the 16 QAM, 6.0 dB, based on the 64 QAM, and 9.5 dB, based on the 256 QAM.

7. The UE of claim 1, wherein based on i) the antenna isolation being 10 dB, ii) the CP-OFDM, iii) the inner RB allocation, the MPR for the power class 1.5 with the 4 Tx is equal to or less than:

3.5 dB, based on the QPSK, 4.0 dB, based on the 16 QAM, 7.0 dB, based on the 64 QAM, and 9.5 dB, based on the 256 QAM.

8. The UE of claim 1, wherein based on i) the antenna isolation being 20 dB, ii) the DFT-s-OFDM, iii) the edge RB allocation, the MPR for the power class 1.5 with the four transmit antenna connectors of the UE is equal to or less than:

7.5 dB, based on the Pi/2 BPSK, 8.0 dB, based on the QPSK, 8.0 dB, based on the 16 QAM, 8.0 dB, based on the 64 QAM, and 8.0 dB, based on the 256 QAM.

9. The UE of claim 1, wherein based on i) the antenna isolation being 20 dB, ii) the DFT-s-OFDM, iii) the inner RB allocation, the MPR for the power class 1.5 with the four transmit antenna connectors of the UE is equal to or less than:

0.5 dB, based on the Pi/2 BPSK is used, 0.5 dB, based on the QPSK is used, and 1.5 dB, based on the 16 QAM is used.

10. The UE of claim 1, wherein based on i) the antenna isolation being 20 dB, ii) the CP-OFDM, iii) the edge RB allocation, the MPR for the power class 1.5 with the four transmit antenna connectors of the UE is equal to or less than:

8.0 dB, based on the QPSK is used, 8.0 dB, based on the 16 QAM is used, and 8.0 dB, based on the 64 QAM is used.

11. The UE of claim 1, wherein based on i) the antenna isolation being 20 dB, ii) the CP-OFDM, iii) the outer RB allocation, the MPR for the power class 1.5 with the four transmit antenna connectors of the UE is equal to or less than: 5.0 dB, based on the 64 QAM is used.

12. The UE of claim 1, wherein based on i) the antenna isolation being 20 dB, ii) the CP-OFDM, iii) the inner RB allocation, the MPR for the power class 1.5 with the four transmit antenna connectors of the UE is equal to or less than:

2.0 dB, based on the QPSK is used, 2.5 dB, based on the 16 QAM is used, and 5.0 dB, based on the 64 QAM is used.

13. A method comprising:

setting, by a User Equipment (UE), a maximum output power; and transmitting, by a User Equipment (UE), an uplink signal based on the maximum output power, wherein the maximum output power is based on a Maximum Power Reduction (MPR) for power class 1.5 with four transmit antenna connectors of the UE, and wherein the MPR for the power class 1.5 with the four transmit antenna connectors of the UE is based on i) antenna isolation being 10 dB, or 20 dB or above, ii) a Discrete Fourier Transform spread Orthogonal Frequency Division Multiplexing (OFDM) (DFT-s-OFDM) or a Cyclic Prefix OFDM (CP-OFDM), iii) an edge Resource Block (RB) allocation, an outer RB allocation, or an inner RB allocation, and iv) a Pi/2 Binary Phase-Shift Keying (BPSK), a Quadrature Phase Shift Keying (QPSK), a 16 Quadrature Amplitude Modulation (QAM), a 64 QAM, or a 256 QAM.

14. The method of claim 13, wherein based on i) the antenna isolation being 10 dB, ii) the DFT-s-OFDM, iii) the edge RB allocation, the MPR for the power class 1.5 with the four transmit antenna connectors of the UE is equal to or less than:

8.0 dB, based on the Pi/2 BPSK, 8.5 dB, based on the QPSK, 8.5 dB, based on the 16 QAM, 8.5 dB, based on the 64 QAM, and 9.5 dB, based on the 256 QAM, and wherein based on i) the antenna isolation being 10 dB, ii) the CP-OFDM, iii) the edge RB allocation, the MPR for the power class 1.5 with the four transmit antenna connectors of the UE is equal to or less than:

9.5 dB, based on the QPSK, 9.5 dB, based on the 16 QAM, 9.5 dB, based on the 64 QAM, and 9.5 dB, based on the 256 QAM.

15. The method of claim 13, wherein based on i) the antenna isolation being 10 dB, ii) the DFT-s-OFDM, iii) the outer RB allocation, the MPR for the power class 1.5 with the four transmit antenna connectors of the UE is equal to or less than:

3.0 dB, based on the Pi/2 BPSK, 3.5 dB, based on the QPSK, 4.0 dB, based on the 16 QAM, and 7.0 dB, based on the 256 QAM, and wherein based on i) the antenna isolation being 10 dB, ii) the CP-OFDM, iii) the outer RB allocation, the MPR for the power class 1.5 with the four transmit antenna connectors of the UE is equal to or less than:

5.0 dB, based on the QPSK, 5.0 dB, based on the 16 QAM, 7.0 dB, based on the 64 QAM, and 9.5 dB, based on the 256 QAM.

16. The method of claim 13, wherein based on i) the antenna isolation being 10 dB, ii) the DFT-s-OFDM, iii) the inner RB allocation, the MPR for the power class 1.5 with the four transmit antenna connectors of the UE is equal to or less than:

2.0 dB, based on the Pi/2 BPSK, 2.0 dB, based on the QPSK, 2.5 dB, based on the 16 QAM, and 7.0 dB, based on the 256 QAM, and wherein based on i) the antenna isolation being 10 dB, ii) the CP-OFDM, iii) the inner RB allocation, the MPR for the power class 1.5 with the four transmit antenna connectors of the UE is equal to or less than:

3.5 dB, based on the QPSK, 4.0 dB, based on the 16 QAM, 7.0 dB, based on the 64 QAM, and 9.5 dB, based on the 256 QAM.

17. The method of claim 13, wherein based on i) the antenna isolation being 20 dB, ii) the DFT-s-OFDM, iii) the edge RB allocation, the MPR for the power class 1.5 with the four transmit antenna connectors of the UE is equal to or less than:

7.5 dB, based on the Pi/2 BPSK, 8.0 dB, based on the QPSK, 8.0 dB, based on the 16 QAM, 8.0 dB, based on the 64 QAM, and 8.0 dB, based on the 256 QAM, and wherein based on i) the antenna isolation being 20 dB, ii) the CP-OFDM, iii) the edge RB allocation, the MPR for the power class 1.5 with the 4 Tx is equal to or less than:

8.0 dB, based on the QPSK, 8.0 dB, based on the 16 QAM, and 8.0 dB, based on the 64 QAM.

18. The method of claim 13, wherein based on i) the antenna isolation being 20 dB, ii) the DFT-s-OFDM, iii) the inner RB allocation, the MPR for the power class 1.5 with the four transmit antenna connectors of the UE is equal to or less than:

0.5 dB, based on the Pi/2 BPSK, 0.5 dB, based on the QPSK, and 1.5 dB, based on the 16 QAM, and wherein based on i) the antenna isolation being 20 dB, ii) the CP-OFDM, iii) the inner RB allocation, the MPR for the power class 1.5 with the four transmit antenna connectors of the UE is equal to or less than:

2.0 dB, based on the QPSK, 2.5 dB, based on the 16 QAM, and 5.0 dB, based on the 64 QAM.

19. The method of claim 13, wherein based on i) the antenna isolation being 20 dB, ii) the CP-OFDM, iii) the outer RB allocation, the MPR for the power class 1.5 with the four transmit antenna connectors of the UE is equal to or less than: 5.0 dB, based on the 64 QAM.

20. A device comprising:

at least one transceiver;

at least one processor; and at least one memory that stores instructions and is operably electrically connectable with the at least one processor, wherein operations performed based on the instructions being executed by the at least one processor include:

setting a maximum output power for Physical Random Access CHannel (PRACH); and transmitting Physical Random Access CHannel (PRACH) signal based on the maximum output power, wherein the maximum output power is based on a Maximum Power Reduction (MPR) for power class 1.5 with four transmit antenna connectors of the UE, and wherein the MPR for the power class 1.5 with the 4 Tx is based on i) antenna isolation being 10 dB, or 20 dB or above, ii) a Discrete Fourier Transform spread Orthogonal Frequency Division Multiplexing (OFDM) (DFT-s-OFDM) or a Cyclic Prefix OFDM (CP-OFDM), iii) an edge Resource Block (RB) allocation, an outer RB allocation, or an inner RB allocation, and iv) a Pi/2 Binary Phase-Shift Keying (BPSK), a Quadrature Phase Shift Keying (QPSK), a 16 Quadrature Amplitude Modulation (QAM), a 64 QAM, or a 256 QAM.

* * * * *